Figure 22:
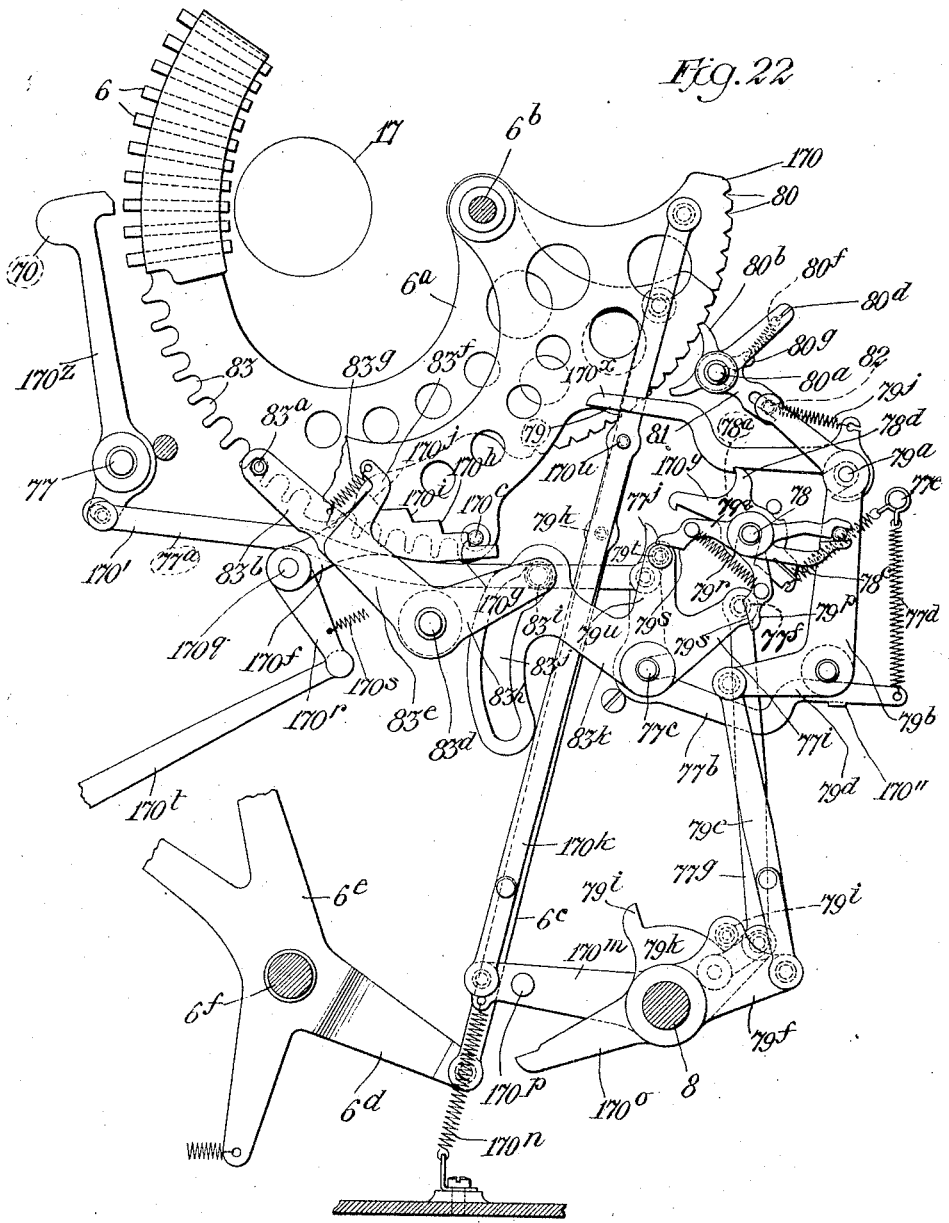

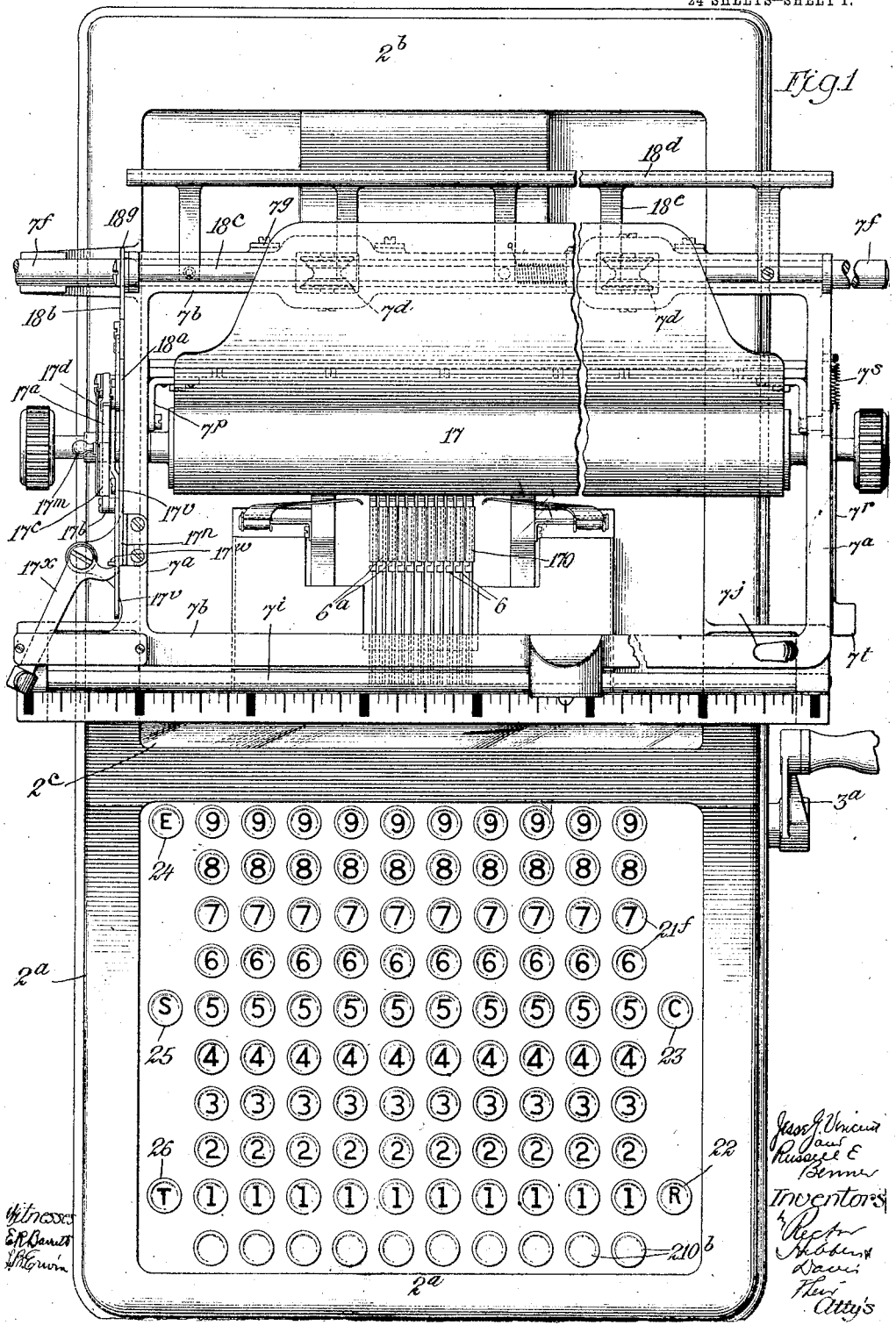

J. G. VINCENT & R. E. BENNER.
ADDING AND LISTING MACHINE.
APPLICATION FILED JUNE 15, 1908.
1,028,162.
Patented June 4, 1912.
24 SHEETS—SHEET 2.
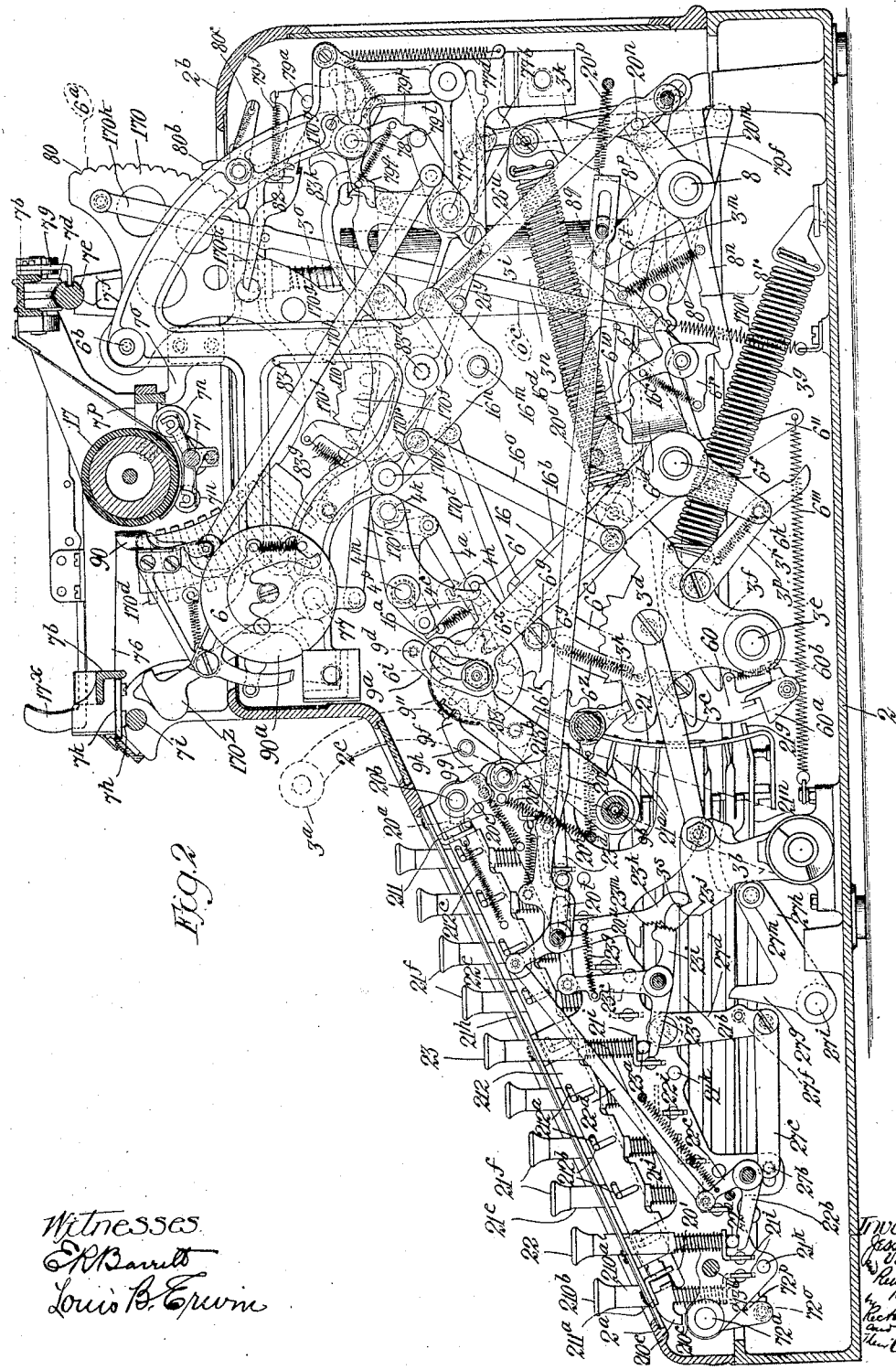

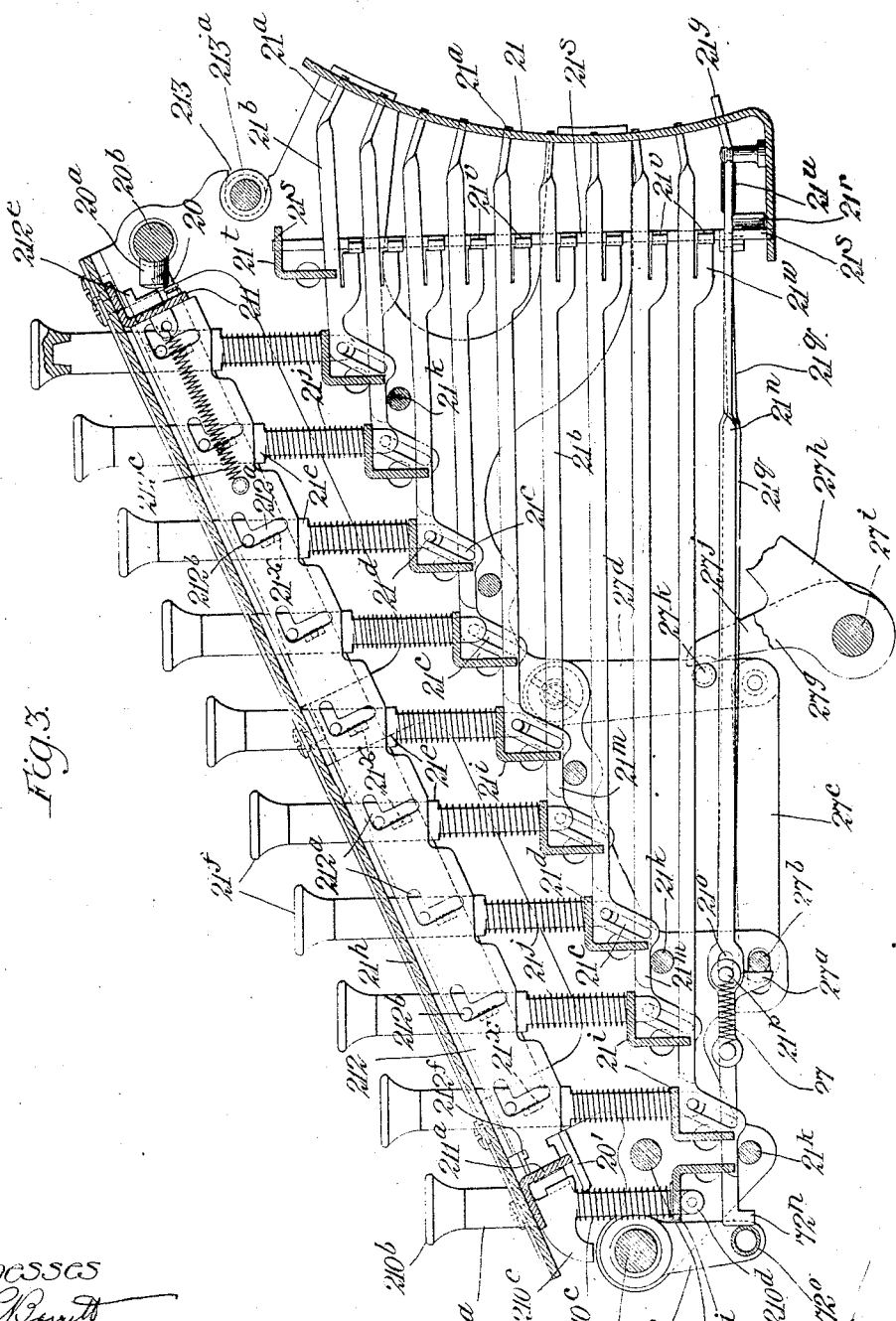

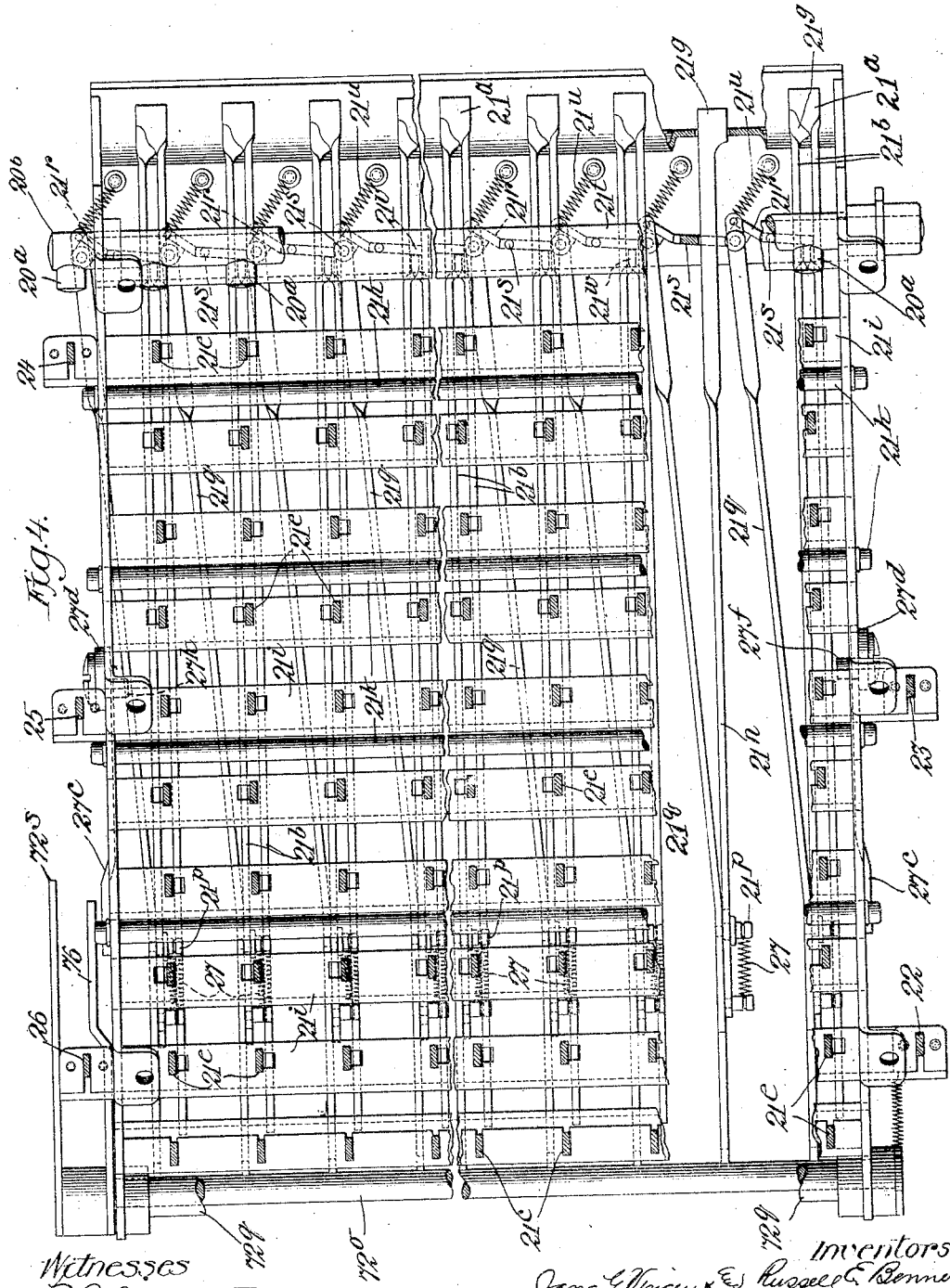

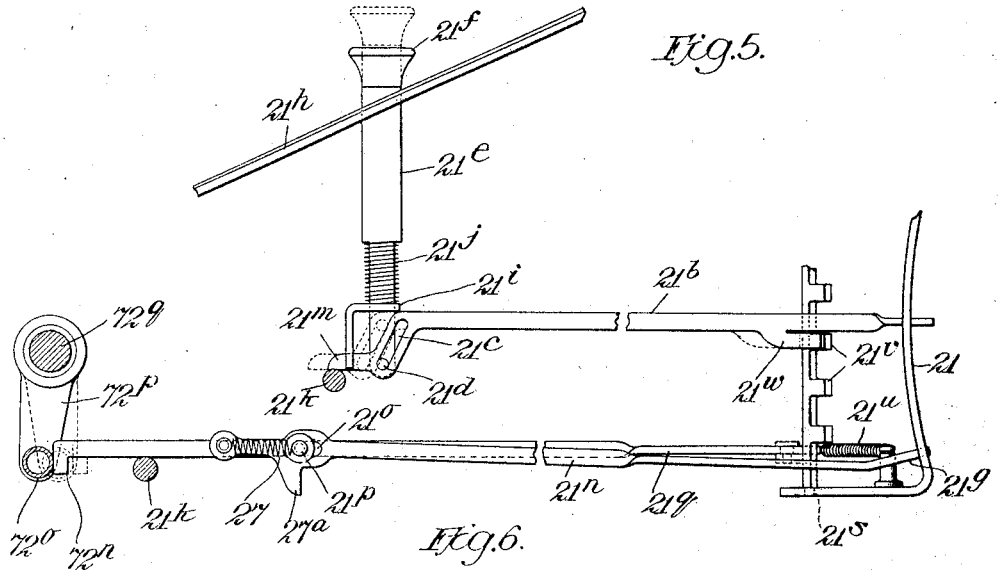
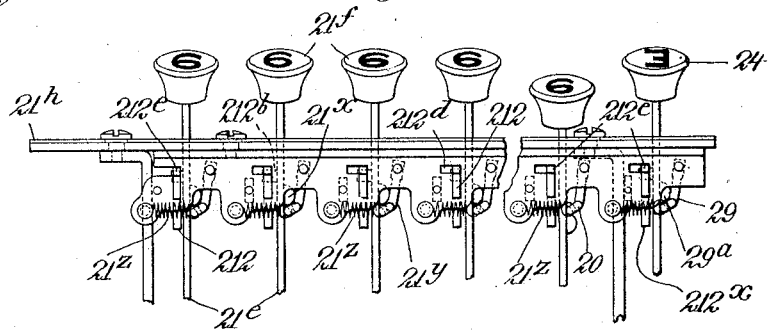
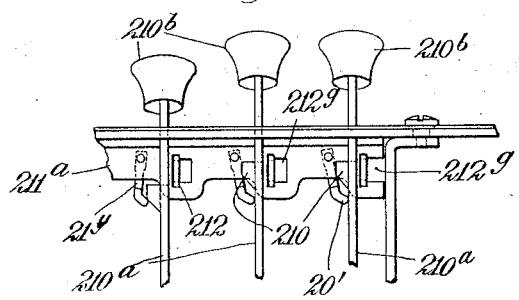

J. G. VINCENT & R. E. BENNER.
ADDING AND LISTING MACHINE.
APPLICATION FILED JUNE 15, 1908.
1,028,162.
Patented June 4, 1912.
24 SHEETS—SHEET 6.
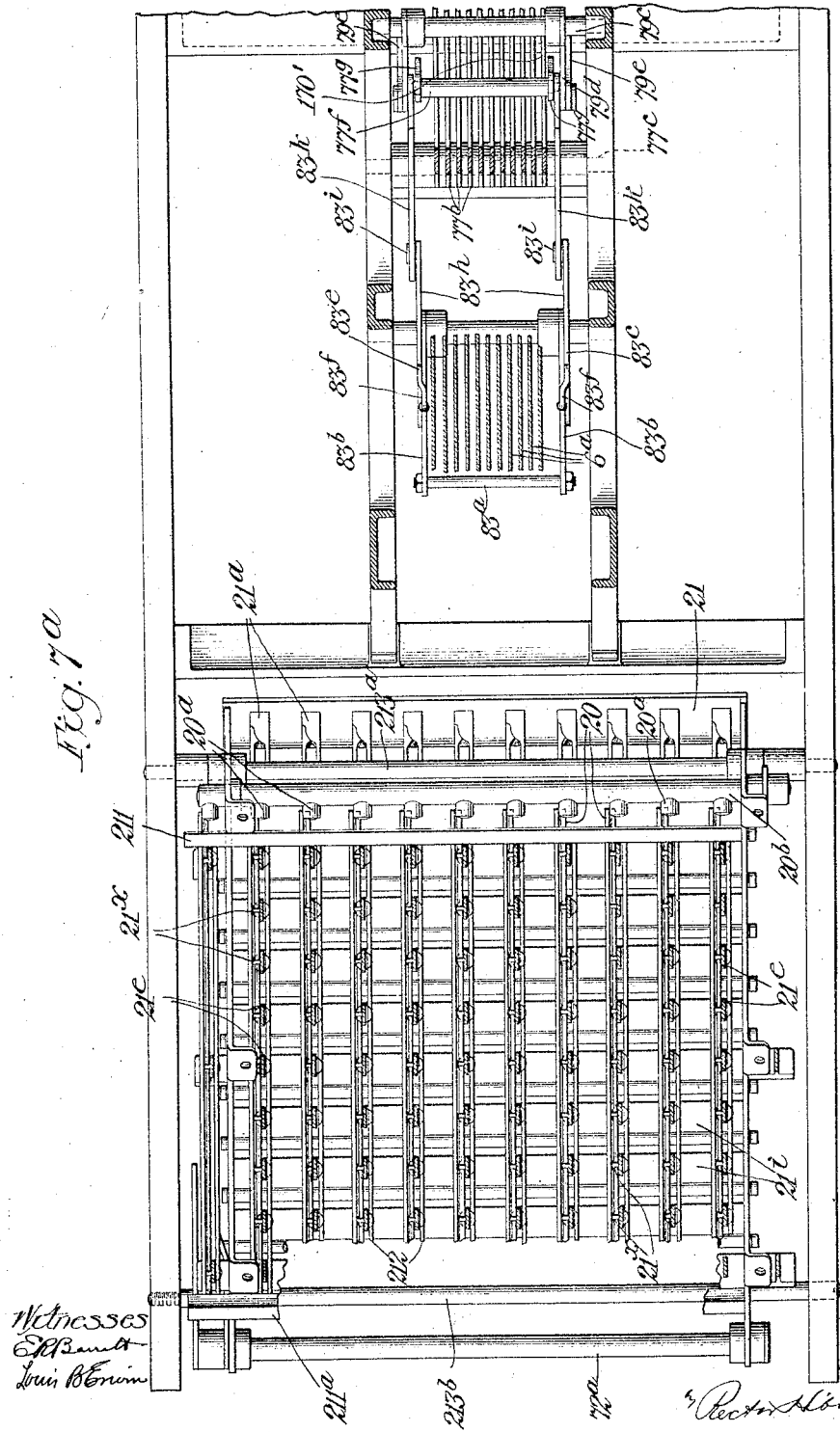

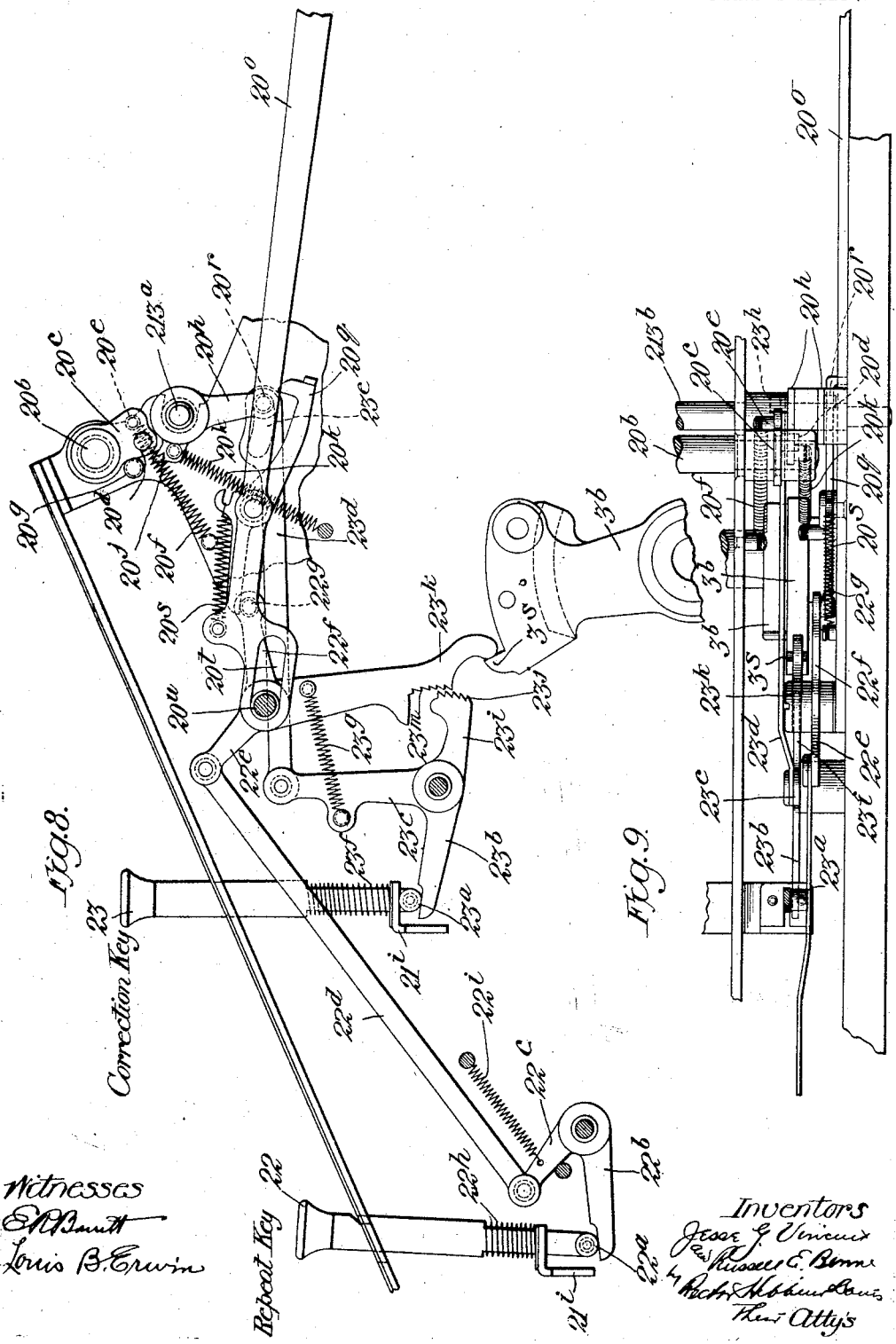

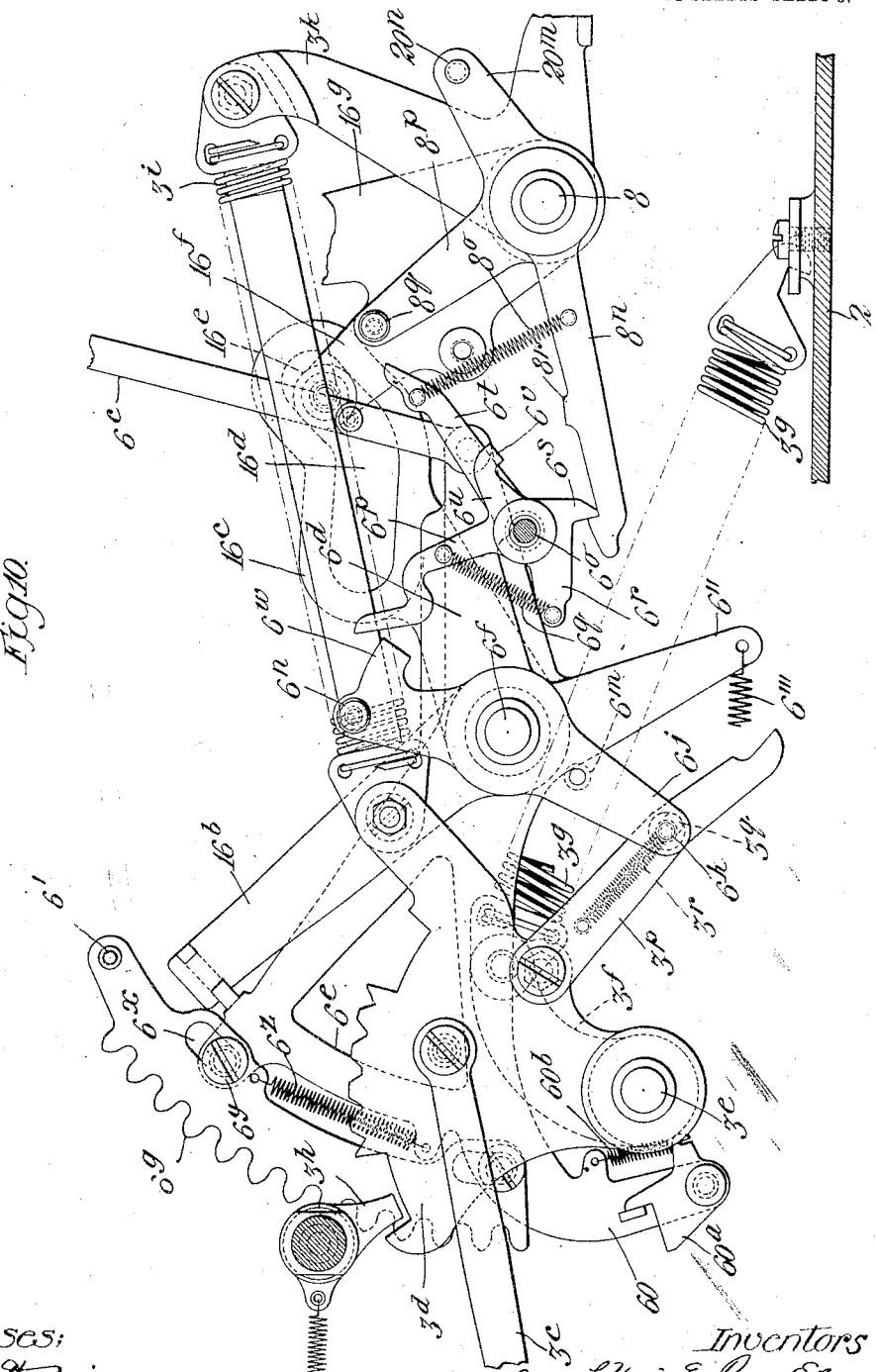

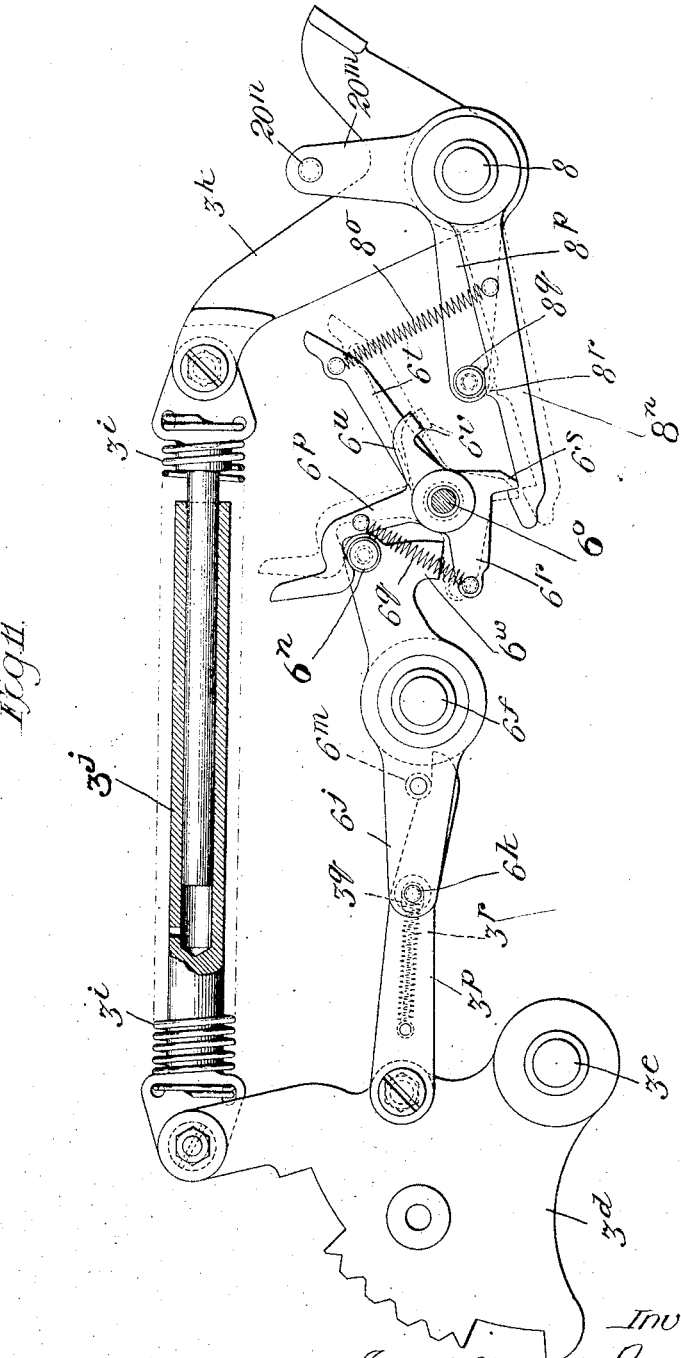

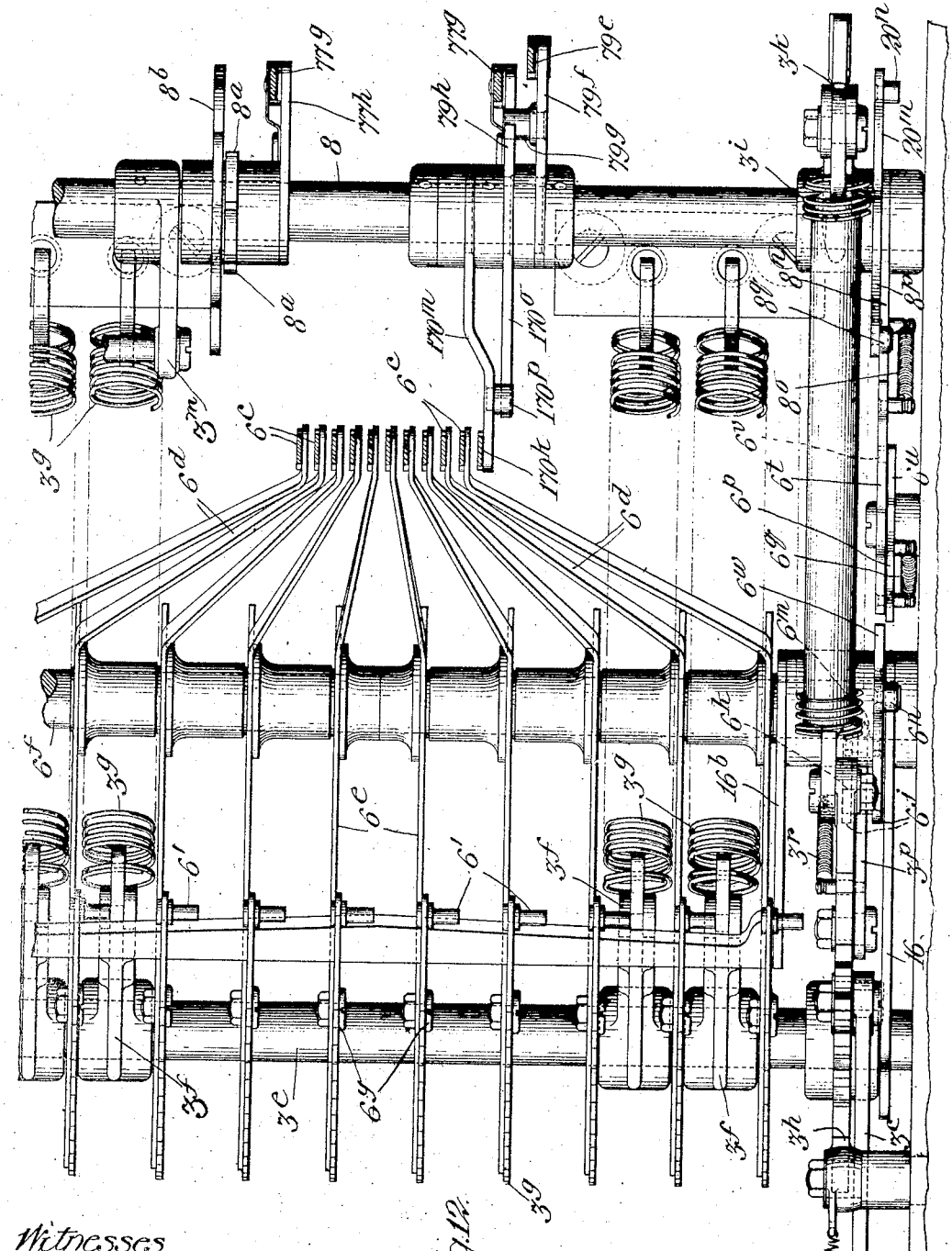

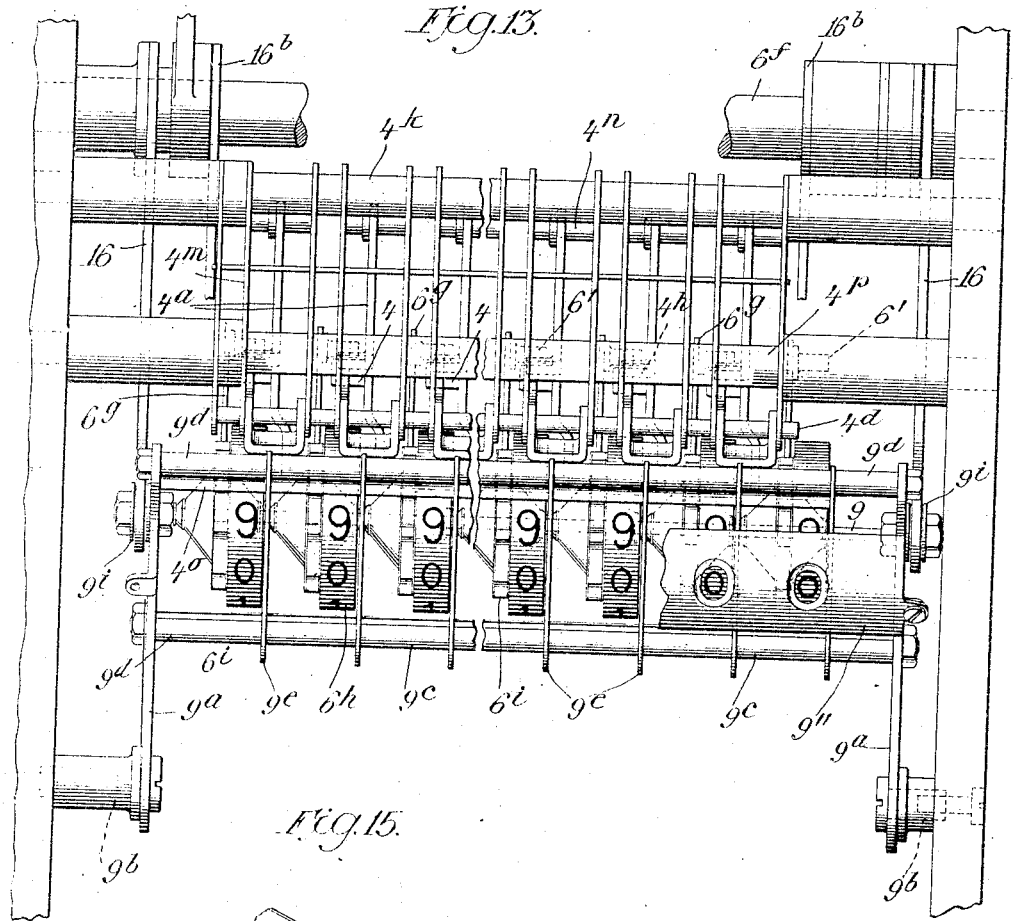

J. G. VINCENT & R. E. BENNER.
ADDING AND LISTING MACHINE.
APPLICATION FILED JUNE 15, 1908.
1,028,162.
Patented June 4, 1912.
24 SHEETS—SHEET 12.
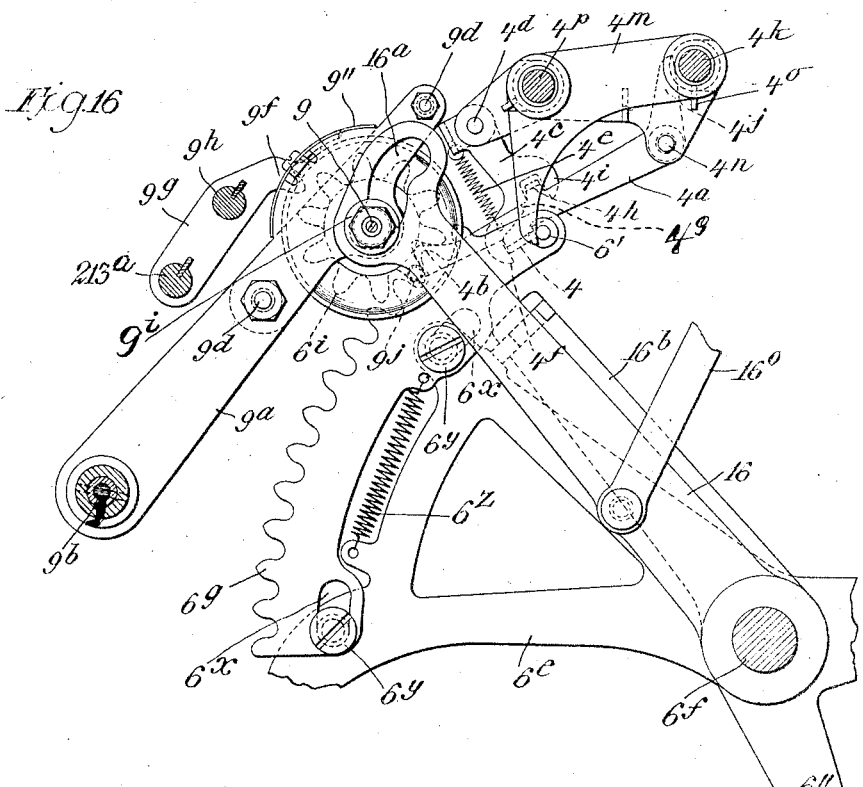
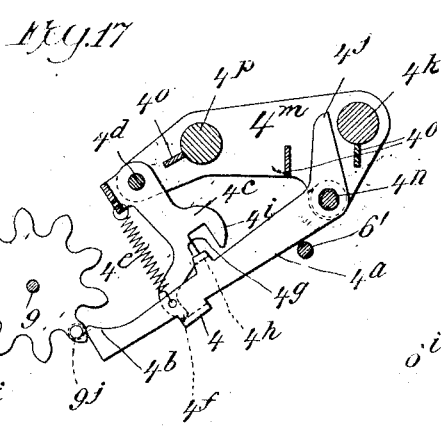
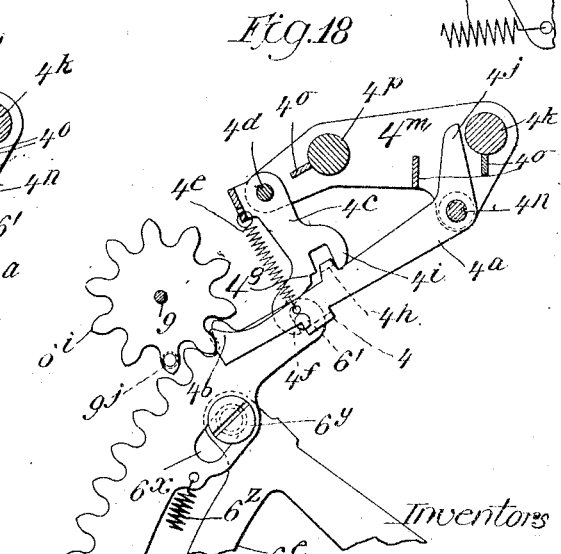

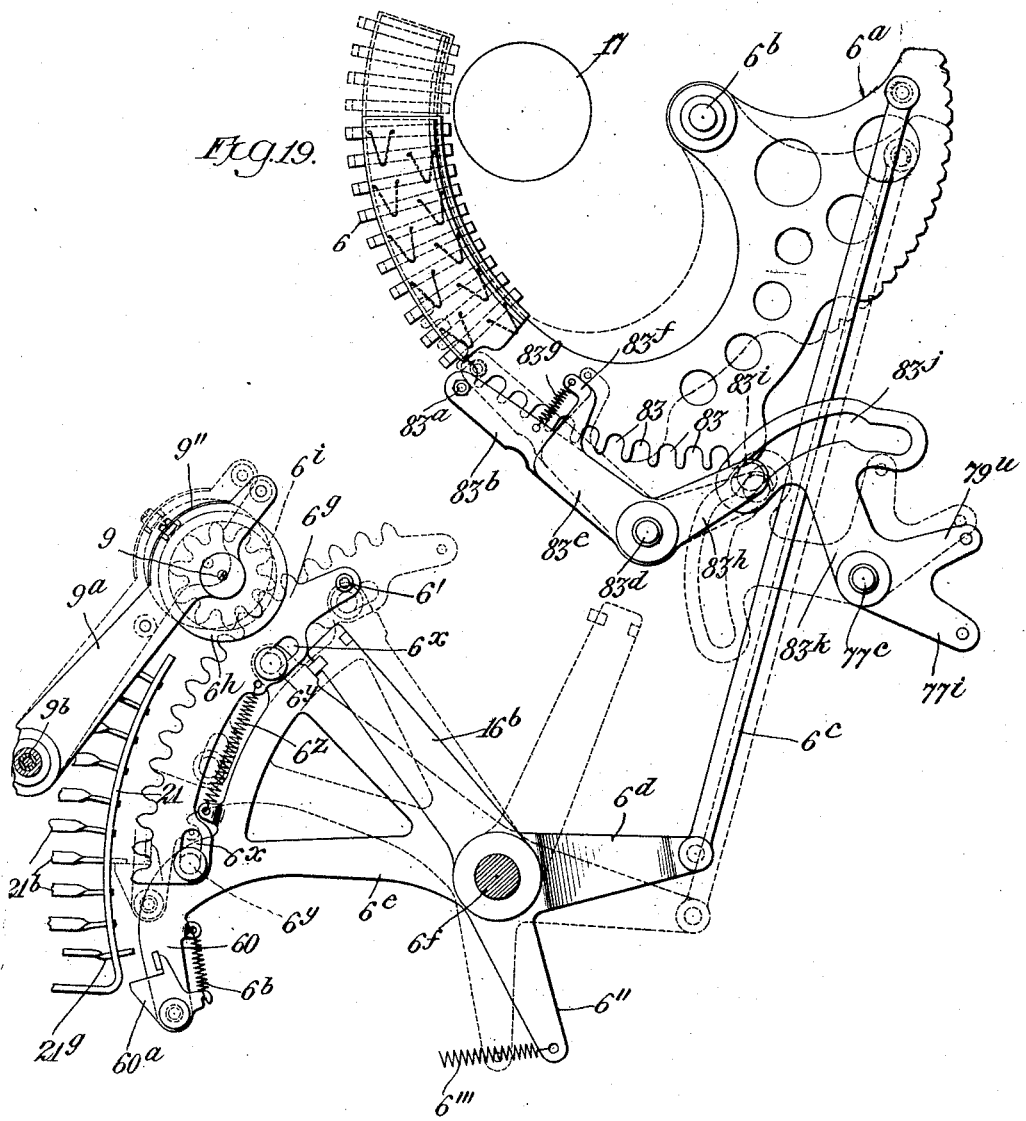

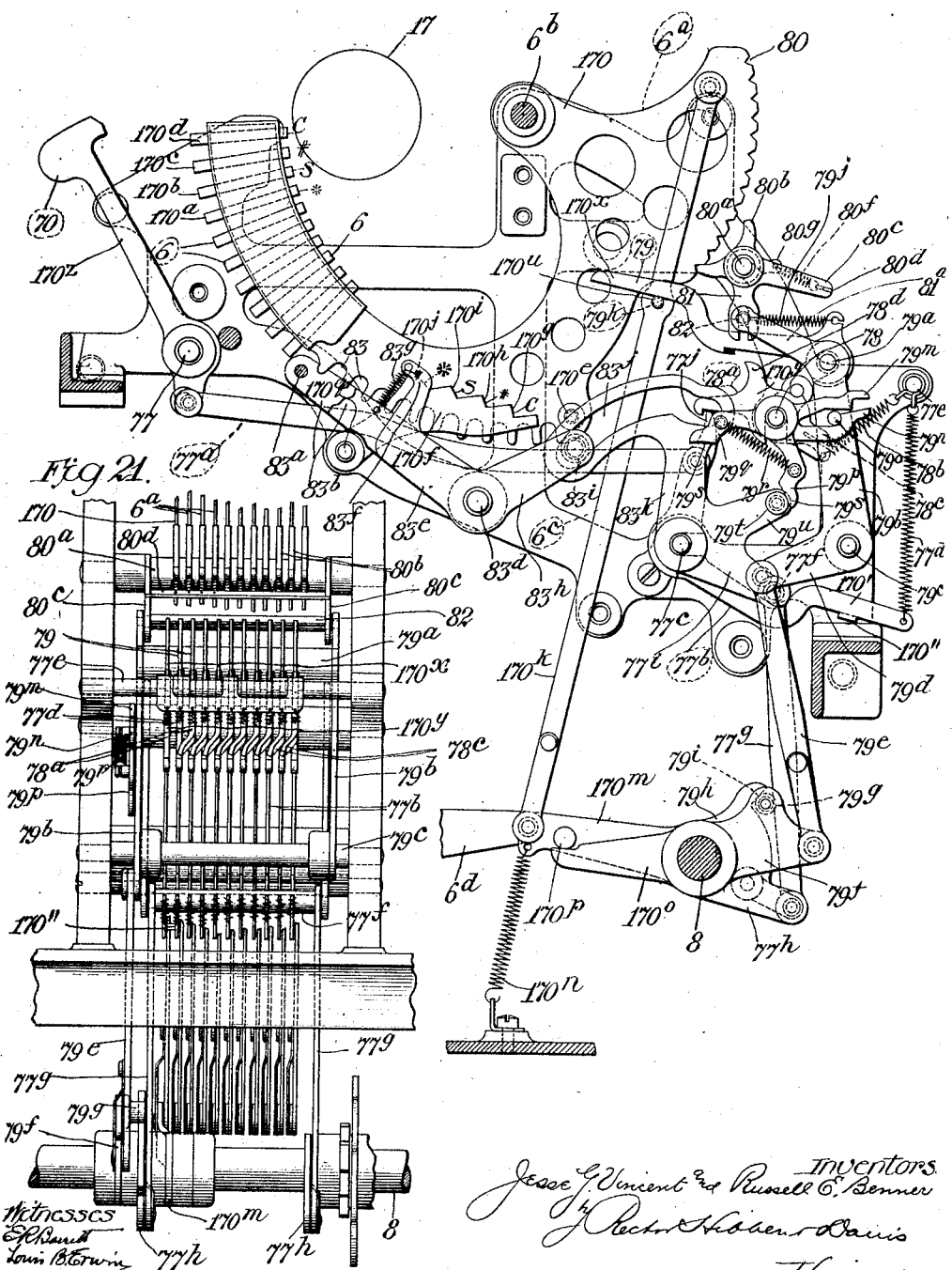

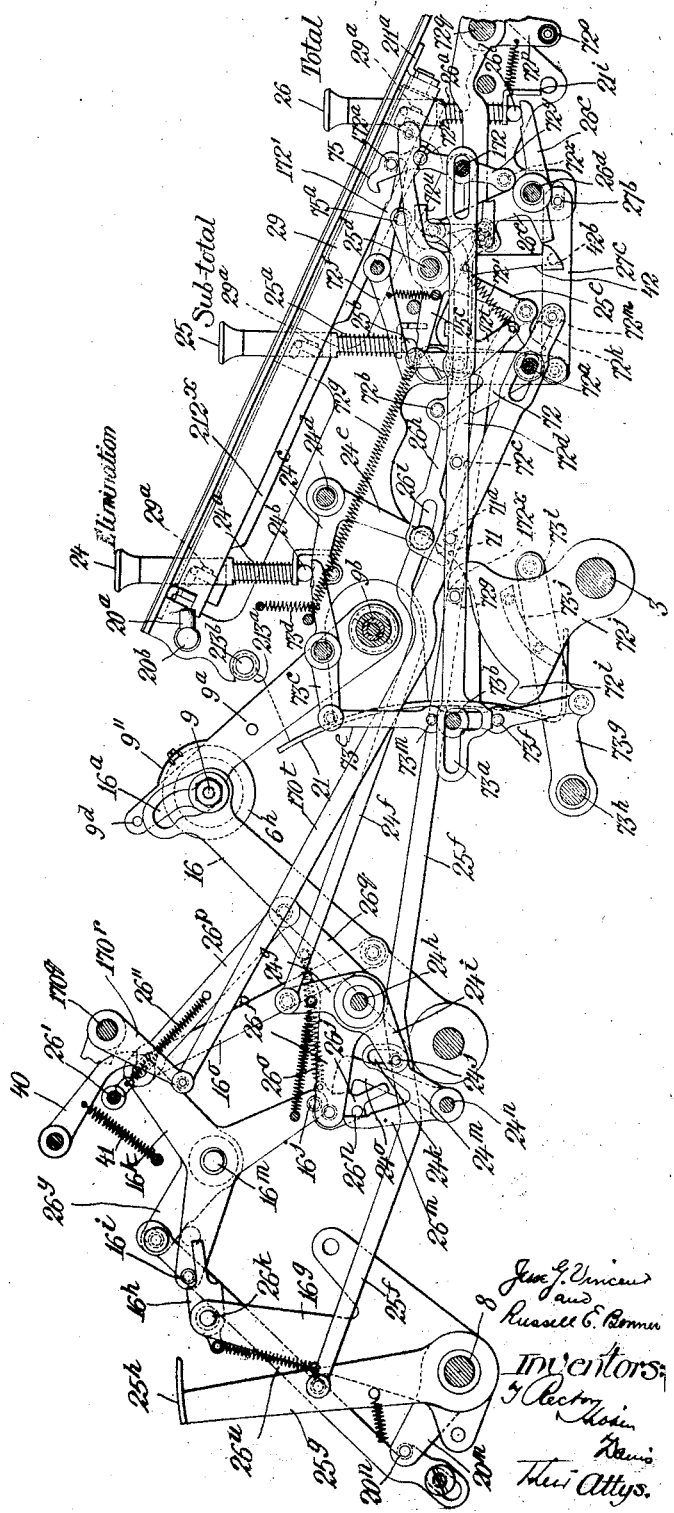

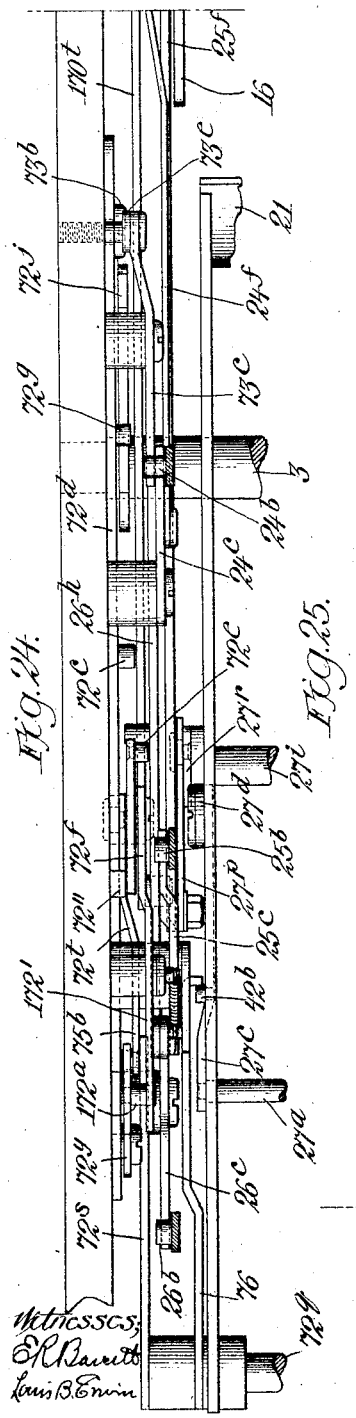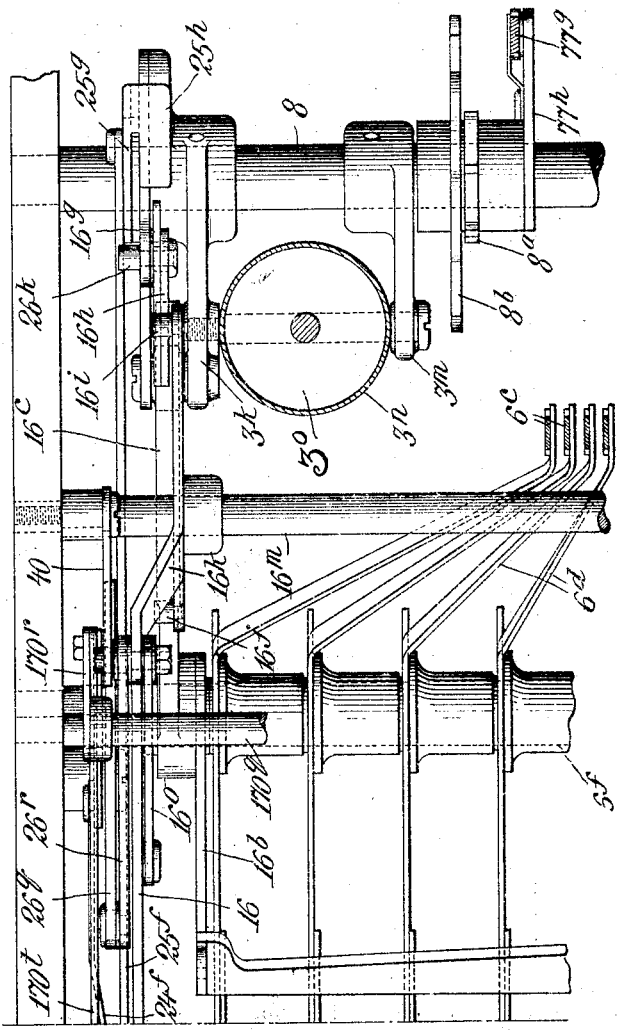

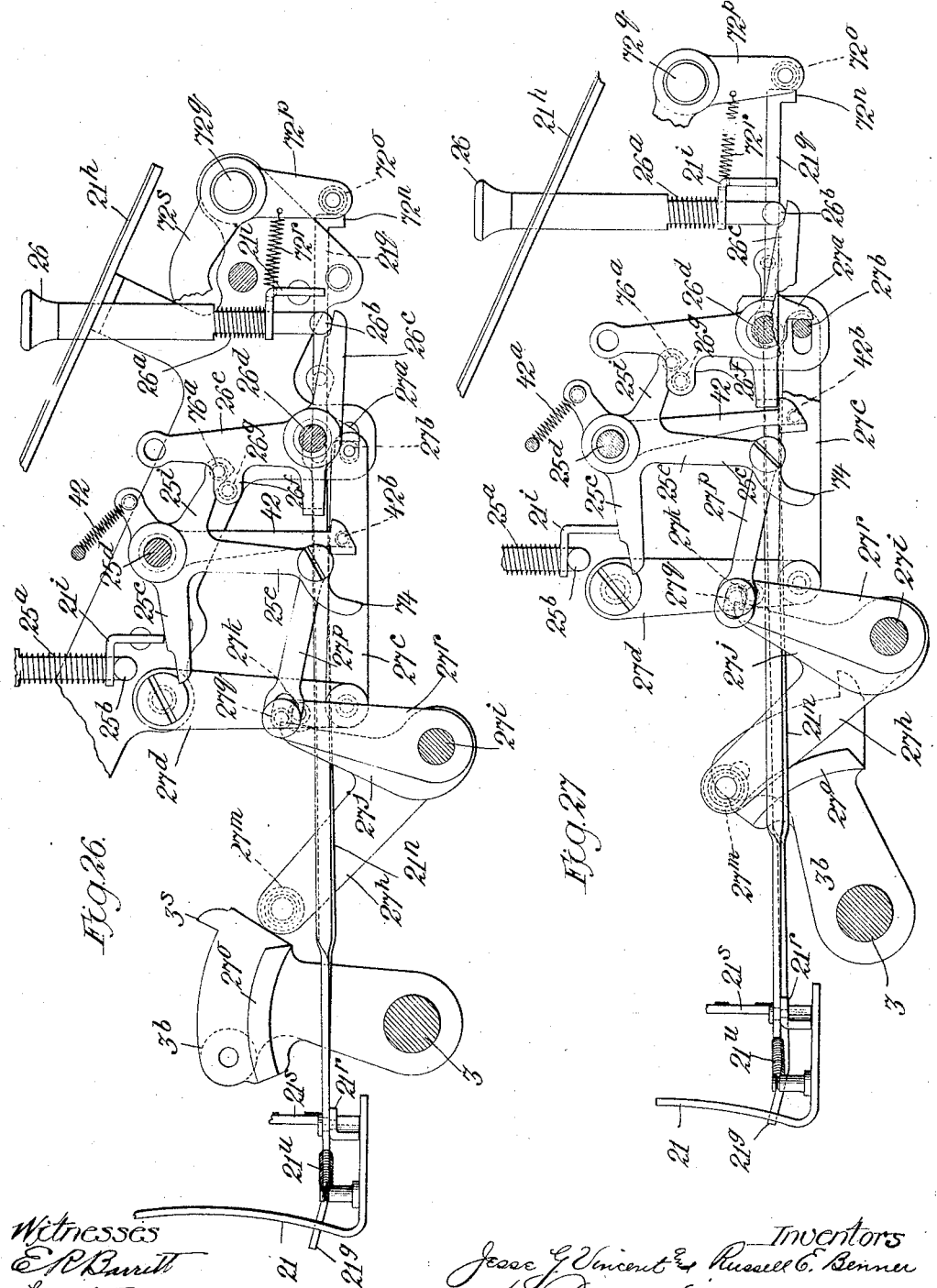

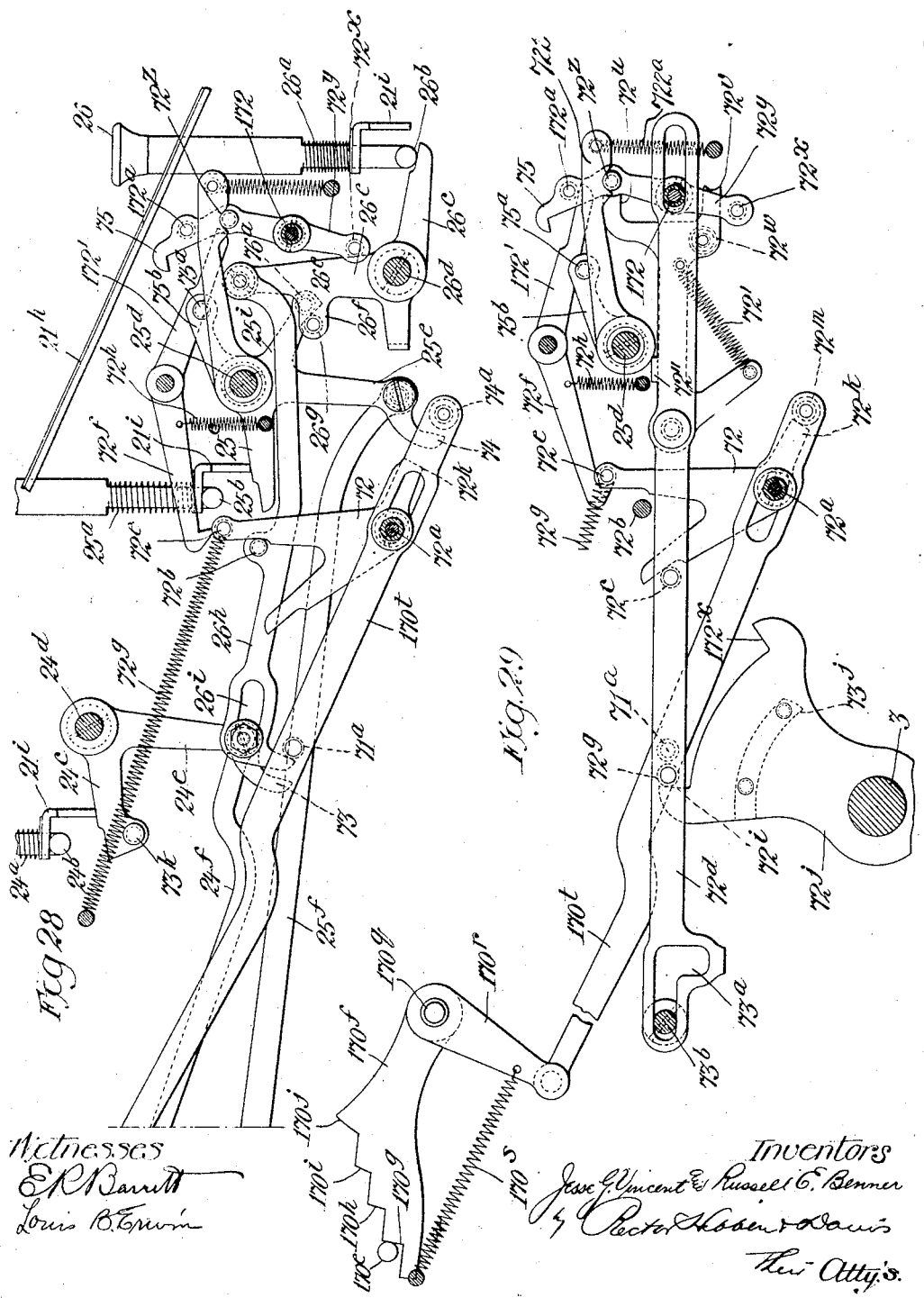

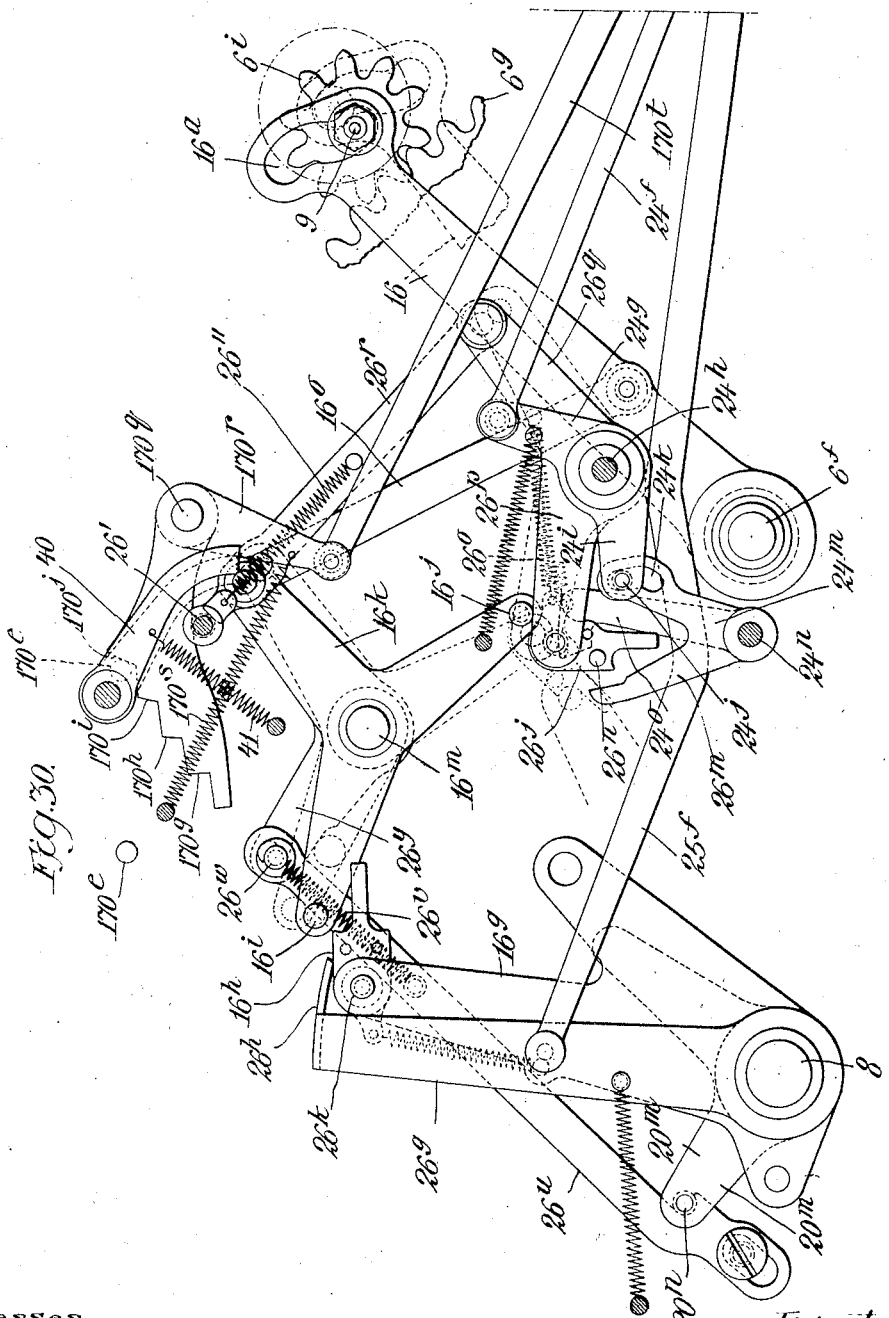

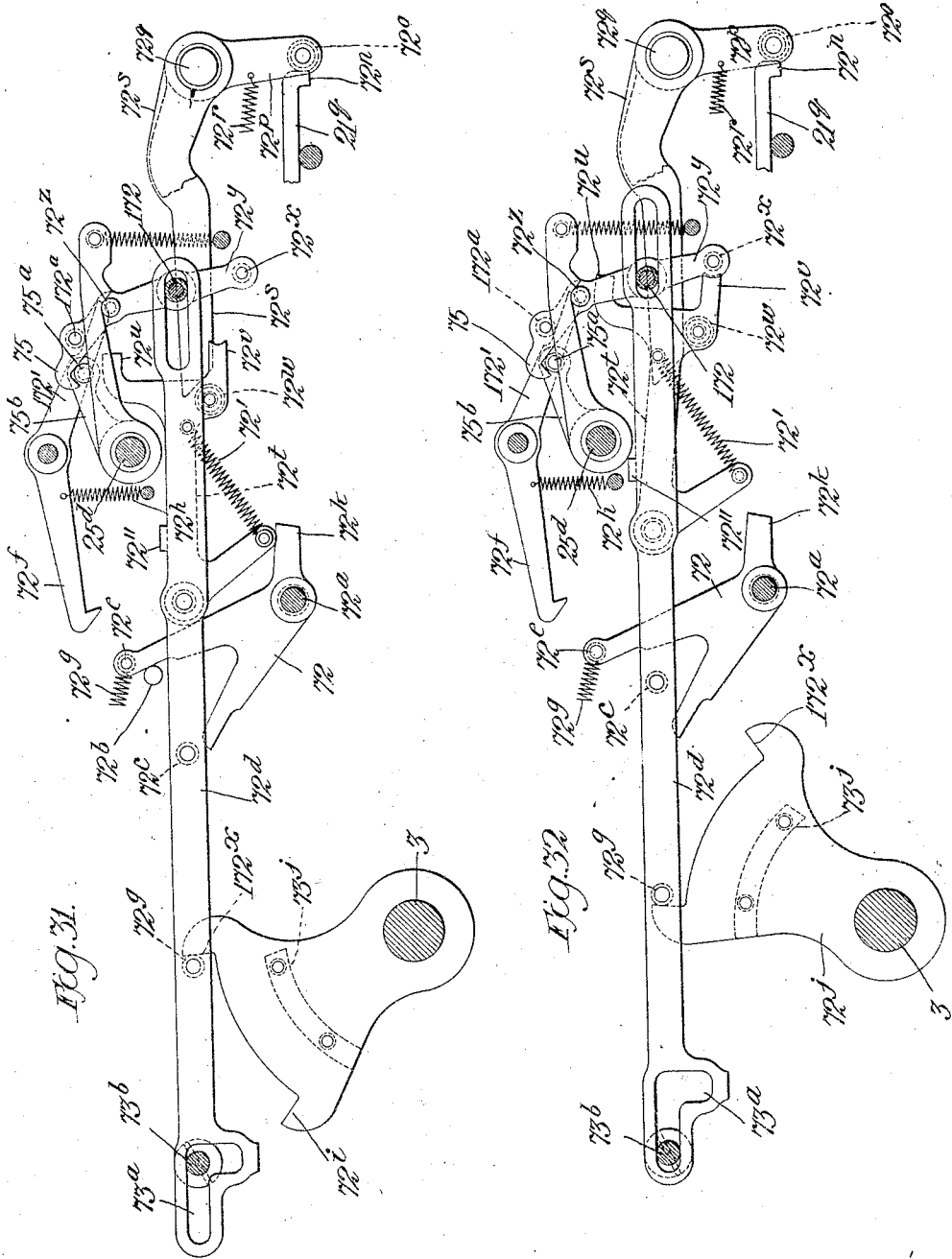

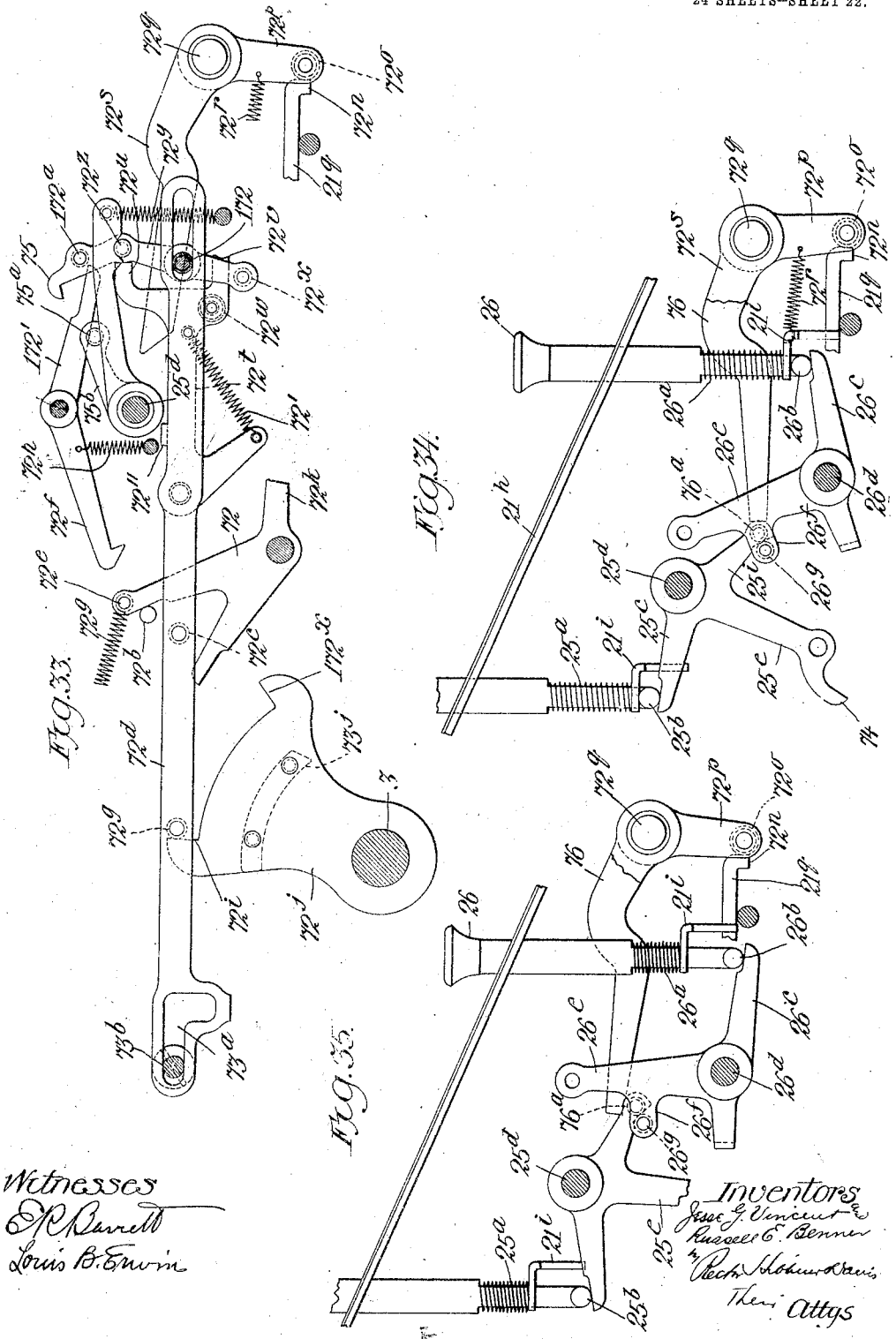

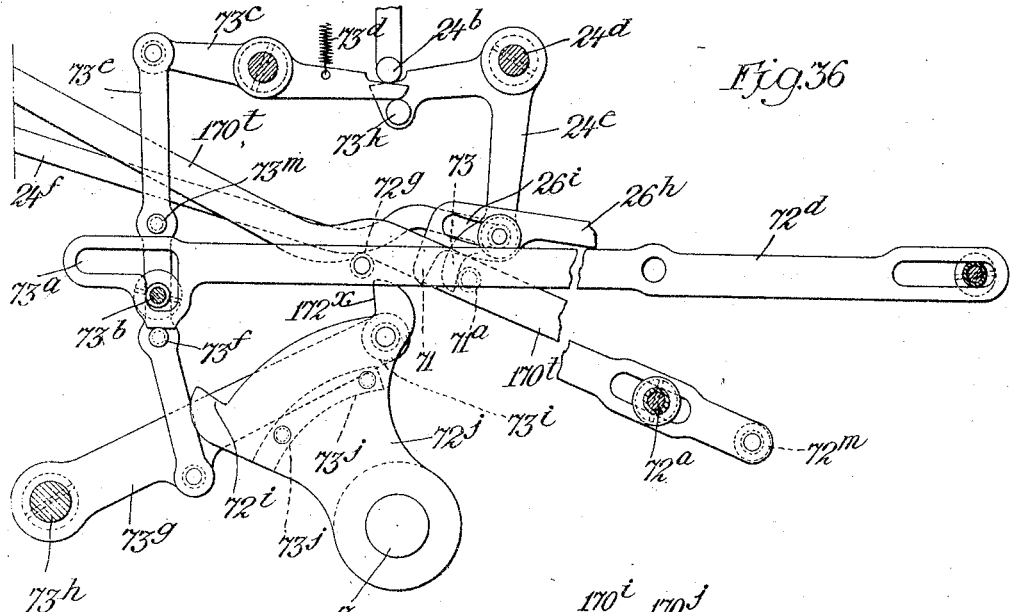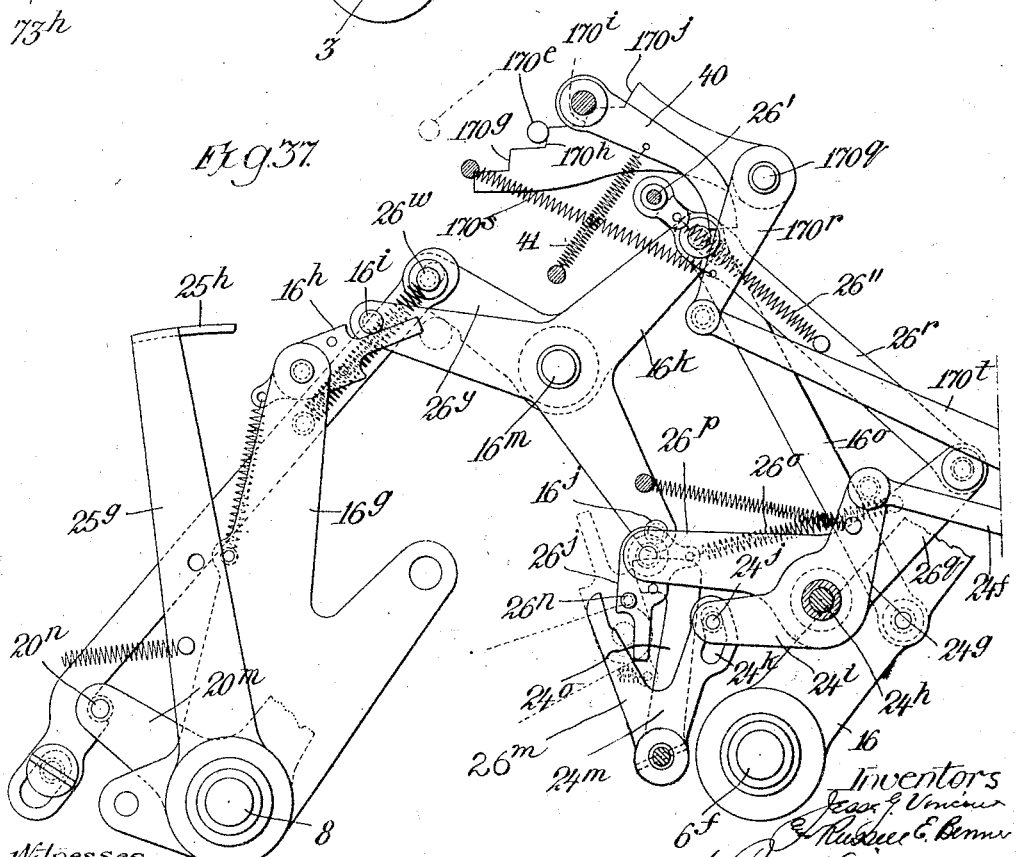

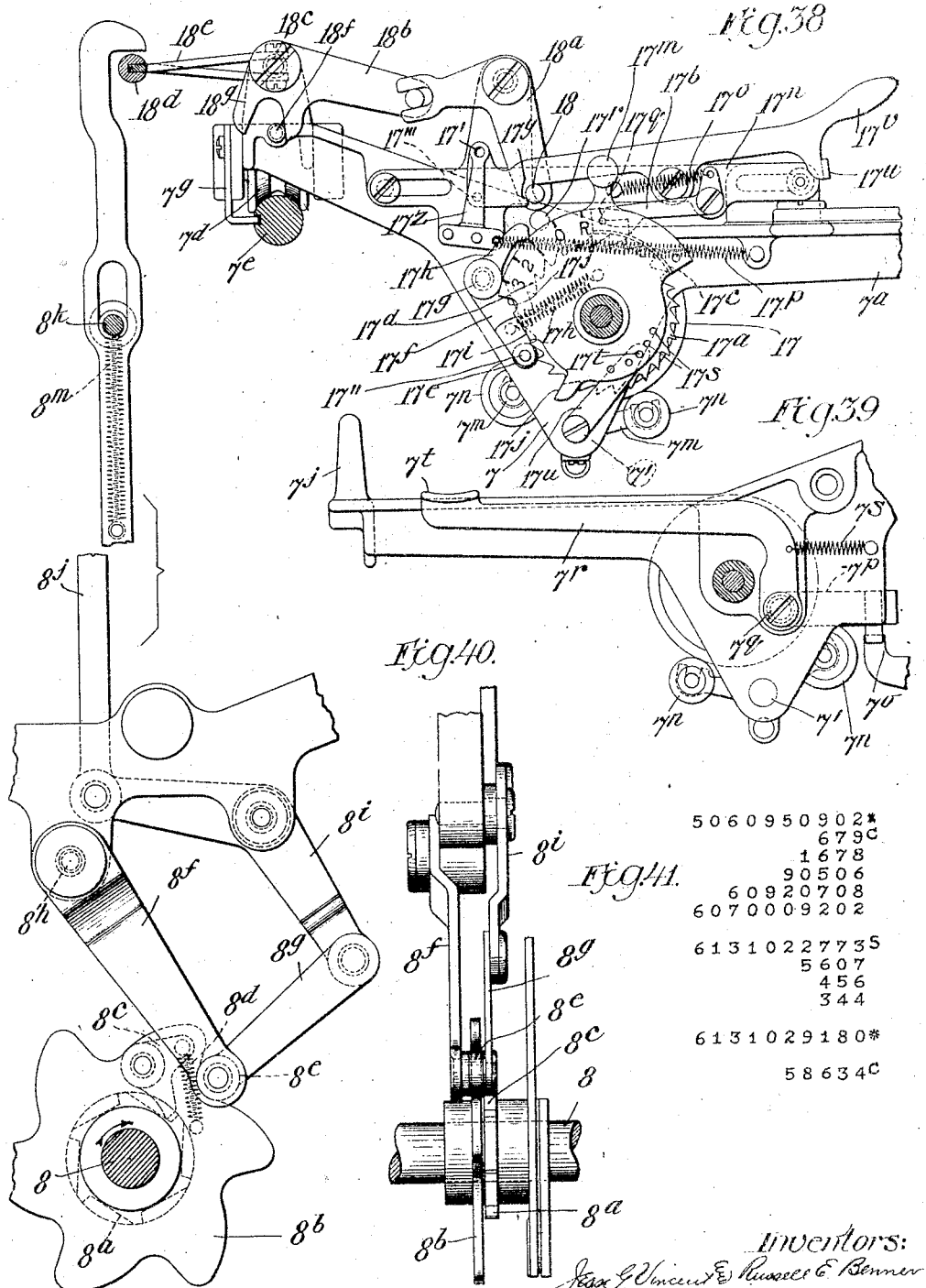

UNITED STATES PATENT OFFICE.

JESSE G. VINCENT AND RUSSELL E. BENNER, OF DETROIT, MICHIGAN, ASSIGNORS TO BURROUGHS ADDING MACHINE COMPANY, OF DETROIT, MICHIGAN, A CORPORATION OF MICHIGAN.

ADDING AND LISTING MACHINE.

1,028,162.  Specification of Letters Patent.  Patented June 4, 1912.

Application filed June 15, 1908.  Serial No. 438,659.

*To all whom it may concern:*

Be it known that we, JESSE G. VINCENT and RUSSELL E. BENNER, citizens of the United States, residing at Detroit, in the county of Wayne and State of Michigan, have invented certain new and useful Improvements in Adding and Listing Machines, of which the following is a specification.

The invention may be said to have for its general object a somewhat extensive reorganization of an adding and listing machine of the well-known Burroughs type so as to effect various improvements in the manner of performance of such functions as a modern machine of this character is expected to perform when developed to the highest point; also to better adapt such a machine for combined use with a typewriting machine.

The adaptation of the machine to combined use with a typewriter embraces reorganization whereby the keyboard is lowered and the printing is done at the front above the keyboard so that the same roller platen may serve for both typewriting and amount printing and in either case the writing or printing will be "visible" in the sense that term is commonly employed in the typewriter art. Another feature which adapts the present machine to effective combination with the typewriting machine is the arrangement of the line-spacing or feed mechanism to either be operated automatically or by hand, according to adjustment.

Aside from adaptability for combined use with a typewriting machine, a prominent feature of the present invention, which represents an advance in the adding machine art, is that of releasing depressed amount keys at an intermediate stage in an operation of the machine and permitting the depression of the same or other amount keys before that operation of the machine concludes, thus satisfying all requirements in the matter of speedy operation. It will be understood that the usual mode of operating an adding machine of the Burroughs type is for the user to arrange the checks or whatever data is being consulted, at the left of the machine to be handled with the left hand, and to finger the keys with his right hand and also operate the handle of the machine with the right hand. With the ordinary construction of the machine wherein the depressed amount keys do not rise until the operating handle returns to normal, an exceptionally speedy operator is hampered because of having to await the return of the handle before setting up a new amount. By the present invention the depressed amount keys are released as the handle reaches the forward end of its stroke and the operator may thereupon immediately depress other keys. The particular object of the invention in this regard may be said to be to so reorganize a machine of the Burroughs type that the key stops and coacting abutment pieces or catch projections of the registering or accumulating mechanism will effectively coöperate in performing their usual functions of measuring excursions of the accumulator actuating racks or like devices, and will also provide for the return of the actuators, notwithstanding the key-stops may have been projected by depression of keys while said actuators were out of normal position. It will be understood that the actuators, *i. e.*, such of them as are associated with depressed amount keys, will necessarily be out of normal position when the handle is at the forward end of its stroke. It is at this point that the depressed keys are released and their repeated depression or depression of other amount keys permitted. Consequently key-stops may be projected into the paths of the abutment pieces or catch projections of the actuators when the latter are returning to normal. Hence provision must be made for permitting such abutment pieces or catch projections passing by the projected key-stops and at the same time coacting with them to limit the succeeding advance of the actuators.

The machine is equipped with an error or correction key to perform the familiar function of releasing erroneously depressed amount keys before starting to operate the machine. The particular feature of the present invention in this connection is the automatic locking of such key against depression during an operation of the machine. Thus, immediately upon the operating handle starting forward a lock comes into play to absolutely prevent depression of the correction key and thus effectually guard against erratic performance of the machine.

As a further feature of the keyboard arrangement, provision is made for convenient location of column release keys, i. e., a set of special keys one for each column of amount keys, the depression of any one of such special keys releasing any amount key which may have been depressed in the particular column with which that particular special key is associated.

Still referring to the keyboard, a feature of the invention is an arrangement whereby keys which inaugurate an operation of the machine for taking either a total or a sub-total, as well as the key for causing elimination of a number from the accumulation, will, when depressed, become immediately latched down instead of having to be held depressed until the operating handle is started, said keys being in the present instance unlatched through the same means that unlatch depressed amount keys, but the parts set by such special keys being locked by other means as soon as the handle is started and released automatically at the conclusion of the operation of the machine.

A further feature of the invention in connection with the keyboard is an arrangement whereby the same may readily be converted from the so-called "flexible" variety to the so-called "locked" variety. In other words, the keyboard may be arranged so that depression of a key in a bank or row will cause all the other keys of that bank or row to become locked against depression and to so remain until the depressed key is released, or so that the depression of an amount key in any row may take place, notwithstanding a key in that row has already been depressed, and with the result of releasing the first depressed amount key.

In connection with the driving mechanism of the machine the invention provides for a short, easy and uniform handle pull. Furthermore provision is made for eliminating a difficulty sometimes encountered in connection with the devices heretofore employed for preventing premature return of the handle and parts directly or positively connected therewith. In these machines it is customary to provide a yielding form of connection between the handle and the parts driven by it. This is for the purpose of preventing derangement of the machine by a too vigorous use of the handle. Premature return of the handle after a quick forward stroke is ordinarily prevented in a Burroughs machine by the straightening and slight movement beyond of a toggle joint, and some one of the parts driven through the medium of the yielding connection is arranged to cause a reverse movement and breaking of the toggle joint to release the handle. A difficulty has heretofore been encountered after parts have become somewhat worn, by reason of this toggle joint failing to break automatically as it should. The present invention entirely obviates this difficulty while at the same time thoroughly protecting the parts from derangement by jerking the handle. A toggle joint is still employed but means are provided to render it effective without requiring it to go beyond straightening.

In connection with the accumulating devices the invention provides an improved form of transfer or carrying mechanism which is exceedingly speedy in action and simplified in construction by reducing the number of its component parts. Thus the retraction or resetting of latches employed to hold the transfer pawls displaced is accomplished by the racks themselves which partake of additional movement in effecting the carrying, whereas in the previous construction a restoring bail and connections for operating the same have been employed to retract the latches.

The accumulator structure is specially organized for lightness in weight so that the minimum of energy will be required to shift it back and forth and the form of means for so shifting it is such as to provide for insuring correct engagement between the accumulator and its actuators. The lightness of the structure is not only advantageous with this form of shifting means but this characteristic in the rotating elements makes for speedy carrying or transfer operation. In connection with the accumulator it may be mentioned that provision is made for locating the number wheels or dials most advantageously for reading, the same being plainly visible just above the keyboard.

In connection with the control of the accumulator in the taking of totals and sub-totals and particularly the withdrawal of initial stops which ordinarily obstruct the actuators or racks when no amount keys are depressed, provision is made for relieving the total and sub-total keys themselves of all the actual work of withdrawing such stops. Thus, the pressure on either key is merely required to be sufficient for bringing into coöperative relation certain devices worked from the operating handle to effect the withdrawal of the initial stops. This obviously provides for a much lighter touch in the use of total and sub-total keys and therefore greater speed of manipulation, as also greater certainty in manipulation of the keys as no appreciable resistance is encountered to the depression of the keys.

The printing mechanism of the machine is organized to provide for a thoroughly practical automatic method of variously characterizing the imprints. In this connection provision is made for printing special characters whereby totals and sub-totals can be definitely distinguished from each other and from other imprints and whereby imprints of unaccumulated numbers can be definitely distinguished from imprints of accumulated numbers and as well as from totals and sub-totals, and further whereby the first accumulated item of a list will be characterized to distinguish it from other items so as to denote a clear condition of the accumulator at the time of printing such first item. The invention further provides, in connection with the printing mechanism, means for automatically enforcing proper alinement of the type.

Another feature of the invention is an arrangement for preventing rebound of racks and type carriers and the consequent printing and adding of false amounts.

A still further feature of the invention is the locking of type carriers and racks against advance upon withdrawal of key stops.

Throughout the machine springs are done away with wherever possible and safeguards are provided to prevent erroneous manipulation or movements of the various parts. Furthermore the parts are so organized as to provide for sectional assembling. For example, the entire keyboard, including the keys and the special pieces operated by them can be separately assembled and then placed as a whole in proper relation to the other parts of the machine. So likewise the transfer or carrying devices are assembled as a distinct section of the machine.

With the above stated and incidental objects in view, the invention consists in certain novel features of construction and combination of parts, the essential elements whereof are recited in the appended claims and a preferred form of embodiment of which is illustrated in the accompanying drawings and described in detail hereinafter.

Of said drawings, Figure 1 represents a top plan view of the machine as a whole; Fig. 2 represents a right hand side elevation of the same with the inclosing casing in section and the near side frame piece omitted and various studs in section as also the superstructure comprising a laterally-movable paper carriage; Fig. 3 is a right side elevation of the keyboard section of the machine with the near side piece of the frame omitted and certain parts in section; Fig. 4 is a sectional plan view of the keyboard, the key stems being represented in section and some parts being broken away to disclose others beneath them; Fig. 5 is a fragmentary right side elevation illustrating the operation of an amount key in withdrawing the initial stop while setting its own stop, and swinging a bail which coöperates with the special character printing devices; Fig. 6 represents a rear elevation of a portion of the keyboard; Fig. 7 represents a partial front elevation of the keyboard showing the column release keys; Fig. 7ª is a partial plan view of the machine with parts broken away; Fig. 8 is a right side elevation of that portion of the keyboard, comprising the correction and repeat keys, this view also illustrating parts of the mechanism for automatically releasing depressed amount keys; Fig. 9 is a plan view of parts appearing in elevation in Fig. 8; Fig. 10 is a right side elevation of driving mechanism illustrating devices for preventing premature return of the operating handle; Fig. 11 is a somewhat similar view illustrating a changed relation of parts due to the drawing forward of the operating handle, also illustrating by dotted lines the tripping of parts which results in releasing the handle for the return stroke; Fig. 12 is a plan view of that portion of the machine comprising the racks, their carriers and the driving devices of the machine; Fig. 13 represents a plan view of the accumulator and transfer mechanism; Fig. 14 represents a portion of the accumulator in axial section; Fig. 15 represents a perspective view of transfer or carrying devices; Fig. 16 is a right side elevation of the accumulator and its actuating and transfer mechanisms; Fig. 17 is a detail elevation of the transfer devices illustrating the same out of normal as a result of a transfer projection on one of the adding pinions having tripped a transfer pawl; Fig. 18 is a similar view illustrating the parts as they would appear when a transfer had been made but the rack not returned to normal; Fig. 19 represents in right side elevation portions of the accumulating and type carrying devices, dotted lines illustrating changed positions due to depression of keys and the drawing forward of the operating handle; Fig. 20 is a right side elevation of printing mechanism illustrating the means for tripping the printing hammers and also indexing means for the special type carrier; Fig. 21 is a rear elevation of parts appearing in side elevation in Fig. 20; Fig. 22 is a view somewhat similar to Fig. 21 but illustrating a changed relation of parts due to the operating handle being at the forward end of its stroke; Fig. 23 is a left side elevation of certain parts coöperating with the special keys at the left of the keyboard, to-wit, the total, sub-total and elimination keys, this view extending to the devices whereby control of the accumulator is had; Fig. 24 is a plan view of parts appearing in Fig. 23; Fig. 25 represents a continuation of Fig. 24, the horizontal broken lines indicating the point where these two views would connect; Fig. 26 is a left side elevation of parts for withdrawing the initial stops as a result of depressing the total or sub-total keys; Fig. 27 is a similar view illustrating a changed relation of parts due to the operating handle being at the forward end of its stroke; Fig. 28 is a left side elevation of mechanism controlled by the special keys, the total key being illustrated as depressed; Fig. 29 is a similar view illustrating the changed relation of parts resulting from the drawing forward of the operating handle, this view illustrating the special character indexing device not appearing in Fig. 28 for lack of space; Fig. 30 represents in left side elevation parts in rear of those illustrated in Fig. 28, illustrating the effect on those parts of depression of the total key and the drawing forward of the operating handle under such conditions; Fig. 31 is a view somewhat similar to Figs. 28 and 29, illustrating the locking of the total and sub-total keys against depression until a blank stroke is taken after one or more items have been accumulated; Fig. 32 is a similar view illustrating a changed relation of parts due to the operating handle having been drawn all the way forward; Fig. 33 is a view similar to Fig. 32 but illustrating a changed relation of the parts due to the taking of a blank stroke; Fig. 34 is a detail left side elevation illustrating the locking of the total and sub-total keys as a result of depressing amount keys; Fig. 35 is a somewhat similar view illustrating the reverse effect, to-wit, the locking of amount keys by depression of the total or the sub-total key; Fig. 36 is a side elevation of parts associated with the elimination key, the same being shown relatively positioned as the immediate result of depression of said key; Fig. 37 is an elevation of parts in rear of those shown in Fig. 36, this latter figure also illustrating the effect of depressing the elimination key; Fig. 38 represents a left side elevation of the laterally shiftable paper carriage and connections for effecting an automatic line-spacing, one element of such connections being broken to economize space; Fig. 39 represents a right side elevation of a portion of said carriage; Fig. 40 is a rear elevation of the mechanism shown in the lower part of Fig. 38; and Fig. 41 represents an example of work done by the machine, the same showing a list of imprints and the special designations of the same to distinguish accumulated, unaccumulated, total and sub-total amounts.

*General features.*—A hollow open-top base casting 2 of rectangular outline supports the frame-work in or on which the various working parts are mounted and also supports an inclosing casing comprising an inclined open-center top portion $2^a$ at the front surrounding the keyboard, and a rear portion $2^b$ rising somewhat higher than said front portion and preferably having paneled sides. Under the front inclined low portion $2^a$ of the casing are contained the stop devices which are operated by the amount keys. The mechanism which coöperates with such stop devices for accumulating and printing amounts is contained in the rear portion $2^b$ of the casing, the accumulating mechanism being in the lower part thereof and the printing devices at the upper part. It will be seen that this location of the accumulating mechanism permits the lowering of the keyboard as compared with a machine in which the accumulating mechanism is below the keyboard. This accumulating mechanism is also so located and arranged as to provide for the printing devices extending above such mechanism and far enough to the front to provide for visible printing after the manner of certain well-known styles of typewriting machines, to which end a roller platen 17 is arranged much the same as in a typewriting machine, being carried by a laterally shiftable superstructure supported on the top part of the casing.

As before mentioned the present adding and listing machine has been devised with a view to its combination with a typewriting mechanism and when so used the same roller platen will be common to both departments of such combined machine. It will be seen that a roller platen located as above described may serve such end.

The amount types 6 are mounted in series of tens on segmental plates $6^a$ swung upon a cross-shaft or rod $6^b$ in rear of the platen but the shape of these plates is such as to provide for the series of types being moved up in front of the platen varying distances. Hammers 70 stand forward of the type-carriers and are adapted to strike rearwardly against the types driving them upon the front of the platen, thus providing what is termed in the typewriter art a "front strike", lending itself to so-called "visible" printing. An ink ribbon will extend across in front of the platen where the type carriers will rise in front of the ribbon, the latter being suitably guided by brackets 90 and wound upon and unwound from spools, one of which is shown at $90^a$ in Fig. 2.

The segmental type-carrying plates $6^a$ are connected by elongated links $6^c$ with rearwardly-projecting converging arms $6^d$ (Fig. 12) of rack carriers $6^e$ mounted loosely upon a rock shaft $6^f$ at the lower central portion of the machine. The racks $6^g$ on these carriers face toward the front of the machine just in rear of the low part of the casing and the numeral wheels or dials $6^h$ are located to be visible just under a glass-covered opening $2^c$ provided beyond the keyboard in the inclined portion $2^a$ of the casing. The said number wheels or dials carry pinions $6^i$ engageable with and disengageable from the racks $6^g$.

It will be seen that the above-described general make-up of adding machine adapts it for combination with a typewriting machine both on account of the arrangement of the platen and "front strike" printing devices and on account of having a keyboard which can be on the same plane as that of a typewriting machine placed alongside.

The machine is here shown arranged to be operated by a handle $3^a$ located outside the casing at the right as shown in Fig. 1 and being secured to a rock shaft 3 journaled in the base 2 under the keyboard, said handle projecting above the top plane of the keyboard to the right of the sight opening $2^c$. The operation is the familiar one of pulling forward this handle as far as it will go,—in the present instance through approximately forty-five degrees—and then releasing it to be returned by springs.

*Amount indexing devices*, (Figs. 1, 2, 3, 4, 5, 6 and 7).—On curved downward extensions 60 of the sector-shaped rack carriers 6 there are pivotally mounted abutment pieces $60^a$ with beveled backs and straight top edges. These abutment pieces have stop fingers engaging projections struck up out of the rack carriers and springs $60^b$ project the beveled portions of the abutment pieces beyond the front edges of said arms, said stops limiting the amount of projection.

There is fixedly mounted between the side frame pieces of the machine, just forward of the segmental racks $6^g$, a vertically arranged plate 21 curved to correspond with the curvature of the segmental racks and formed with vertical rows of equidistant apertures for the accommodation of vertical rows of stop blades ten in each row with any one of which the associated abutment piece $60^a$ may coöperate to determine the extent of movement of the rack carrier. Nine of these blades in each row, the same being designated by the numeral $21^a$, are normally retracted, these constituting the amount key stops and being formed upon the rear ends of rods $21^b$ having downwardly-extending front portions obliquely slotted as at $21^c$ (Fig. 3) to receive pins or studs $21^d$ on the lower ends of the stems $21^e$ of the amount keys $21^f$ respectively. The latter are arranged in several parallel rows running from front to rear and the keys of each row are inscribed with numerals from 1 to 9. The remaining stop blades $21^g$ normally protrude rearwardly from the plate 21 for the purpose of having the abutment pieces $60^a$ encounter them and thus limit the movement of the type-carrying levers so as to set up the zero type for printing.

The stems $21^e$ of the amount keys slide through slots in a keyboard plate $21^h$ which occupies the opening of that portion of the casing inclining downward at the front of the machine forward of the sight opening $2^c$. The key stems are further guided by slots in a series of transversely extending angle brackets $21^i$ below the horizontal portions of which extend the stop rods $21^b$. The keys are normally upheld by springs $21^j$ surrounding the stems between the said brackets and suitable shoulders on the keys. It will be obvious that depression of any key will cause rearward longitudinal movement of its stop rod by reason of the cam action between the stud $21^d$ and the oblique slot $21^c$. The rods are supported and guided at their forward ends by cross rods $21^k$ which extend beneath them and run from side to side of the frame supporting the indexing devices now being described. The stop rods have short forward extensions $21^m$ so that one cross rod $21^k$ serves to support two stop rods of a series. For instance, the uppermost stop rod of a series is supported at its forward end by reason of the engagement of its forward extension $21^m$ over the cross rod $21^k$ which extends under and supports the next lower stop rod by engaging under that portion thereof just in rear of the obliquely slotted portion. Thus the number of supporting cross rods can be reduced. The stop rods are held from lateral displacement at their forward ends by engagement with slots in the vertical portions of the angle brackets $21^i$, as illustrated in Fig. 3, each stop rod being thus guided by two of the angle brackets by reason of the fact that the forward extension $21^m$ engages the slot of the next lower bracket to that one in which the rod engages in rear of its obliquely slotted portion.

It is not only necessary that the depression of an amount key shall thrust its associated stop blade into the path of the abutment piece $60^a$, but by the same act the initial stop blade $21^g$ must of course be withdrawn from the path of said abutment piece. The initial stop blades are formed upon the rear ends of rods $21^n$ which near their forward ends are slotted as at $21^o$ to engage studs $21^p$ on thrust rods $21^q$ extending on an angle to said rods $21^n$ as shown in Fig. 4 and jointed at their rear ends to crank arms $21^r$ on vertical rock shafts $21^s$ journaled in suitable bearings provided by a forwardly projecting portion of the plate 21 and the horizontal portion of an angle bracket $21^t$ similar to the brackets $21^i$ and serving a similar function in guiding the uppermost stop rods $21^b$. Spiral springs $21^u$ connecting the crank arms $21^r$ with fixed studs on the plate 21 serve to draw the rods $21^q$ rearwardly and thereby hold the initial stop blades normally projected rearwardly from the plate 21 in the paths of the abutment pieces $60^a$. Each vertical rock shaft $21^s$ has a series of nine lateral lugs $21^v$ (Figs. 3 and 5) projecting oppositely to the crank arms 21$^r$ and each of the stop rods 21$^b$ is formed with a downwardly and rearwardly projecting finger 21$^w$ in line with one of said lugs and extending immediately in front of the same, as clearly illustrated in Figs. 3 and 5. When an amount key is depressed and its stop rod thrust rearwardly the finger 21$^w$ operates upon a lug 21$^v$ and turns the shaft 21$^s$ against the stress of the spring 21$^u$ thus forcing the thrust rod 21$^q$ forward and withdrawing the initial stop blade 21$^s$ from the path of the abutment piece 60$^a$.

The amount keys are temporarily held in depressed position by the engagement of rounded lugs 21$^x$ (Fig. 6) formed upon the sides of their stems, with wide pawls or shutters 21$^y$ pivotally mounted under the keyboard 21$^h$ in angle brackets 21$^i$ and 211$^a$ and drawn into engagement with the key stems by springs 21$^z$ as shown in Fig. 6. There is one of these wide pawls or shutters for each row of keys and the depression of any key in the row displaces the shutter by the engagement of the rounded lug 21$^x$ with the same, and then the shutter springs in over the lug to hold the key depressed. The shutters at their upper ends have inclined projecting portions 20 (Figs. 3, 6 and 7$^a$) adapted to be operated upon with a camming effect by studs 20$^a$ on a rock shaft 20$^b$. The oscillations of this rock shaft serve to release erroneously depressed keys and also effect the automatic release of keys in the course of an operation of the machine. The shutters also have oblique projections 20$'$ at their lower ends with which coöperate inclined lower edges of lugs 210 (Fig. 7) on stems 210$^a$ of a set of column release keys 210$^b$. The latter are located at the front of the keyboard in line with the rows of amount keys respectively. Their stems slide through slots in the keyboard plate 21$^h$ and in an angle bracket 21$'$ and are upheld by springs 210$^c$, and limited in their upward movement by the abutment of studs 210$^d$ on said stems against the underside of the horizontal portion of said bracket. The keys are limited as to downward movement by abutment of arms 210$^e$ on the stems against a rock shaft 72$^a$.

When it is desired to have depression of an amount key lock other keys of the row against depression, sliding lock plates 212 (Fig. 3) are employed, the same having right angle slots 212$^a$ engaging over studs 212$^b$ on the sides of the key stems. Depression of a key causes its stud to act with a camming effect upon the front edge of that portion of the slot extending transversely of the plate, thereby drawing the latter forward and interlocking the studs of all other keys of the row with those portions of their slots extending longitudinally of the plate. A spring 212$^c$ draws the latter rearwardly to restore it when the depressed key rises.

The spring on the key also acts to thrust the plate rearward by reason of engagement of the stud 212$^b$ with the rear edge of the transverse portion of the right angle slot. The plates 212 are supported by the angle brackets 211 and 211$^a$ which are slotted to accommodate them. The upper bracket has right angle slots 212$^d$ (Fig. 6) in the vertical portions of which the plates 212 slide. The transverse portions of said slots provide for movement of the plates laterally in assembling so the slots of the plates can be engaged with the studs of the key stems. The plates have projections 212$^e$ (Fig. 3) to enter said transverse portions of the slots 212$^d$ when the plates are withdrawn from engagement with the vertical portions of said slots. Likewise the plates at their lower ends are notched as at 212$^f$ (Fig. 3) for engagement with contracted portions of slots 212$^g$ (Fig. 7) in the lower bracket 211$^a$. This construction which provides for lateral displacement of the lock plates greatly facilitates assembling. Thus the side frames having been erected and the angle brackets 21$^i$ secured between them and the angle brackets 211 and 211$^a$ having been secured in place, with the lock plates held by them, said plates can be slid endwise and then sidewise and so held while the key stems are inserted from below through the slots in the keyboard plate 21$^g$, the latter having meantime been screwed to the side frames. Sufficient clearance is provided to permit of the key stems being thrust up past the angle brackets and over the same, said stems being then dropped through the slots in said brackets. Of course it will be understood that the tops or heads 21$^t$ of the keys are removable from the stems as indicated in Fig. 3 and are applied after the stems having been inserted in the manner described. The key stems being in place the lock plates are shifted to engage their slots with the pins 212$^b$. By omitting or removing the lock plates the keyboard will obviously be converted into one of the "flexible" variety, i. e., one in which depression of a key will release a previously depressed key in the same row.

The entire indexing structure above described is assembled as a distinct section or department of the machine and may be bodily removed from the base 2. Its own side frame pieces have notches 213 (Figs. 2 and 3) engaging a cross rod 213$^a$ and have openings to accommodate a removable rod 213$^b$ which passes through an opening in the right side piece of the main frame and screws into a tapped opening in the left side piece of the latter (see Fig. 7$^a$). Thus the indexing section is held in place.

*Early key release*, (Figs. 2, 8 and 9.)— The employment of pivotally mounted abutment pieces such as above described is for the purpose of permitting depression of amount keys before an operation of the machine has concluded, thus allowing a speedy operator to continue manipulation without having to wait for the handle to return to normal position. In other words while the handle is returning to normal position the operator can be setting up a new amount on the keyboard. It will be obvious that if a key of lower amount is so depressed in a bank where a key of higher amount had previously been depressed, the abutment piece pertaining to this bank would have to pass by the stop blade of the key of lower amount in returning to normal position and then immediately resume a position for abutting such blade. It will be seen that the above-described construction provides for this.

The automatic release of depressed amount keys occurs as the operating handle 3ª reaches the end of its forward stroke. This is as soon as the operator could again manipulate the amount keys because up to that time his hand is necessarily applied to the operating handle. Therefore an arrangement which provides for the release of the keys at this point fully satisfies any demand as to adaptation for speedy operating. On the right-hand end of the rock shaft $20^b$ (Figs. 2 and 8) there is secured a crank arm or plate $20^c$ having an abutment stud $20^d$ and a second stud $20^e$ (Figs. 8 and 9) to which one end of a spring $20^f$ is attached, the other end of said spring being fastened to the supporting frame-work. Said spring holds the crank arm or plate $20^c$ against a fixed stud $20^g$ and maintains the shaft $20^b$ in position to hold its studs $20^a$ above the cam projections on the shutters. A lever $20^h$ pivoted on the cross rod $213^a$ is formed with a lug $20^j$ adapted to act against the stud $20^d$ and rock the shaft $20^b$ in opposition to the spring $20^f$. A spring $20^k$ normally retracts the lever $20^h$. The latter is adapted to be rocked in opposition to the last-mentioned spring as the operating handle reaches the end of its forward stroke but of course this is not done through direct or positive connections with the handle but through the medium of a rock-shaft 8 which is the prime mover for the timed parts of the machine and is yieldingly connected with the operating handle $3^a$ in a manner hereinafter described. An arm $20^m$ (Fig. 2) secured to the shaft 8 carries a stud $20^n$ adapted to operate against the laterally-turned rear end of a long bar $20^o$ having a slotted rear portion supported on a fixed stud and being drawn rearwardly by a spring $20^p$. This bar extends forward past the lever $20^h$ (Fig. 8) and carries a pivoted latch $20^q$ whose rear end is hooked to engage a stud $20^r$ on said lever $20^h$, which is preferably duplex below the rod $213^a$ (Fig. 9). A spring $20^s$ attached at one end to a projection of the latch and at the other to a projection of the long bar operates to enforce engagement between said hooked end of the latch and said stud. The forward end of the long bar is slotted as at $20^t$ to embrace a fixed stud $20^u$. The forward thrust of the bar caused by the rocking of the shaft 8 and occurring as the handle reaches the end of its forward stroke, results in a rocking of the lever $20^h$ by reason of the action of the hooked end of the latch $20^q$ against the stud $20^r$, and this obviously has the effect of rocking the shaft $20^b$ and releasing depressed amount keys, it being understood that the hook is normally engaged with the stud as shown in Fig. 1. Of course as the handle returns the long bar moves rearwardly and the parts which were operated thereby return to normal so that the keys thereafter depressed will be held down. While keys can therefore be depressed as soon as the handle comes to the end of its forward stroke, they will not be latched down until the handle starts back and the shutters are released. But of course in rapid operation this takes place so quickly that by the time the operator can get amount keys depressed after letting go the handle, the shutters will be ready to act. The release of depressed keys in the manner above described of course results in return of zero stops to effective position and in case no keys are immediately depressed for the setting up of a new amount or in case a new amount which is immediately set up does not call for depression of a key or keys in a row or rows used in setting up the previous amount, then the zero stops remain in effective position and the catches wipe over them and as the second operation starts will abut them to set cipher types; otherwise the zero stops after being restored to normal are immediately retracted again.

*Repeat mechanism*, (Figs. 1, 2, 8 and 9.)— The means whereby the machine may be adjusted to indefinitely accumulate the same amount, necessarily operate to disable the automatic key-releasing devices.

The numeral 22 designates the repeat key which is preferably located near the lower right-hand corner of the keyboard, being similar in form to the amount keys but allowed slight play back and forth in the slot provided for it in the keyboard $21^h$ so as to provide for the key being caught and held down, its stem being notched so that it can be interlocked with said keyboard plate for such purpose. At its lower end the stem of this key slides through a slot in an extension of the lowermost angle bracket $21^i$ and has a stud $22^a$ engaging above one arm $22^b$ of a bell crank lever, the other arm $22^c$ of which is connected by a link $22^d$ with an arm $22^e$ of a bell crank lever pivoted upon the pivot stud $20^u$ and whose other arm $22^f$ carries a stud 22ᵍ engaging under the forwardly projecting arm of the latch 20ᵠ. The key 22 is normally upheld by a spring 22ʰ and the bell crank arm 22ᶜ drawn back by a spring 22ⁱ, so the latch spring 20ˢ is permitted to maintain the engagement between the hooked rear end of the latch and the stud 20ʳ. However, when the key 22 is depressed the consequent rocking of the bell crank 22ᵇ—22ᶜ and of the bell crank 22ᵉ—22ᶠ causes the stud 22ᵍ to rock the latch 20ᵠ and disengage the same from the stud 20ʳ. Consequently the forward thrust of the bar 20ᵒ has no effect to release depressed keys and such keys will remain depressed as long as the repeat key is held down.

*Correction or error key mechanism*, (Figs. 1, 2, 8 and 9.)—It is of course desirable to provide for quickly releasing any number of depressed keys by hand before an operation of the machine starts, so that error in setting up an amount may be readily corrected. The numeral 23 designates a key employed for such purpose, being mounted to slide through the keyboard plate the same as the amount keys and preferably being located at the right-hand side of the amount keys at a point in rear of the repeat key. The stem of this correction or error key slides through a slot in an extension of one of the angle brackets 21ⁱ and below the same carries a laterally-projecting stud 23ᵃ overlying the forwardly-extending arm 23ᵇ of a three-armed lever, the upstanding arm 23ᶜ of which is coupled to a link 23ᵈ extending rearwardly and slotted in the arc of a circle as shown at 23ᵉ to embrace a stud 23ʰ on the inner division of the lever 20ʰ (Fig. 9). The said correction or error key is normally upheld by a spring 23ᶠ and a spring 23ᵍ applied to the upstanding arm 23ᶜ of the three-armed lever holds said arm rearward and the link 23ᵈ rearward so that the stud 23ʰ can freely traverse the slot 23ᵉ in the described automatic release of depressed amount keys. It will be obvious that depression of this correction or error key by rocking the three-armed lever will draw the link 23ᵈ forward and by the action of the rear end of the slot 23ᵉ on the stud 23ʰ, rock the lever 20ʰ and effect the release of the depressed keys.

Of course the correction or error key should not be depressed during an operation of the machine. To guard against any such misuse of the key in question a lock is provided to absolutely prevent depression of that key during an operation of the machine. To this end the forwardly-extending arm 23ⁱ of the three-armed lever is formed with a series of upwardly-directed ratchet teeth 23ʲ and a depending arm 23ᵏ swung from the pivot stud 20ⁿ is formed with downwardly-directed ratchet teeth 23ᵐ for engagement with the teeth 23ʲ. The same spring 23ᵍ which acts on the three-armed lever is utilized to draw said depending arm rearwardly for the purpose of interlocking its ratchet teeth with those of the three-armed lever and thus absolutely preventing depression of the correction or error key. These ratchet toothed parts are of course normally held apart. This is provided for as follows: An arm 3ᵇ secured to the handle shaft 3 is formed with a lug 3ˢ which normally restrains the arm 23ᵏ by presenting an abutment to the lower extremity of the latter. It will be obvious that as the handle starts forward and said lug retreats, the arm 23ᵏ follows it and becomes immediately interlocked with the three-armed lever. Then of course when the handle returns to its normal position the locking arm is moved rearward again so as to leave the correction key 23 free to be depressed.

*Driving mechanism*, (Figs. 2, 10, 11 and 12.)—The driving mechanism of the machine is not unlike that ordinarily employed in the Burroughs machine though there are differences adapting it to the changed relative positioning of departments of the machine as well as other innovations making for improvement, which will hereinafter be pointed out.

The segmental upper end portion of the before-mentioned arm 3ᵇ on the handle shaft 3 is connected by a link 3ᶜ with a full-stroke sector 3ᵈ secured to a rock shaft 3ᵉ which is located half way between the shafts 3 and 6ᶠ. This shaft 3ᵉ carries a series of arms 3ᶠ (Fig. 12) connected by comparatively strong springs 3ᵍ with the base casting 2. These are the main motor springs which restore working parts moved in opposition to such springs by the forward swing of the handle 3ᵃ. Complete movement of such handle is insured in the usual way by having a pawl 3ʰ ride over the notched edge of the full-stroke sector 3ᵈ, dropping into cavities beyond the notched portion of the sector to provide for automatic reversal in action. Motion is as usual transmitted from the full-stroke shaft to other working parts of the machine through the medium of a spring under regulation of a dash-pot, for the purpose of protecting the mechanism from injury which might otherwise result from too vigorous use of the operating handle. The spring employed for such purpose is designated 3ⁱ and secured at its forward end to the sector 3ᵈ and at its rear end to an arm 3ᵏ fastened to a rock shaft 8 at the rear of the machine, said spring as usual surrounding a telescopic link 3ʲ (Fig. 11) which transmits the return movement of the arm 3ᵈ to the arm 3ᵏ. Said shaft 8 carries a forwardly-projecting arm 3ᵐ (Fig. 25) which is jointed to the cylinder 3ⁿ of a dash-pot whose piston 3ᵒ is pivotally supported in the upper part of the frame-work. It will be obvious that the drawing forward of the handle to the limit and its then release will result in oscillation of the three shafts 3, 3ᵉ and 8, the latter under regulation of the dash-pot.

Besides interposing springs between the handle shaft and the rock shaft 8 and providing the dash-pot regulation, it is also necessary to further protect the mechanism by preventing premature return of parts directly operated by the handle or in other words to insure complete movement of parts impelled through the spring $3^t$, before the tension on such spring is relaxed by reason of rearward movement of the handle and parts positively connected therewith. Toggle links have heretofore been provided for such purpose but difficulty has sometimes been encountered by reason of a failure of the locked toggle joint to break. In the present construction toggle links are employed but they are not permitted to go beyond a straightened condition and so when worn to fail to come back and break. The holding of the toggle links straight to prevent breaking by rebound or gravity action and consequent premature return of the handle mechanism, is effected by the use of a spring under control of the shaft 8. One of the toggle links $3^p$ is jointed to the full-stroke sector $3^d$ and the other toggle link $6^j$ is journaled upon the shaft $6^f$. This latter link is preferably duplex on the forward side of the shaft (Fig. 12) and carries between its arms at their outer ends a stud $6^k$ engaging a short slot $3^q$ in the link $3^p$, a spring $3^r$ being connected at one end to the link $3^p$ and at the other to said stud, thus providing for a slight excess movement of the handle particularly desirable when the machine is power-driven, to avoid close working points. The link $3^p$ extends in rear of its point of union with the link $6^j$ and is formed at its extremity with a shoulder to engage a stud $6^m$ on the link $6^j$. The contact of this shoulder with said stud is what limits the movement of the links to complete straightening. One arm of the duplex link $6^j$ extends on the opposite side of the shaft $6^f$ and carries a roller stud $6^n$ and there is loosely mounted upon a stud $6^o$ an arm $6^p$ having an elbow-shaped outer portion against which said roller stud $6^n$ operates with a camming effect, said elbow-shaped portion preferably having a recess in the underside for the roller to engage. Normally said roller stud stands forward of said arm as shown in Figs. 1 and 11 and the latter is drawn forward by a spring $6^q$ which connects it with another arm $6^r$ loose on the stud $6^o$. This arm $6^r$ is formed with a lug $6^s$ normally engaged by a latching arm $8^n$ loose on the shaft 8 and held up by a spring $8^o$ which connects it with a rearwardly and upwardly extending arm $6^t$ which is integral with the arm $6^r$. The arm $6^p$ is formed with an angular branch $6^u$ which has a laterally turned end $6^v$ forming a flange which extends under the said arm $6^t$.

The operation of the above construction is as follows: When the upper part of the arm $6^j$ swings down in the forward stroke of the operating handle its roller stud $6^n$ cams the arm $6^p$ rearwardly against the stress of the spring $6^q$, the flange $6^v$ moving away from the arm $6^t$. When the roller has passed the point of the elbow the edge of the latter acting on the roller under the spring tension has the effect of straightening the toggle joint to the full extent which would require great force to effect by pull on the link $3^p$ alone. The roller stud having thus traversed the elbow-shaped portion of the arm $6^p$ against the stress of the spring $6^q$ the latter will of course pull the recessed part of the arm over the stud and the toggle joint will be locked. The seating of the roller stud in the recess of the arm prevents rebound such as might otherwise be caused by an excessively hard and sharp stroke of the handle.

It will be remembered that the object of the construction now being described is to prevent return movement of the handle before the spring-driven parts have moved to the fullest extent. The shaft 8 is the primary spring-driven part and when it has been turned to the proper extent the toggle should of course no longer perform any obstructing function. This shaft carries affixed to it an arm $8^p$ having at its extremity a roller stud $8^q$. The latching arm $8^n$ is formed with a lug $8^r$ against which said roller stud $8^q$ is adapted to strike as the shaft 8 reaches the limit of its movement produced by a forward stroke of the operating handle. The action of the stud upon the lug disengages the latching arm from the lug or catch $6^s$ whereupon resistance to the breaking of the toggle is removed. The toggle link $6^j$ in rear of the roller stud $6^n$ is formed with a projecting finger $6^w$ which the arm $6^r$ will strike, breaking the toggle, and the accompanying downward swing of the arm $6^t$ rocks the arm $6^u$—$6^p$ removing the elbow of the latter from the path of the roller stud $6^n$. The roller stud $8^q$ is not only employed to displace the latching arm $8^n$ but also to re-cock the arm $6^r$, said roller stud in the return of the shaft 8 acting against the under-edge of the arm $6^t$ to rock the same and wipe the beveled lug $6^s$ back over the beveled end of the latching arm $8^n$. Of course the arm $6^p$ is likewise restored to normal position through the medium of the spring $6^q$.

*Accumulating mechanism*, (Figs. 2, 12, 1?, 14, and 16.)—Reference has already b... made briefly to the racks, their carrier...d the number wheels and the pinions of the latter engageable with and disengageable from the racks. These number wheels $6^h$ with their pinions are strung upon a shaft or rod 9 carried by a pair of arms $9^a$ journaled on studs $9^b$ (Fig. 13) secured in opposite sides of the main frame. Other rods $9^c$ and $9^d$ extend between the side arms $9^a$ and a series of short plates $9^e$ embrace these rods and the axial rod or shaft 9, such plates being interposed between adjacent number wheels. The arms and intermediate plates are extended forward to provide supports for a cover plate $9''$ apertured to disclose single numbers on the wheels.

It will be seen that the above-described construction provides a swinging frame or carrier for the accumulator whereby the pinions may be moved into and out of engagement with the racks. When moved out of engagement with the racks the pinions will be locked against turning by reason of the fact that teeth of the pinions $6^i$ will become interlocked with noses $9^f$ of a set of plates $9^g$ secured on the cross rod $213^a$ and a parallel cross rod $9^h$. The swinging of the accumulator frame is effected through the medium of a pair of arms 16 loose upon the shaft $6^t$ and having enlarged outer ends with cam slots $16^a$ embracing flanged rollers $9^i$ (Fig. 14) on the projecting ends of the shaft 9. Normally the arms 16 are at the upward end of their swing and consequently the pinions are held in mesh with the racks. Downward swinging of the arm 16 will move the pinions out of mesh with the racks by reason of the camming action of the lower edges of the slots $16^a$ upon the flanged rollers. The means employed for regulating the movements of the arms 16 will be later described. Suffice it to state at this point that the timing of the accumulator frame is the same as in the usual Burroughs machine. In the case of itemizing the pinions are moved out of mesh at the outset of the operation and remain so during the balance of the forward stroke of the operating handle. Then as the handle starts back the pinions are moved into mesh and remain so during and at the termination of the back stroke of the operating handle. In the taking of a sub-total of course the pinions remain in mesh throughout the operation of the machine whereas in the taking of a grand total the pinions remain in mesh during the forward stroke of the operating handle and are then moved out of mesh at the commencement of the rear stroke. When a number is to be eliminated the pinions are disengaged and remain so throughout the operation.

The rack carriers are formed with depending arms $6''$ which are connected by springs $6'''$ with a suitable fixture on the base of the machine, said springs tending to swing the carriers upward. The restoration of the carriers to normal during the return stroke of the operating handle is effected by a frame or bail $16^b$ fastened to the rock shaft $6^t$, the latter having also secured to it an arm $16^c$ with a cam slot $16^d$ (Figs. 1 and 10) engaged by a roller $16^e$ on the end of an arm $16^f$ fastened to the shaft 8. It will be understood that during the forward stroke of the operating handle the frame or bail retreats so as to permit the rack carriers to ascend and then in the return stroke of the handle the frame or bail is advanced to restore the carriers to normal. The dwell of the cam slot $16^d$ is extended to provide for a slight excess rear movement of the handle and connected parts which is of advantage when the machine is power-driven to obviate close working points and possibility of misoperation when parts become worn.

It will be noted that with the arms 16 concentric with the racks and their cam slots embracing the axis of the accumulator, there is no chance for the racks and pinions to mesh inaccurately.

*Transfer or carrying mechanism*, (Figs. 13, 15, 16, 17 and 18.)—As in the regular Burroughs machine the racks $6^g$ are mounted to move independently of their carriers sufficiently for the purpose of additive carrying. Thus each rack is longitudinally slotted as at $6^x$ to engage screw studs $6^y$ on the carrier, and a spring $6^z$ secured at one end to the rack and at the other to the carrier tends to slide the rack on the carrier. Normally the rack is restrained against such movement by the engagement of a stud $6'$ (Fig. 16) on its upper end with the rear edge of a flange or shelf 4 formed upon a depending lug of a transfer pawl $4^a$ and projecting to the left. It will of course be understood that the units rack does not partake of the extra movement to effect a transfer, so its stud simply contacts with a fixed downward extension of one of the plates $4^m$ of the carrying mechanism framework. There is one of the pawls $4^a$ for each pinion and each pawl is formed at its forward end with a beveled nose $4^b$ to be acted upon by the usual stud $9^j$ on the pinion whereby the pawl will be moved to take the flange 4 out of the path of the stud $6'$. The outer ends of the pawls are squared off as usual to constitute zero stops when the pinions are rotated reversely as in the taking of totals or the clearing of the accumulator.

It will be understood that the tripping of a transfer pawl may take place when the rack with which that pawl is associated is itself out of normal and operating upon its own pinion. Consequently it is necessary to maintain the pawl in displaced position after the stud $9^j$ has passed by the beveled nose of the pawl. This is commonly provided for in a Burroughs machine by providing latches which spring into position to hold the pawls displaced. Of course these latches must be restored so that the pawls may return to normal position ready to perform their proper function in any subsequent operation. By the present construction such a device as the usual restoring bail of the Burroughs machine is dispensed with and the restoration of the latches effected by the racks themselves. The latches 4$^c$ are loosely mounted upon a fixed cross rod 4$^d$ and connected by springs 4$^e$ to the pawls 4$^a$, the springs thus serving not only to impel the latches toward latching position but also to hold up the pawls. The latches are curved forwardly at their lower ends and formed with downwardly-projecting points 4$^f$ normally extending past the flanges 4 against the forward edges of which they are held by the springs 4$^e$ (see Fig. 16). When a pawl 4$^a$ is displaced its flange 4 is carried below the point of the latch which thereupon springs over the flange. The rearward movement of the latch is limited by the engagement of a notch 4$^g$ formed in a rear inner edge, with a laterally-turned portion of a lug 4$^h$ projecting from the upper edge of the pawl (Fig. 17), and this engagement also holds the pawl displaced. The latch is cut out above the notch to accommodate the lug and has a finger 4$^i$ extending downwardly behind the laterally-turned portion of the lug to limit the forward movement of the latch (Fig. 18).

It will be understood from the above that when a pawl is displaced the latch moves over its flange 4 and holds it displaced so that the stud 6' may advance over the flange and the rack therefore partakes of the extra movement for adding one on the next higher pinion to that which has tripped the pawl. When the rack advances and the stud 6' travels over the flange 4 said stud will strike the rear edge of the point of the latch 4$^c$ and the spring 6$^z$ being superior to the spring 4$^e$, the latch will be carried from over the flange 4 and the notched portion carried forward of the lug 4$^h$. When this takes place the pawl moves up slightly until the flange 4 strikes the stud 6' (Fig. 18). This movement is sufficient to prevent the latch from reëngaging over the lug 4$^h$ when the rack moves up in the next operation of the machine. Consequently, in such subsequent operation when the stud 6' moves upwardly beyond the flange 4 the latter will move in front of the stud, the pawl being restored to normal position. The latch simply swings back until it strikes the flange. Thus all of the parts are restored to normal position and it will be noted that this is done without employing any special element such as the restoring bail heretofore used. The restoring movement of the pawls is limited by the abutment of upturned rear ends 4$^j$ against a fixed cross-shaft 4$^k$.

The transfer devices above described are preferably assembled as a separate section or department of the machine and to this end the shafts or rods 4$^p$ and 4$^k$ are connected by plates 4$^m$ through which there also extends a shaft 4$^n$ and longitudinal stiffening tie-plates or strips 4$^o$. The transfer pawls 4$^a$ are individually swung between pairs of plates 4$^m$.

*Printing devices*, (Figs. 2, 20, 21 and 22.)—The hammers 70 for driving the type 6 against the platen 17 have already been referred to as located at the front of the upper portion of the machine. They are separately pivoted upon a cross shaft or rod 77 and depending portions carry pins engaging short slots in links 77$^a$, the latter running to the rear and being coupled to upstanding arms of driving levers 77$^b$ separately mounted upon a cross-shaft or rod 77$^c$. (The slots in the links provide for slight rebound of type and hammers.) Said links have rearwardly-extending arms connected by springs 77$^d$ with an overhead cross rod 77$^e$. The driving levers and consequently the hammers are normally retracted against the stress of the springs 77$^d$ by a bail comprising a cross rod 77$^f$ engaging elbow-shaped portions of the levers, and arms 77$^i$ secured to the shaft 77$^c$. Links 77$^g$ connect said rod with arms 77$^h$ secured to the rock shaft 8.

It will be obvious that in the normal condition of parts as illustrated in Fig. 20 the above-described bail holds the driving levers at the limit of their downward movement and the hammers correspondingly retracted. It will also be understood that when the handle starts forward the consequent rocking of the shaft 8 moves the bail upwardly and relieves the driving levers of the restraint imposed upon them by this bail. Other devices hereinafter described then control the levers and hammers, such devices being in turn controlled by the type carriers.

The upwardly-extending arms of the driving levers project beyond the point of union with the links 77$^a$ forming catches 77$^j$. Separately mounted from each other to rock upon a cross rod or shaft 78 are a series of triggers or latches 78$^a$ formed at their forward ends to engage the catches 77$^j$ respectively and restrain the driving levers. These latches are drawn upwardly in rear of the pivot shaft 78 by springs 78$^b$ connecting them with the cross rod 77$^e$, said springs of course pressing the front portions of the latches downward. The rear ends of the latches are formed with overlapping tails 78$^c$ (Fig. 21) so as to provide for automatic tripping of latches one by another from left to right for the filling in of ciphers in a well-known manner. The latches have upstanding catch projections 78$^d$ adapted to be severally acted upon by pawls 79 loosely mounted independently of each other upon a cross rod 79ª of a swinging bail comprising side arms 79ᵇ secured to a rock shaft 79ᶜ, the right-hand side arm having a forwardly-projecting portion 79ᵈ which is jointed to a link 79ᵉ. This link extends downward and is jointed to an arm 79ᶠ loosely mounted upon the shaft 8 and carrying a stud 79ᵍ occupying the recess of a segmental plate 79ʰ of which the before-mentioned arm 77ʰ is an integral part. The stud 79ᵍ is adapted to be acted upon alternately by the upper edge of said arm 77ʰ and a shoulder 79ⁱ at the opposite end of the recess. Thus as the operating handle reaches the end of its forward stroke the arm 79ᶠ will be rocked upward and when the handle returns near the end of its stroke said arm 79ᶠ is rocked down again. The upward movement of the arm 79ᶠ is communicated through the link 79ᵉ to the bail carrying the pawls 79 and the latter are drawn rearwardly. Normally they stand above the catch projections 78ᵈ so as to clear the same and not displace the latches. The pawls are so held normally against the stress of comparatively light springs 79ʲ by studs 79ᵏ on the links 6ᶜ. The pawls have forward extensions which overlie these studs and there will be no action of a pawl upon its associated latch unless the associated type carrier advances beyond the zero position, that is unless the type carrier moves a distance determined by a depressed amount key. When any type carrier is so moved its associated pawl drops to position for engaging the catch projection 78ᵈ of the associated latch so that when the pawl-carrying bail swings rearward the latch will be tripped and the associated hammer fired. As no spring is applied to the pawl-carrying bail to hold it in position and as considerable lost motion is necessary between it and the part which rocks it, it is desirable to provide for positively locking this bail in its two extreme positions in order to insure accurate operation. To this end there are pivotally mounted upon the shaft 78 a pair of latches 79ᵐ and 79ⁿ, the latter of which engages under and behind a stud 79ᵒ on the right-hand side piece of the bail when the latter is in normal position, thus blocking its rearward movement (Fig. 22). The upper latch 79ᵐ is adapted to engage the same stud over and in front thereof when the bail is at the limit of its rearward movement, thus locking it against return (Fig. 20). The two latches cross each other after the manner of scissors and their crossed arms 79ᵖ and 79ᵠ are connected by a spring 79ʳ which tends to draw the latches together and engage either one of them with the stud 79ᵒ. Said crossed arms are formed at their extremities as cam feet 79ˢ for coöperation with a roller 79ᵗ on a branch 79ᵘ of the arm 77ⁱ. Normally this roller engages the cam foot of the arm 79ᵖ thus holding the latch 79ⁿ engaged with the stud 79ᵒ through the medium of the spring 79ʳ. It will be recalled that the arm 77ⁱ is directly connected with the rock shaft 8 and therefore partakes of a full rocking movement. Therefore as the operating handle reaches the end of its forward stroke, the roller 79ᵗ having left the foot of the arm 79ᵖ, strikes the foot of the arm 79ᵠ and disengages the latch 79ⁿ from the stud 79ᵒ just as the arm 77ʰ strikes the stud 79ᵍ to rock the pawl-carrying bail rearward. It will be seen that the action of the roller 79ᵗ on the foot of the arm 79ᵠ will cause the upper latch 79ᵐ to snap down in front of the stud 79ᵒ as soon as the latter passes the shoulder of said latch. Of course it will be understood that when the return movement of the operating handle is near its close the upper latch 79ⁿ will be disengaged from the stud and the lower latch prepared for an engagement therewith as soon as the bail has been restored to normal position.

*Locking the type-carriers against retrograde movement and undue advance,* (Figs. 20 and 22.)—The rear edges of the type-carriers are formed with a series of V-notches 80 and there are loosely mounted upon a cross rod or shaft 80ª a series of double-acting reversible pawls 80ᵇ. On the shaft 80ª at opposite ends thereof there are mounted bell crank levers, rearwardly projecting arms of which, 80ᶜ, support between them a bar 80ᵈ (Fig. 21). Springs 80ᵉ are attached at their outer ends to this bar 80ᵈ and at their inner ends to projections 80ᵍ on the backs of the pawls 80ᵇ respectively. Normally the springs draw on the pawls in a direction to engage the lower branches of the latter with the notched edges of the type carriers (Fig. 20). As the type carriers swing down and forward the notches pass these lower branches of the pawls and are successively engaged thereby so that the type carriers are prevented from dropping back after reaching any certain printing position. This feature is valuable both to prevent erroneous impressions and accumulation through rebound and as guarding against erroneous imprints through accidental or intentional obstruction of the type-carriers or the pressing backward of the same where they are necessarily exposed in front of the platen.

It is desirable at times to lock the type carriers against forward movement. It has heretofore been explained that the amount keys are released as the operating handle reaches the end of its forward stroke and a construction has been pointed out which provides for abutment pieces of the rack carriers passing the key stops when returning home. This had reference particularly to instances where keys of lower amount might be depressed while the machine was operating under control of depressed keys of higher amount. It will be noted in this same connection that the withdrawal of the key-stops at the end of the forward stroke of the operating handle would free the rack carriers and connected type carriers for immediate further advance movement before restoring bail 16$^b$ could pick up the racks as the same are positioned by the originally-depressed amount keys. This would result in adding a greater amount than represented by such keys. Provision is therefore made to prevent such excess advance, the double-acting pawls being employed to obstruct advance movement of the rack carriers and the type-carriers when the operating handle has been drawn all the way forward and until it returns home.

The before-mentioned bell crank levers, rearwardly projecting arms of which are designated 80$^f$, having depending arms 81 which straddle a rod 82 carried by forwardly and upwardly inclined extensions 81$^a$ of the side pieces of the pawl-carrying bail, this rod serving to support the forward ends of the springs 79$^j$. As the operating handle reaches the end of its forward stroke it will be remembered that the said bail is rocked rearward. This rearward rocking of the bail rocks the aforesaid bell cranks carrying their arms 80$^c$ upward and likewise the spring-supporting bar 80$^d$. Thereby the rear ends of the springs 80$^f$ are swung far enough upward and forward to reverse the action of these springs and cause them to withdraw the lower branches of the pawls from engagement with the notched edges of the type-carriers and to engage the upper portions of said pawls with said notched edges (Fig. 22). When this takes place the type-carriers can move no farther forward. Of course upon return of the operating handle to normal the pawl-carrying bail is rocked forward and the double-acting pawls are again reversed. This feature is also useful to prevent discharge of the racks when a total is being taken and the pinions are disengaged at the first part of the back stroke of the handle.

*Alining the type*, (Figs. 19, 20 and 22.)— The present construction provides means for enforcing proper alinement of the type by action on the type-carriers back of the portions where the type are located. Here the type-carrying segments are formed with a series of deep, round-bottom notches 83 and an alining cross rod 83$^a$ is adapted to engage said notches to properly aline the type, said rod being carried by a pair of arms 83$^b$ loose on a rock shaft 83$^d$ (Fig. 20). Arms 83$^c$ (only the right hand one appearing in the drawings) fastened to opposite ends of said rock shaft are formed with lateral projections 83$^f$ connected by springs 83$^g$ with said arms 83$^b$. The arms 83$^e$ have rearward extensions 83$^h$ carrying rolls 83$^i$ occupying cam slots 83$^j$ in widened end portions of arms 83$^k$ integral with the arms 77$^i$. The major portions of said cam slots are concentric with the shaft 77$^c$ and normally hold the alining rod away from the type-carriers. As the operating handle reaches the end of its forward stroke, the type-carriers having been positioned, the cam portions of the slots come into engagement with the rolls 83$^i$ and rock the shaft 83$^d$ (Fig. 22), thus drawing the alining rod into engagement with the deep notches through the medium of the springs 83$^g$ and arms 83$^b$. As the operating handle starts back the alining rod is of course withdrawn.

*Control of accumulator for adding*, (Fig. 23.)—Reference has hereinbefore been made to the fact that the adding pinions are normally in mesh with their racks and that in an adding operation they are moved out of mesh at the outset of the handle stroke and remain out of mesh during the forward stroke of the handle, returning to mesh with the start rearward of the handle. The rocking back and forth of the cam-slotted arms 16 for the purpose of so moving the accumulator is effected in somewhat the same manner or through means of somewhat the same character as those employed in the regular Burroughs machine for rocking the accumulator frame back and forth. On the shaft 8 there is secured an upstanding arm 16$^g$ carrying at its upper extremity a wipe-pawl or plate 16$^h$ spring-drawn to alinement with the arm. This wipe-pawl or plate is adapted to operate upon studs 16$^i$ and 16$^j$ on the ends of rearward and forward extending arms of a three-armed lever 16$^k$ which is secured to a rock shaft 16$^m$. The upstanding arm of said three-armed lever and a similar arm 16$^n$ (Fig. 2) at the opposite end of the shaft 16$^m$ are connected by links 16$^o$ with the cam-slotted arm 16 respectively.

It will be seen that the above-described construction will provide for the movement of the accumulator out of and into mesh with the racks as above described for adding purposes Normally the wipe-pawl or plate 16$^h$ stands just in rear of the stud 16$^i$ so that as the arm 16$^g$ starts forward said pawl will rock the three-armed lever in a direction to swing the cam-slotted arms 16 downward and thereby disengage the adding pinions from their racks. Then when the arm 16$^g$ starts rearward,—its wipe-pawl at that time lying in contact with the stud 16$^j$,—the resultant action of the pawl against the latter stud will rock the three-armed lever in a direction opposite to that in which it was first rocked, thereby swinging the cam-slotted arms 16 upward and reëngaging the adding pinions with their racks.

To guard against rebound of connections for rocking the accumulator, an arm 40 is employed (Figs. 23, 24 and 37), the same being pivoted on a suitable stud and drawn by a spring 41 into engagement with a projecting part of the stud 40ª at the upper end of the upstanding arm of the three-armed lever 16ᵏ, which stud connects the latter with the links 16°. Said arm 40 is curved downwardly at its forward end and given a V-formation so as to engage either side of said stud and frictionally resist movement of the said three-armed lever.

*Control of accumulator for eliminating*, (Figs. 23, 36, and 37.)—It will be obvious that with a construction such as that last described for controlling the accumulator, the exclusion of an amount from the accumulator in cases where it is desired to print without accumulating, can readily be accomplished by preventing co-action between the wipe-pawl 16ʰ and the stud 16ʲ.

The numeral 24 designates a key projecting through a slot in the keyboard plate at or about the upper or left-hand corner thereof, said key being upheld by a spring 24ª and formed at the lower end of its stem below a guiding bracket, with a stud 24ᵇ. This is the so-called "elimination" key and its depression is designed to adjust the parts associated with it so as to prevent an item set up on the keyboard from being accumulated. The stud 24ᵇ extends over the rearwardly-projecting arm 24ᶜ of a bell crank lever swung upon a stud 24ᵈ. The depending arm 24ᵉ of said bell crank lever is jointed to a link 24ᶠ which at its rear end is jointed to the upstanding arm 24ᵍ of a bell crank lever pivoted on a stud 24ʰ and having a downwardly and rearwardly-extending arm 24ⁱ carrying a roller-stud 24ʲ. This roller-stud occupies a cam slot 24ᵏ in one branch 24ᵐ of a forked lever pivoted on a stud 24ⁿ and integral with or secured to an arm 24° having a rearwardly-turned upper end adapted to contact with the edge of the wipe-pawl 16ʰ. Depression of this "elimination" key operates through the devices described to rock the said arm 24° rearwardly and interpose its rearwardly-turned upper end into the path of the wipe-pawl (Fig. 37). The effect is to prevent said wipe-pawl from coming to coöperative relation with the stud 16ʲ. Consequently, the adding pinions having been disengaged from the racks as in an adding operation, they will not be reëngaged upon the return stroke of the handle and so there will be no addition of the amount although the same will be printed.

*Control of accumulator for sub-totaling*, (Figs. 23 and 30.)—It will be obvious that the taking of a sub-total is exactly the reverse of the elimination of an amount as in taking a sub-total the adding pinions should remain engaged with the racks throughout the operation. It will thus be seen that coöperative action between the wipe-pawl and the stud 16 should be prevented so that the adding pinions will remain engaged with the racks. The sub-total key 25 which is normally upheld by a spring 25ª and guided by slots in the keyboard plate and in an angle bracket, has a stud 25ᵇ at the lower end of its stem engaging over the rearwardly-extending arm 25ᶜ of a four-armed lever pivoted on a stud 25ᵈ and having a depending arm 25ᵉ jointed to a link 25ᶠ. The latter extends rearwardly to a point beyond the arm 16ᵍ where it is coupled to an arm 25ᵍ loose on the shaft 8 and carrying at its upper end a blade 25ʰ designed to engage the upper or rear edge of the wipe-pawl 16ʰ. Depression of the sub-total key through the connections above described draws said arm 25ᵍ forward causing its blade 25ʰ to advance over the upper edge of the wipe-pawl and depress the latter far enough to cause it to escape the stud 16ⁱ when the arm 16ᵉ swings forward (Fig. 30). Therefore with the sub-total key depressed there will be no movement of the adding pinions out of mesh with their racks.

*Control of accumulator for grand totaling*, (Figs. 23, 26, 27 and 30.)—So far as preventing movement of the adding pinions out of mesh with their racks at the commencement of an operation is concerned the same means can of course be utilized in the taking of a grand total that are used in the taking of a sub-total. The total key 26 is normally upheld by a spring 26ª and suitably guided in slots of the keyboard plate and an angle bracket, and it carries at the lower end of its stem a stud 26ᵇ extending over the forwardly-projecting arm 26ᶜ of a bell crank lever pivoted on a stud 26ᵈ and having an upstanding arm 26ᵉ with a rearwardly-projecting lug 26ᶠ (Fig. 26) carrying a roller stud 26ᵍ which extends under a forwardly-projecting branch 25ⁱ of the sub-total four-armed lever. It follows that when the total key is depressed it will rock said lever, producing the same effect upon the wipe-pawl disabling-arm 25ᵉ as depression of the sub-total key. While depression of the total key has the same effect as depression of the sub-total key so far as keeping the pinions in mesh with their racks during the forward stroke of the operating handle may be concerned, of course in the taking of a grand total these pinions must be withdrawn from the racks as the operating handle starts back. Now the action of the wipe-pawl 16ʰ on the forward stud 16ʲ is calculated to engage the pinions with their racks and not only is it necessary to provide some means for disengaging the pinions from the racks as a result of depression of the total key but the wipe-pawl 16ʰ must be disabled as to coöperation with the forward stud 16ʲ as well as to coöperation with the rear stud 16ⁱ. To this end the total key is arranged to actuate the connections heretofore described as actuated by the elimination key for the purpose of disabling the wipe-pawl 16ʰ at the point in question. The upstanding arm 26ᵉ of the total key bell crank lever already described is coupled at its upper extremity to a link 26ʰ (Fig. 23) which at its rear end is slotted as shown at 26ⁱ to embrace the stud connecting the elimination key bell-crank with the link 24ᶠ. Consequently depression of the total key has the same effect upon the said elimination key bell crank as depression of the elimination key itself and the arm 24ᵒ is rocked rearwardly so as to prevent coöperation between the wipe-pawl 16ʰ and the stud 16ʲ. The arm 16ᵍ does, however, operate to disengage the adding pinions from their racks, thus performing a function the opposite of that which it, through the medium of the wipe-pawl 16ʰ, performs in an adding operation when starting rearwardly. To this end a second wipe-pawl 26ʲ is employed, adapted to be acted upon by a stud 26ᵏ which affords a pivot for the wipe-pawl 16ʰ. Normally this second wipe-pawl 26ʲ is deflected from effective position. This is done by the action of the rear branch 26ᵐ of the forked lever hereinbefore mentioned, said rear branch acting against a stud 26ⁿ on the wipe-pawl 26ʲ which a spring 26ᵒ tends to swing rearward into position for coöperation with the aforesaid stud 26ᵏ. It follows that when said forked lever is swung rearward by depression of the total key (Fig. 30) the wipe-pawl 26ʲ swings to position for coöperation with said stud. This wipe-pawl is carried on the rearwardly-extending arm 26ᵖ of a bell crank lever pivoted on the stud 24ʰ and having an upwardly and forwardly-extending arm 26ᑫ which is connected by a link 26ʳ with the upstanding arm of the three-armed lever 16ᵏ. It follows that when the arm 25ᵍ starts rearward and its stud 26ᵏ thrusts the wipe-pawl 26ʲ upward said last-mentioned bell crank is rocked so as to in turn rock the three-armed lever in a direction to disengage the adding pinions from their racks. The link 26ʳ is slotted where it connects with the three-armed lever so that the latter in its adding oscillations will not affect the totaling connections, and said link is normally held back against a fixed stud 26' by a spring 26'' connecting it with said stud. This spring serves to restore the link and bell crank when the stud 26ᵏ has passed by the wipe-pawl 26ʲ. Of course depression of the elimination key has the same effect of depression of the total key so far as concerns the enabling of the wipe-pawl 26ʲ by rearward swing of the arm 26ᵐ and there will therefore be the same rocking of the lever 26ᵖ—26ᑫ and drawing forward of the link 26ʳ as in the grand totaling operation; but in the case of elimination such movements are idle since at the time they take place the three-armed lever 16ᵏ is already forward, having been rocked at the outset by the wipe-pawl 16ʰ.

At the conclusion of the taking of a total the adding pinions should be again engaged with the racks. To this end the stud 20ⁿ on the crank arm 20ᵐ (Fig. 2) is adapted to engage the hook-shaped portion of a link 26ᵘ (Figs. 2 and 30) suitably guided at its lower end by a slot-and-pin connection with the frame of the machine and at its upper end slotted to engage a stud 26ʷ of an arm 26ᵛ integral with the arm 16ⁿ secured to the shaft 16ᵐ. As the shaft 8 reaches the end of its return movement the stud 20ⁿ acts upon the link 26ᵘ drawing it down and therefore rocking the arm 26ᵛ downwardly and returning the three-armed lever to its normal position, thereby reëngaging the adding pinions with their racks. A spring 26ᵛ connects the link 26ᵘ with the stud 26ʷ causing the link to follow the stud as the arm 26ᵛ swings up. The slot at the upper end of the link 26ᵘ is merely to allow for the excess rearward movement of the handle heretofore mentioned the said spring 26ᵛ yielding to such excess movement and the slot in the lower part of the link being correspondingly lengthened.

*Withdrawing initial stops in totaling*, (Figs. 2, 3, 4, 26 and 27.)—It will be understood that when either a total or sub-total is to be taken the initial or zero stops which normally stand in the paths of the abutment pieces on the rack carriers, must be withdrawn so as to permit the racks to swing upward distances measured by the backward turning of the adding pinions to zero position. It was before mentioned that the rods 21ⁿ on the rear ends of which the initial stop blades 21ᵍ are formed, have a slot-and-pin connection with the thrust rods 21ᑫ which operate to individually withdraw the initial stops when amount keys are depressed. Each initial rod 21ⁿ extends forward of its slotted portion and a spring 27 (Figs. 3 and 4) connects this forwardly-extending portion with the stud 21ᵖ on the thrust rod 21ᑫ, this spring thus serving to normally hold the forward end of the slot 21ᵒ against the stud 21ᵖ. It will be seen that this construction provides for forward movement of the initial stop rods 21ⁿ independently of the thrust rods 21ᑫ and therefore withdrawal of the initial stops without depression of amount keys. The said rods 21ⁿ, besides being extended forward of their slots are formed with depending lugs 27ᵃ. A cross rod 27ᵇ guided in horizontal slots of depending portions of the frame-work extends in rear of all of the lugs 27ª as clearly shown in Figs. 3 and 27. It will be obvious that forward movement of this cross rod will result in withdrawing all of the initial stops. Said cross rod is connected at opposite ends with links 27ᶜ which at their rear ends are coupled to arms 27ᵈ swung from studs on the frame of the indexing section. The right-hand arm 27ᵈ carries a stud 27ᶠ (Fig. 1) adapted to be acted upon by a branch 27ᵍ of a lever 27ʰ secured to a rock shaft 27ⁱ, and there is secured near the opposite end of said rock shaft an arm 27ʲ (Fig. 3) similar to this branch of the arm 27ʰ and arranged to operate upon a stud 27ᵏ on the left-hand arm 27ᵈ. It will be seen that forward rocking of the arms 27ʰ and 27ʲ will result in withdrawal of the initial stops. The arm 27ʰ at the extremity of its rearwardly and upwardly-extending portion carries a roller 27ᵐ (Figs. 26 and 27) and there is formed upon the inner side of the crankshaft arm 3ᵇ a ledge or flange 27ᵒ with a beveled front edge. Normally this flange or ledge is adapted to pass over the said roller 27ᵐ but depression of either the total or sub-total key results in rocking the shaft 27ⁱ far enough to bring the said roller in line with the beveled or cam edge of said shelf or flange with the result that upon the forward rocking of the crank handle arm 3ᵇ a cam action takes place which further turns the shaft 27ⁱ and effects the withdrawal of the initial stops. The preliminary movement of said shaft has no effect upon said stops, provision being made for lost motion between the arms 27ᵍ and 27ʲ and the studs 27ᶠ and 27ᵏ. By this arrangement the work of withdrawing the stops is not imposed upon the total or sub-total key and the operator is not required to exert so great finger pressure on these keys as would be necessary to withdraw the stops, but the powerful leverage of the operating handle is utilized for this purpose.

Referring now to the means for preliminarily rocking the shaft 27ⁱ by depression of the total or sub-total key this is accomplished through connection with the sub-total key four-armed lever which it will be remembered is rocked when either the sub-total key or the total key is depressed. A link 27ᵖ is coupled to the depending arm 25ᵉ of said sub-total lever and said link is slotted for engagement with a stud 27ᵈ on an arm 27ʳ secured to the rock shaft 27ⁱ. The slot provides for movement of said arm and connected parts independently of the four-armed lever. The latter does not immediately act upon the initial stop withdrawing devices but toward the close of its movement produced by the depression of sub-total or total key, rocks the shaft 27ʳ slightly, enough to position the roller 27ᵐ in the path of the cam flange 27ᵒ. It will be seen that the construction also has the effect of locking said sub-total key lever in operated position during an operation of the machine. Similarly the total key bell-crank lever is locked by a latching arm 42 swung from the stud 25ᵈ and pressed by a spring 42ᵃ toward locking position but normally restrained by a stud 42ᵇ on the left-hand link 27ᶜ of the initial stop-withdrawing mechanism.

The total, sub-total and elimination keys are held down and interlocked in just the same way as a row of amount keys and controlled by the same release devices. Hence it is important to provide for the above-described locking of the sub-total and total key levers through other means which continue to be effective after the keys themselves have been released. The numeral 29 designates the spring-drawn shutter for the said three special keys the stems of which have rounded lugs 29ᵃ to coöperate with said shutter. The latter is displaced by a lug of the rock shaft 20ᵇ; hence the keys will be released at the end of the forward stroke of the handle. A means for continuing to lock down the elimination key lever after the key itself has been thus released will be later described. A sliding lock plate 212ˣ, right-angularly slotted, is used with the three special keys as with the amount keys, to cause depression of one key to lock out the others.

*Special character printing in general,* (Figs. 2, 20 and 22.) It is desirable in machines of this kind to provide for indicating on the printed list whether or not the accumulator was at zero when the list started; also whether or not an item either at the head of the list or elsewhere was or was not accumulated; and further to indicate which amounts are totals and which sub-totals. In the present machine provision is made for automatically printing special characters to supply all such indications. Alongside the amount type carriers to the right there is mounted a special segmental type-carrier 170 which carries a series of type (in the present instance four) the lowermost one 170ᵃ having a printing character, as e. g. a star or asterisk (*), to indicate a grand total, the next type 170ᵇ having a printing character, as e. g. the letter "S", to designate a sub-total, the next type 170ᶜ having a character, as e. g. the ordinary number sign (#), to indicate an unaccumulated item, and the fourth type 170ᵈ having a character, as e. g. the letter "C", to designate the first accumulated item of a list. The various positions of this special type-carrier are determined by the abutment of a stud 170ᵉ on said carrier against one or another of a series of shoulders on a pivotally-mounted stepped indexing segment 170ᶠ. When the machine is simply operating to add and print items subsequent to the first accumulated item said stud simply abuts against the rear end or edge of said stepped segment and the special type-carrier does not move far enough to bring any type to printing position. When the first accumulated item of a list is printed said stud comes to bear against the shoulder 170$^g$ next forward of said rearward edge. When the machine is operating to print an unaccumulated item the stud comes to bear against the shoulder 170$^h$ next forward of said shoulder 170$^g$; when the machine is operating to print a sub-total the stud comes to bear against the shoulder 170$^i$ next forward of said shoulder 170$^h$; when the machine is operated to print a grand total the stud comes to bear against the shoulder 170$^j$ next forward of said shoulder 170$^i$;—thus properly positioning the type-carrier for the printing of the appropriate special character.

The special printing segment is connected by a link 170$^k$ with an arm 170$^m$ loosely mounted upon the shaft 8 and drawn downwardly by a spring 170$^n$ which thus tends to advance the special type-carrier. An arm 170$^o$ fastened to the rock shaft 8 extends under a stud 170$^p$ on the arm 170$^m$. Hence normally the latter arm and its link are upheld against the stress of the spring 170$^n$ and the special type segment is retracted. In an operation of the machine the shaft 8 oscillates during the forward stroke of the handle in a direction to lower the arm 170$^o$ and therefore the arm 170$^m$ and link 170$^k$ may lower until the stud 170$^e$ contacts with one or another of the shoulders on the stepped segment 170$^f$ or against the rear end of the latter. The link 170$^k$ carries a stud 170$^u$ the same as links which connect the amount type-carriers with the rack-carriers, said stud normally upholding the extra pawl 170$^x$ to prevent its tripping the associated latch 170$^y$ which holds the special hammer 170$^z$ retracted. Said latch is not overlapped by a tail-piece as are other latches (Fig. 21), and so the hammer will not be tripped by reason of the adjacent or units latch being tripped, but the driving lever 170$^r$ for the special hammer has a flange 170$^{rr}$ underlying the adjacent or units driving lever (Fig. 21) so that only when the latter is released will the special hammer operate.

The stepped segment 170$^f$ is secured to a rock shaft 170$^q$ to which there is also secured an arm 170$^r$ drawn rearward by a spring 170$^s$ whereby the stepped segment is normally held up to position for preventing the special type carrier from bringing any one of its type to printing position. Jointed to the arm 170$^r$ there is an obliquely-extending link 170$^t$ and through the medium of this link various positions of the stepped segment are secured under control of the total key, the sub-total key, the elimination key, and the amount keys, as hereinafter described.

*Setting up the special type to designate a total,* (Figs. 28 and 30.)—It will be remembered that the total key bell crank lever is connected to a link 26$^h$ which is drawn forward every time the total key is depressed. This link at its rear end has a depending finger 71 which stands in rear of a stud 71$^a$ on said oblique link 170$^t$. The relation between the stud and the finger and the extent of movement of the link 26$^h$ by the total key are such that depression of the total key results in a drawing forward of the oblique link to the limit of its movement, thereby positioning the shoulder 170$^j$ of the stepped segment in the path of movement of the stud 170$^e$ as shown in Fig. 30. The result is that the special type-carrier swings forward to position for presenting the total type 70$^d$ at the printing line and the * is printed to the right of the total. If the key is put down when nothing is on the accumulator, and the handle drawn forward, there will be no printing because the units hammer driver is not released and so the special driver, though unlatched, is restrained by the engagement of its flange with said units hammer driver.

*Setting up the special type to designate a clear condition of the accumulator,* (Fig. 29.)—Besides performing the function above mentioned of positioning the stepped segment, the depression of the total key prepares for a subsequent positioning of that segment with its lower shoulder 170$^g$ in the path of travel of the stud 170$^e$. A forked lever 72, pivoted on a stud 72$^a$ which guides the oblique link 170$^t$, has one branch standing in front of a stud 72$^b$ on a lug of the link 26$^h$ (Fig. 28). The other branch of said forked lever is adapted to coöperate with a stud 72$^c$ on a horizontally-extending bar 72$^d$, though normally this branch of the forked lever stands below the line of travel of said latter stud (Fig. 32). The other branch of said lever carries at its upper end a stud 72$^e$, and a latch 72$^f$ is arranged to engage said stud 72$^e$ when the forked lever is swung all the way forward. A spring 72$^g$ normally holds said forked lever rearward, and a spring 72$^h$ draws down the latch 72$^f$. The forward movement of the link 26$^h$ is sufficient to carry the stud 72$^e$ below the point of the latch 72$^f$ (Fig. 28) but not far enough to permit the latch to drop over the rear of the stud and thus lock the forked lever. However, the forked lever will be moved further and far enough for such purpose by the action of the stud 72$^c$ against its other branch, which has, by the depression of the total key, been raised into the path of the stud 72$^c$ (Fig. 29). The bar 72$^d$ carrying the stud 72$^c$ is thrust forward as the operat ing handle reaches the end of its forward stroke by the action of the rear shoulder 72ⁱ of a recessed segment 72ʲ secured to the handle shaft 3, against a stud 72ᵏ on the bar. The result is that at the end of the forward stroke of the handle the forked lever 72 becomes latched in a forward position. This lever has formed integrally with it an abutment projection 72ᵏ which when the lever is thus moved forward comes into the path of a stud 72ᵐ on the forward end of the oblique link 170ᵗ. This abutment projection limits the rearward movement of said link so as to prevent the stepped segment 170ᵗ from rising beyond the position where the shoulder 170ᵍ stands in the path of the stud 70ᵉ. This provides for indexing the special type-carrier for printing the special character which denotes the first accumulated item of a list or a clear condition of the machine. With the printing of that item and the special character, the stepped segment should be released so that subsequent items will not be so designated. Therefore provision is made for lifting the latch 72ᶠ in connection with the printing of the first accumulated item of a list.

The thrust rods 21ᵃ (Fig. 26) for withdrawing the initial key stops are extended forward and formed with down-turned extremities 72ⁿ for acting against a cross rod 72ᵒ forming part of a bail completed by side-arms 72ᵖ secured to the rock shaft 72ᵍ. It will be seen that this construction provides for the swinging forward of said bail against the stress of the spring 72ʳ as a result of the depression of any amount key. Said rock shaft 72ᵍ carries at its left-hand end a rearwardly-extending irregular shaped arm 72ˢ beveled at its rear end (Figs. 31 to 33). There is pivoted to the bar 72ᵈ an arm 72ᵗ drawn upward by a spring 72′ against a lip 72″ on said bar (Fig. 31) and branched at its forward end to provide upper and lower tappet projections 72ᵘ and 72ᵛ. This arm carries a roller-stud 72ʷ which, when the bar 72ᵈ is thrust forward with the irregular-shaped arm 72ˢ depressed, will strike the inclined rear edge of the latter arm, ride under the same and bring the lower tappet piece 72ᵛ to position for acting against a stud 72ˣ on the lower end of a lever 72ʸ pivoted intermediate its ends on a stud 172 which guides the forward end of the bar 72ᵈ, and having above its pivot a second stud 72ᶻ. A forwardly-extending arm 172′ of the latch 72ᶠ extends under a stud 172ᵃ on an upward extension of the lever 72ʸ and when the tappet piece 72ᵛ operates upon the stud 72ˣ and rocks the lever 72ʸ said stud 172ᵃ acts upon the upper edge of the latch arm 172′ and lifts the latch, releasing the forked lever, and consequently causing displacement of the abutment piece 72ᵏ with the result that the stepped segment 72ʲ will return to normal, and the printing of following accumulated items will be without a designating character. The latch-displacing lever is yieldingly detained in its two positions by an arm 722 loose on stud 25ᵈ (Figs. 23, 28, 29, 31 and 32) and notched to engage the stud 72ʰ thus detaining the lever in normal position as shown in Figs. 23, 28, and 29. The said arm is drawn down by a spring 722ᵃ and formed with a V-projection on the rear side of the notch so that the arm must be displaced against the stress of the spring when the lever is shifted and the latter will be detained in operated position by the engagement of the V-projection with said stud 72ʰ as shown in Figs. 31 and 32.

*Compelling blank stroke before taking total or sub-total,* (Figs. 31, 32 and 33.)—It is customary in Burroughs adding machines to lock the total key against depression after one or more items have been introduced, so as to compel the taking of a blank stroke and the restoration of the transfer or carrying mechanism before a total or sub-total can be taken. In the present instance both the total and sub-total keys are locked against depression with the same object in view. To this end the lever 72ʸ hereinbefore mentioned is extended at its upper end and formed into a hook 75 adapted, when said lever is rocked in the manner before described, to engage over a stud 75ᵃ on an arm 75ᵇ of the sub-total four-armed lever. This will obviously have the effect of preventing such movement of said lever as produced by depression of the sub-total key or of the total key. Hence so long as the hook and stud are engaged there can be no depression of either of said keys. The blank stroke of the operating handle has the effect of leaving the tappet arm 72ᵗ in its upper position and the tappet projection 72ᵛ out of line with the stud 72ˣ on the lever 72ʸ, but the upper tappet projection 72ᵘ directly in rear of the stud 72ᶻ on said lever. Consequently when the bar 72ᵈ is thrust forward the upper part of the lever 72ʸ is rocked forward and the hook 75 disengaged from the stud 72ᵃ (Fig. 33). This same movement of the lever 72ʸ takes the stud 172ᵃ out of contact with the arm 172′ of the latch 72ᶠ, thus leaving said latch free to operate in connection with the taking of a grand total.

*Setting up special type to designate a sub-total,* (Figs. 28 and 37.)—The depending arm of the sub-total four-armed lever has a downwardly-projecting finger 74 adapted to act upon a stud 74ᵃ at the forward end of the oblique link 170ᵗ. Depression of the sub-total key through these means results in drawing said link forward sufficiently to position the shoulder 170[l] of the stepped segment 170[f] in the path of the stud 170[e]. See Fig. 37.

It will be understood that the taking of a sub-total should not prepare for the printing of the clear sign. It has already been set forth how the operation of the machine with the total key depressed does prepare the parts for the indexing for the clear sign. It will be remembered that for such purpose the forked lever 72 is moved partly forward by depression of the total key and then moved farther forward by a stud 72[c] on the bar 72[d]. Normally the rear arm of the forked lever stands below the path of movement of said stud 72[c] as before explained. Depression of the sub-total key has no effect upon the forked lever and consequently the latter remains out of position to be acted upon by the stud 72[c] and there will of course be no movement of the forked lever and no positioning of the abutment piece 72[k] for the clear sign indexing.

*Locking total and sub-total keys by amount keys and vice versa*, (Figs. 34 and 35.)—It will be obvious that amount keys and total or sub-total keys should not be depressed at the same time. In the present machine locking means are provided to prevent the possibility of this being done. It has already been explained that the total and sub-total keys are locked against depression after a blank stroke has been taken but after such blank stroke amount keys can of course be depressed and the before-described means would not prevent depression of the total or sub-total key before an operation of the machine had started. To prevent such erroneous depression of total or sub-total key there is secured to the shaft 72[q] which carries the universal amount key bail 72[o]—72[p], a rearwardly-projecting arm 76, which when the bail is swung forward by depression of an amount key, moves down in front of a stud 76[a] on the branch 25[l] of the sub-total four-armed lever. This obviously has the effect of locking both the total and sub-total keys. The same means serve to lock amount keys against depression when either total or sub-total key is depressed for depression of either of the latter keys swings the stud 76[a] under the arm 76 (Fig. 35) which of course prevents movement of the universal bail and thus blocks depression of amount keys.

*Setting up the special type for designating an unaccumulated item*, (Fig. 36.)—The depending arm 24[e] of the elimination key bell crank lever is formed with a downwardly-projecting finger 73 adapted to act upon the stud 71[a] of the oblique link 170[t] and thrust said link forward, thereby positioning the stepped segment 170[f] so as to present its shoulder 170[h] in the path of the stud 70[e].

It will be understood that if the first item of a list is not to be accumulated the devices set up in the taking of a total for indexing the special type-carrier to provide for printing the clear sign, should not be disturbed. It has already been explained that this indexing depends upon the depression of amount keys but amount keys are also depressed when an item is to be printed without accumulation. Consequently, it becomes necessary to disable the devices which in the accumulating of the first item provide for the return of the stepped segment to normal. To this end the bar 72[d] is formed with a right-angled slot 73[a]. Ordinarily said bar is moved back and forth by the shoulders of the recessed segment 72[i], the horizontal portion of said right-angled slot remaining engaged with a fixed guiding stud 73[b]. It will be understood, however, that normally the vertical portion of the right-angled slot is in line with said stud (Fig. 23), the bar 72[d] being at the end of its rearward movement effected by action of the shoulder 172[x] against the stud 72[g]. Depression of the elimination key has the effect of elevating the rear end of the bar 72[d], locking the latter against longitudinal movement by reason of the engagement of the stud 73[b] with the vertical portion of the slot 73[a], and taking the stud 72[g] out of the path of movement of the shoulder 72[i]. It will be obvious that this prevents the forward thrust of the bar 72[d] which was before described as resulting in a displacement of the latch 72[f] and the release of the forked lever 72. Consequently when the elimination key is depressed the abutment 72[k] remains in position to limit the return movement of the stepped segment so as to present the shoulder 170[g] to the stud 170[e]. Hence the printing of an item without accumulation, first after the clearing of the machine, will not prevent the automatic printing of a special character in association with the item next set up on the keyboard if that item is to be accumulated.

The connections for causing the elimination key to lift the bar 72[d], comprise a lever 73[c] upheld by a spring 73[d] on the forward side of its pivot and extending under the stud 24[b] of the elimination key; and a link 73[e] coupled to said lever in rear of its pivot and extending down alongside the bar 72[d] and carrying a stud 73[f] engaging under the latter. It will be seen that depression of the elimination key lifts the rear end of the lever 73[c] and through the medium of the link 73[e] lifts the rear end of the bar 72[d]. During the operation of the machine the link is automatically locked in the position to which the elimination key moves it, this being accomplished by extending the link downward and coupling it to an arm 73[g] pivoted on a stud 73[h] and carrying at its forward end a roll 73¹ normally standing below the path of movement of a flange or shelf 73ʲ on the side of the segment 72ʲ (Fig. 23). Depression of the elimination key carries this roll above said flange (Fig. 36) and as the machine starts to operate, the flange passes under the roll and locks the parts in operative position. This also has the effect of locking the elimination key bell-crank in operative position, the rearwardly-extending arm of the same having a stud 73ᵏ projecting under the forwardly-extending arm of the lever 73ᶜ. To insure the return of the bar 72ᵈ to lowered position when the locked parts are released at the conclusion of the machine's operation, a stud 73ᵐ is mounted on the link 73ᵉ to extend over the upper edge of said bar. When the item printed without accumulation occurs in the middle of a list or after one or more items have been printed and accumulated and before the clearing operation, the abutment piece 72ᵏ is not in effective position and consequently after the oblique link 170ᵗ has been thrust forward and downward by depression of the elimination key it will return to normal instead of being stopped at position to index for the clear sign. As the forked lever 72 carrying said abutment piece 72ᵏ is not latched under such conditions the disabling of the means for thrusting the bar 72ⁱ forward is of no consequence as to preventing the lifting of the latch 72ᶠ.

It will be obvious that the elimination key will be locked against depression throughout an operation of the machine in which said key is not called into play, for it has already been stated that the roll 73ⁱ normally stands below the path of movement of the flange 73ʲ. Of course that flange passes over said roller and so prevents its rise and thus prevents depression of the elimination key.

*Laterally shifting paper carriage*, (Figs. 1, 2, 38 and 39.)—The usual form of roller platen 17 is journaled in depending portions or side plates 7 of a generally rectangular frame having side bars 7ᵃ and front and rear bars 7ᵇ and 7ᶜ. The latter is equipped with bearings for a pair of conical rollers 7ᵈ running on a rod or rail 7ᵉ fastened to the top of the casing and preferably slotted or grooved as at 7ᶠ to receive clips 7ᵍ secured to said rear bar of the frame. The front bar of the frame carries a single roller 7ʰ running upon a rod or bar 7ⁱ also secured to the top of the casing and a clip 7ᵏ extends under said rod. It will be obvious that this construction provides for lateral travel of the paper carriage and also prevents its rising. The visible printing makes it unnecessary for the paper carriage to be swung up and it can therefore be kept on the rails at all times. The shifting of the carriage can be conveniently done by applying the thumb to an upstanding horn 7ʲ at the right-hand end of the front bar of the frame. The side plates 7 of the frame support a shaft or rod 7' on which are mounted arms 7ᵐ carrying pressure rollers 7ⁿ suitably spring-pressed against the platen for feeding the paper thereover.

The lateral position of the carriage is secured by the engagement of a fixed lug 7ᵒ with one or another of a series of notches in the underside of the rear cross bar of a bail 7ᵖ whose side arms are pivoted on the inner sides of the plates 7 of the platen frame. The right-hand side arm is secured to a pivot stud 7ᑫ to which is also secured a handle or lever 7ʳ drawn rearwardly by a spring 7ˢ and extending forwardly along the right-side bar of the platen frame and formed with a finger piece 7ᵗ. It will be obvious that pressure upon this finger piece will result in lifting the bail and unlocking the carriage from one lateral adjustment. The finger piece is located conveniently to the horn 7ʲ by which the carriage is shifted so that with the thumb applied to said horn for moving the carriage, a finger of the same hand can be used upon the lever 7ʳ to lift and release the bail.

*Line spacing mechanism*, (Figs. 1, 38, 39 and 40.)—The platen 17 carries a ratchet wheel 17ᵃ which is acted upon by a pawl 17ᵇ but the latter is normally disengaged from the ratchet so that it presents no obstruction to the turning of the platen. The pawl is held out of engagement with the ratchet by a shield or guard 17ᶜ attached to or formed upon an index disk or plate 17ᵈ mounted to turn upon the journal of the platen. This plate bears suitable inscriptions such as numerals "3," "2" and "1" to indicate the different feeds and also suitable inscriptions as "O" and "R" to indicate no feed and complete release of the platen. A roll 17ᵉ engages the ratchet to regulate the turning of the platen, this roll being carried by an arm 17ᶠ pivoted upon a stud 17ᵍ and drawn forward by a spring 17ʰ. The stud 17″ on which the roll 17ᵉ is mounted projects to the left for engagement with a cam edge 17ⁱ of the plate or disk 17ᵈ as the latter reaches one extreme of its movement. Thus the ratchet is relieved of the pressure of the roll 17ᵉ. Said roll stud also serves as a stop to limit the movements of the index disk or plate, the latter having radial shoulders 17ʲ adapted to abut said stud. On the stud 17ᵍ there is secured an index pointer 17ᵏ which overlies the index plate. The latter is provided with a suitable handle 17ᵐ and by moving it back and forth the different adjustments will be effected. Thus if said handle is drawn all the way forward the greatest amount of feed or line-spacing is provided for, the pointer 17ᵏ registering with the numeral 3 on the index plate and the shield 17ᶜ standing so far forward that the point of the pawl 17ᵇ is ready to engage a tooth of the ratchet wheel 17ᵃ as soon as the pawl starts to move rearward. The pawl is pivotally mounted upon a slide 17ⁿ and impelled toward the ratchet wheel by a spring 17°. Said slide is mounted through slot-and-pin connections upon the frame or carriage supporting the platen and is drawn forward by a spring 17ᵖ. The rearward thrust of the slide in opposition to the spring is of sufficient extent to provide for movement of the ratchet wheel a distance of three teeth. If a less amount of feed is desired the index plate is moved rearward so as to carry more of the shield or guard 17ᶜ past the point of the pawl 17ᵇ. If the index plate is adjusted so that the pointer 17ᵏ registers with the numeral 2 then the pawl rides on the shield the distance of one tooth of the ratchet wheel and so when permitted to engage the latter can only move it the extent of two teeth. When the index plate is adjusted in such manner as to cause the pointer to register with the numeral 1 the pawl rides on the shield the extent of two teeth of the ratchet wheel and can only turn the latter the extent of one tooth. Under further adjustment of the index plate, causing the pointer to register with the O inscription, the shield prevents any engagement of the pawl with the ratchet and there will consequently be no movement of the platen. Still further movement to the rear of the index plate, causing the pointer to register with the inscription R, will result in freeing the platen from the braking and regulating effect of the friction roll 17ᵉ by reason of the cam edge 17ˡ acting on the stud 17″ as previously explained. Overthrow of the platen under actuation by the pawl is prevented by locking the pawl to the ratchet at the end of the effective stroke of the pawl. Thus the latter is formed with a beveled extension 17ᑫ which wedges under a fixed stud 17ʳ on the platen carriage as the pawl reaches the end of its rearward excursion. To insure the correct adjustment of the index plate and prevent accidental movement thereof it is formed with a series of apertures 17ˢ spaced to correspond with the inscriptions already mentioned, and adapted to be engaged by a pin 17ᵗ on the end of a spring plate or arm 17ᵘ secured to the left-hand side piece of the platen frame.

The pawl-carrying slide 17ʳ may be reciprocated either by hand or automatically through connection with one of the drive shafts of the machine. Thus a hand lever 17ᵛ is pivoted intermediate its ends upon the said slide and when depressed at its forward end presents a flange 17ʷ for a horizontally arranged spring-held line-spacing hand lever 17ˣ to act upon (Fig. 1).

When the forward or handle end of the lever 17ᵛ is elevated the flange is removed from position for coöperation with said lever 17ˣ. At its rear end the lever 17ᵛ is arranged to coöperate with the mechanism for automatically effecting the line-spacing and the adjustment of said lever to one or the other of the two positions before mentioned determines whether or not said mechanism shall be effective. Thus the said lever 17ᵛ is formed with a shoulder or hook 17ʸ which when the handle of the lever is elevated engages a stud 18 upon the depending arm of a bell crank 18ᵃ whose rearwardly-extending arm is slotted to engage a stud on an arm 18ᵇ secured to a rock-shaft 18ᶜ journaled in suitable bearings at the rear of the platen frame or carriage and extending from end to end of the latter. Said rock-shaft carries a bail composed of a rod 18ᵈ and a plate 18ᵉ set in the same and formed with arms straddling the shaft 18ᶜ and secured thereto. It will be obvious that up and down movements of this bail will result in vibration of the bell crank lever 18ᵃ and consequent reciprocation of the pawl-carrying slide if the lever 17ᵛ is adjusted in engagement with the stud 18. If the lever is in its other adjustment then its hook or shoulder 17ʸ is upwardly beyond the stud and the vibration of the bell crank lever 18ᵃ will be idle. The two positions of the lever 17ᵛ are preferably made definite, and guarded against accidental disturbance by a spring plate or arm 17ᶻ secured to the slide 17ⁿ and carrying a pin 17′ to engage one or the other of two apertures 17‴ in the widened rear end of the lever 17ᵛ.

The oscillatory drive shaft 8 is employed for imparting movement to the bail 18ᵈ—18ᵉ, to which end said shaft has secured to it a driving ratchet wheel 8ᵃ and has mounted loosely upon it a star cam wheel 8ᵇ. The latter carries a pawl 8ᶜ drawn by a spring 8ᵈ into engagement with the ratchet wheel 8ᵃ. The latter is here shown as having six teeth and the cam wheel as having the same number of projections. In oscillation the shaft 8 first carries one of the ratchet teeth forwardly past the pawl. Then the reverse rocking of the shaft causes such tooth to drive the cam wheel by acting against the pawl. The extent of movement is sufficient to cause one of the cam projections of said wheel to fully act. It will be remembered that the line-spacing pawl is normally withdrawn. Consequently it is necessary that the actuating bail be released after having been drawn downward in effecting the line spacing. The star cam wheel provides for this mode of operation inasmuch as the above-described oscillation of the shaft 8 carries the acting cam projection past the roll upon which it operates. This roll, designated 8ᵉ, is carried on a stud which unites two arms 8ᶠ and 8ᵍ resembling toggle links. The arm 8ᶠ is pivoted upon a stationary stud 8ʰ whereas the arm 8ᵍ is jointed to one arm of a bell crank lever 8ⁱ the other arm of which is jointed to the lower end of a vertical bar 8ʲ whose upper end is formed to take over the rod 18ᵈ of the line-spacing bail. Thus when the star cam wheel is turned as above described the arms or toggle links 8ᶠ and 8ᵍ are partially straightened, the bell crank 8ⁱ is rocked and the bar 8ʲ drawn down which results in rocking the bail downwardly and consequently thrusting the line-spacing pawl 17ᵇ rearwardly and effecting the feed if the index plate is adjusted to permit a feed. The cam projection of the star wheel passes by the roll 8ᵉ so that, the feed having been effected, the bail is immediately released and the pawl retracted. A spring 17ᵖ is arranged to retract the pawl as before described but the work of lifting the bar 8ʲ is preferably not imposed upon this spring. Said bar is guided in its up and down movements by a stud 8ᵏ engaging a slot of the bar and this stud supports one end of a spring 8ᵐ, the other end of which is secured to the bar, said spring serving to lift the latter. The vibration of the bail and connected parts is preferably limited by a stud 18ᶠ and radial shoulders of a bifurcated depending portion 18ᵍ of the arm 18ᵇ, said stud being secured in the end of the rear portion of the platen carriage.

What is claimed is:

1. In a machine of the class described, the combination of one or more rows of vertically arranged depressible keys; horizontally movable stop pieces operatively engaged with said keys respectively and adapted to be projected rearwardly thereby, the stop pieces forming one or more vertical series or rows directed rearward; one or more rack-carriers arranged to move up and down along the row or rows of rearwardly directed ends of said stop pieces and having an abutment piece or pieces to encounter different stop pieces of a row or of rows respectively; racks on said carriers; and adding pinions arranged to engage said racks and located in rear of the keys and above the stop pieces.

2. In a machine of the class described, the combination of one or more rows of vertically arranged depressible keys; horizontally movable stop pieces operatively engaged with said keys respectively and adapted to be projected rearwardly thereby, the stop pieces forming one or more vertical series or rows directed rearward; one or more rack-carriers arranged to move up and down along the row or rows of rearwardly directed ends of said stop pieces and having an abutment piece or pieces to encounter different stop pieces of a row or of rows respectively; racks on said carriers; adding pinions arranged to engage said racks and located in rear of the keys and above the stop pieces; a platen located above said pinions; type carriers pivoted in rear of said platen, their type-carrying portions extending in front of the same; and operating connections between the type carriers and the rack-carriers.

3. In a machine of the class described, the combination of one or more rows of vertically arranged depressible keys; horizontally movable stop pieces operatively engaged with said keys respectively and adapted to be projected rearwardly thereby, the stop pieces forming one or more vertical series or rows directed rearward; one or more rack-carriers pivoted in rear of said stop pieces to swing up and down along the same and having an abutment piece or pieces to contact with the stop pieces of a row or of rows respectively, said carriers having rearwardly projecting arms; racks on the forward ends of the carriers; adding pinions to engage said racks and located in rear of the keys and above the stop pieces; a platen located above said pinions; type carriers pivoted in rear of said platen, their type carrying portions extending in front of the same; and links connecting the type carriers in rear of their pivots with the rearwardly projecting arms of the rack carriers.

4. In a machine of the class described, the combination of one or more rows of vertically arranged depressible keys; horizontally movable stop pieces operatively engaged with said keys respectively and adapted to be projected rearwardly thereby, the stop pieces forming one or more vertical series or rows directed rearward; one or more rack-carriers arranged to move up and down along the row or rows of rearwardly directed ends of said stop pieces and having an abutment piece or pieces to encounter different stop pieces of a row or of rows respectively; racks on said carriers; adding pinions arranged to engage said racks and located in rear of the keys and above the stop pieces; a platen located above said pinions; type carriers pivoted in rear of said platen, their type carrying portions extending in front of the same; operating connections between the type carriers and the rack-carriers; and printing hammers mounted in front of the type carriers and adapted to swing rearwardly in delivering a blow on the type.

5. In a machine of the class described, the combination of a roller platen, means for advancing the same step-by-step, a hand-operated actuator for said means, a drive shaft, connections from the same for operating said means, and means for coupling or uncoupling the latter and said connections and by the same act rendering the hand-operated actuator inoperative or operative.

6. In a machine of the class described, the combination of a roller platen, means for advancing the same step-by-step, including a reciprocating member, a lever thereon adapted to assume two different adjustments, a hand-operated actuator adapted to act upon said lever under one of its adjustments, a drive shaft, and connections therefrom for acting on the lever under its other adjustment.

7. In a machine of the class described, the combination of a roller platen, means for advancing the same step-by-step, including a reciprocating member, a lever thereon adapted to assume two different adjustments and having a flange, a handle-equipped lever for acting on said flange when the first-mentioned lever is in one of its adjustments, a drive shaft, and connections therefrom for acting on the lever under its other adjustment.

8. In a machine of the class described, the combination of a roller platen, means for advancing the same step-by-step, including a reciprocating member, a lever thereon adapted to assume two different adjustments and having a shoulder, a hand-operated actuator adapted to act upon said lever under one of its adjustments, a drive shaft, and connections therefrom to act on the shoulder of said lever under its other adjustment.

9. In a machine of the class described, the combination of a roller platen, means for advancing the same step-by-step, including a reciprocating member, a lever thereon adapted to assume two different adjustments and having a flange on one side of its pivot and a shoulder on the other, a handle lever to act against the flange when the first-mentioned lever is in one of its adjustments, a drive shaft, and connections from the same to act on the shoulder of the lever when the latter is in the other of its adjustments.

10. In a machine of the class described, the combination of a roller platen, a ratchet wheel thereon, a normally retracted pawl for advancing said platen step-by-step, a reciprocating carrier for said pawl, a drive shaft, and operating connections between the same and said carrier including provisions for advancing and retracting the pawl in one and the same operation of the said shaft by a partial turning thereof.

11. In a machine of the class described, the combination of a roller platen, a ratchet wheel thereon, a normally retracted pawl for advancing said platen step-by-step, a reciprocating carrier for said pawl, a drive shaft, a pointed cam adapted to be turned thereby, and connections between the cam and the pawl carrier with provisions for retracting the latter as soon as the cam has acted to advance it.

12. In a machine of the class described, the combination of a roller platen, a ratchet wheel thereon, a normally retracted pawl for advancing said platen step-by-step, a reciprocating carrier for said pawl, an oscillatory drive shaft, a pointed cam, a one-way driving connection between the same and the shaft, and operating connections between the cam and the pawl carrier with provisions for retracting the latter as soon as the cam has acted to advance it.

13. In a machine of the class described, the combination of a roller platen, a ratchet wheel thereon, a normally retracted pawl for advancing said platen step-by-step, a reciprocating carrier for said pawl, an oscillatory drive shaft having a driving ratchet, a pointed cam loosely mounted on said shaft and having a pawl engaging said ratchet, and operating connections between the cam and the pawl carrier with provisions for retracting the latter as soon as the cam has acted to advance it.

14. In a machine of the class described, the combination of a roller platen having a ratchet wheel, a pawl for engaging the same, a spring-retracted reciprocating carrier for said pawl holding it normally withdrawn from the ratchet, an oscillating drive shaft having a driving ratchet, a pointed cam loose on said shaft and carrying a pawl engaged with said ratchet, and connections from said cam for advancing the pawl carrier, the oscillatory movement of the shaft being sufficient to permit the retraction of the pawl-carrier after the cam has acted to advance the same.

15. In a machine of the class described, the combination of a roller platen having a ratchet wheel, a pawl for engaging the same, a spring-retracted reciprocating carrier for said pawl holding it normally withdrawn from the ratchet, an oscillating drive shaft having a driving ratchet, a pointed cam loose on said shaft and carrying a pawl engaged with said ratchet, and spring-retracted connections from said cam for advancing the pawl carrier, the oscillatory movement of the shaft being sufficient to permit the retraction of the pawl-carrier after the cam has acted to advance the same.

16. In a machine of the class described, the combination of a roller platen, a ratchet wheel thereon, a normally retracted pawl for advancing said platen step-by-step, a reciprocating carrier for said pawl, a drive shaft, a pointed cam adapted to be turned thereby, and link and lever connections between the cam and the pawl carrier with provisions for retracting the latter as soon as the cam has acted to advance it.

17. In a machine of the class described, the combination of a laterally shiftable paper carriage, a roller platen therein having a ratchet wheel, a normally retracted pawl carrier having a pawl normally withdrawn from engagement with the ratchet wheel, a rocking bail on the paper carriage, operating connections between the same and the pawl carrier, a reciprocating spring-drawn bar engaging said bail, a lever coupled to said bar, toggle links coupled to said lever, an oscillating drive shaft carrying a ratchet, and a pointed cam loose on said shaft and carrying a pawl in engagement with said ratchet, said cam engaging the toggle links.

18. In a machine of the character described the combination with an accounting member, means for actuating the same and key-controlled stops for determining its extent of movement; of means for releasing a stop after performing such function and permitting the setting of a different stop before the said actuating means completes a cycle of operation, with provisions permitting restoration of the accounting member to normal notwithstanding said second stop has been already set to limit the movement thereof in the next succeeding operation of the actuating means.

19. In a machine of the character described, the combination with an accounting member, means for actuating the same, amount keys, and stops set thereby for determining the extent of movement of said accounting member; of means for releasing a stop after performing such function and permitting the setting of a different stop before the said actuating means completes a cycle of operation, with provisions permitting restoration of the accounting member to normal notwithstanding said second stop has been already set to limit the movement thereof in the next succeeding operation of the actuating means.

20. In a machine of the character described the combination with an accounting member, means for actuating the same, key-controlled stops for determining its extent of movement, and a detent for temporarily holding any stop set; of means for displacing such detent after the stop has performed its function and permitting the setting of a different stop before said actuating means completes a cycle of operations, with provisions permitting restoration of the accounting member to normal notwithstanding said second stop has been already set to limit the movement thereof in the next succeeding operation of the actuating means.

21. In a machine of the character described, the combination with an accounting member and means for actuating the same, depressible amount keys, stops set thereby for determining the extent of movement of said accounting member, and a detent for temporarily holding any stop set; of means for displacing such detent after the stop has performed its function and permitting the setting of a different stop before said actuating means completes a cycle of operation, with provisions permitting restoration of the accounting member to normal notwithstanding said second stop has been already set to limit the movement thereof in the next succeeding operation of the actuating means.

22. In a machine of the character described, the combination of accounting mechanism comprising a reciprocating member, key-controlled stops determining the extent of movement of said reciprocating member, and means for releasing a stop after performing such function and permitting the setting of a different stop before the accounting mechanism completes a cycle of operation with provisions permitting restoration of the reciprocating member to normal notwithstanding said second stop has been already set to limit the movement thereof in the next succeeding operation of the accounting mechanism.

23. In a machine of the character described, the combination with accounting mechanism comprising a reciprocating member, depressible amount keys, stops set thereby for determining the extent of movement of said reciprocating member, and a detent for temporarily holding any stop set; of means for displacing such detent after the stop has performed its function and permitting the setting of a different stop before the accounting mechanism completes a cycle of operation, with provisions permitting restoration of the reciprocating member to normal notwithstanding said second stop has been already set to limit the movement thereof in the next succeeding operation of the accounting mechanism.

24. In a machine of the character described, the combination of accounting mechanism comprising a reciprocating member with a spring-held catch, key-controlled stops for limiting the extent of travel of said reciprocating member in one direction by presenting an abutment to the catch thereof, with provisions for causing said catch to be displaced by engagement with a stop when the reciprocating member is traveling in the opposite direction, and means for releasing a stop after it has performed its limiting function and permitting another to be set before the accounting mechanism has completed a cycle of operations.

25. In a machine of the character described, the combination of accounting mechanism comprising a reciprocating member with a pivoted spring-held catch, key-controlled stops for limiting the extent of travel of said reciprocating member in one direction by presenting an abutment to the catch thereof, with provisions for causing said catch to be displaced by engagement with a stop when the reciprocating member is traveling in the opposite direction, and means for releasing a stop after it has performed its limiting function and permitting another to be set before the accounting mechanism has completed a cycle of operations.

26. In a machine of the character described, the combination of accounting mechanism comprising a reciprocating member, a reciprocating actuator therefor, key-controlled stops determining the extent of movement of said reciprocating member, and means for releasing a stop after performing such function and at the termination of the initial stroke of the said actuator and permitting the setting of a different stop before the accounting mechanism completes a cycle of operation with provisions permitting restoration of the reciprocating member to normal notwithstanding said second stop has been already set to limit the movement thereof in the next succeeding operation of the accounting mechanism.

27. In a machine of the character described, the combination with accounting mechanism comprising a reciprocating member, a reciprocating actuator therefor, depressible amount keys, stops set thereby for determining the extent of movement of said reciprocating member, and a detent for temporarily holding any stop set; of means for displacing such detent after the stop has performed its function and at the termination of the initial stroke of the said actuator and permitting the setting of a different stop before the accounting mechanism completes a cycle of operation, with provisions permitting restoration of the reciprocating member to normal notwithstanding said second stop has been already set to limit the movement thereof in the next succeeding operation of the accounting mechanism.

28. In a machine of the character described, the combination of accounting mechanism comprising a reciprocating member with a spring-held catch, a reciprocating actuator for said member, key-controlled stops for limiting the extent of travel thereof in one direction by presenting an abutment to the catch thereof, with provisions for causing said catch to be displaced by engagement with a stop when the reciprocating member is traveling in the opposite direction, and means for releasing a stop after it has performed its limiting function and at the termination of the initial stroke of the said actuator and permitting another stop to be set before the accounting mechanism has completed a cycle of operations.

29. In a machine of the character described, the combination of accounting mechanism comprising an oscillating member, key-controlled stops determining the extent of movement of said oscillating member, and means for releasing a stop after performing such function and permitting the setting of a different stop before the accounting mechanism completes a cycle of operation with provisions permitting restoration of the oscillating member to normal notwithstanding said second stop has been already set to limit the movement thereof in the next succeeding operation of the accounting mechanism.

30. In a machine of the character described, the combination with accounting mechanism comprising an oscillating member, depressible amount keys, stops set thereby for determining the extent of movement of said oscillating member, and a detent for temporarily holding any stop set; of means for displacing such detent after the stop has performed its function and permitting the setting of a different stop before the accounting mechanism completes a cycle of operation, with provisions permitting restoration of the oscillating member to normal notwithstanding said second stop has been already set to limit the movement thereof in the next succeeding operation of the accounting mechanism.

31. In a machine of the character described, the combination of accounting mechanism comprising an oscillating member with a spring-held catch, key-controlled stops for limiting the extent of travel of said oscillating member in one direction by presenting an abutment to the catch thereof, with provisions for causing said catch to be displaced by engagement with a stop when the oscillating member is traveling in the opposite direction, and means for releasing a stop after it has performed its limiting function and permitting another to be set before the accounting mechanism has completed a cycle of operations.

32. In a machine of the character described, the combination of accounting mechanism comprising an oscillating member, an oscillating actuator therefor, key-controlled stops determining the extent of movement of said oscillating member, and means for releasing a stop after performing such function and at the termination of the initial stroke of the said actuator and permitting the setting of a different stop before the accounting mechanism completes a cycle of operation with provisions permitting restoration of the oscillating member to normal notwithstanding said second stop has been already set to limit the movement thereof in the next succeeding operation of the accounting mechanism.

33. In a machine of the character described, the combination with accounting mechanism comprising an oscillating member, an oscillating actuator therefor, depressible amount keys, stops set thereby for determining the extent of movement of said oscillating member, and a detent for temporarily holding any stop set; of means for displacing such detent after the stop has performed its function and at the termination of the initial stroke of the said actuator and permitting the setting of a different stop before the accounting mechanism completes a cycle of operation, with provisions permitting restoration of the oscillating member to normal notwithstanding said second stop has been already set to limit the movement thereof in the next succeeding operation of the accounting mechanism.

34. In a machine of the character described, the combination of accounting mechanism comprising an oscillating member with a spring-held catch, an oscillating actuator for said member, key-controlled stops for limiting the extent of travel thereof in one direction by presenting an abutment to the catch thereof, with provisions for causing said catch to be displaced by engagement with a stop when the oscillating member is traveling in the opposite direction, and means for releasing a stop after it has performed its limiting function and at the termination of the initial stroke of the said actuator and permitting another stop to be set before the accounting mechanism has completed a cycle of operations.

35. In a machine of the character described, the combination with accounting mechanism comprising a reciprocating member, a reciprocating actuator therefor, depressible amount keys, stops set thereby for determining the extent of movement of said reciprocating member, a detent for temporarily holding any stop set, and means for displacing said detent; of a tappet-piece acted upon by said actuator at the end of its initial stroke and operating said detent-displacing means to release the set stop and permit the setting of a different stop before the machine completes a cycle of operation, with provisions permitting restoration of the reciprocating member to normal notwithstanding said second stop has been already set to limit the movement thereof in the next succeeding operation of the accounting mechanism.

36. In a machine of the character described, the combination with accounting mechanism comprising an oscillating member, an oscillating actuator therefor, depressible amount keys, stops set thereby for determining the extent of movement of said oscillating member, a detent for temporarily holding any stop set, and means for displacing said detent; of a tappet-piece acted upon by said actuator at the end of its initial stroke and operating said detent-displacing means to release the set stop and permit the setting of a different stop before the machine completes a cycle of operation, with provisions permitting restoration of the oscillating member to normal notwithstanding said second stop has been already set to limit the movement thereof in the next succeeding operation of the accounting mechanism.

37. In a machine of the character described, the combination of accounting mechanism comprising a reciprocating member with a spring-held catch, key-controlled stops for limiting the extent of travel of said reciprocating member in one direction by presenting an abutment to the catch thereof, with provisions for causing said catch to be displaced by engagement with a stop when the reciprocating member is traveling in the opposite direction, means for releasing a stop after it has performed its limiting function and permitting another to be set before the accounting mechanism has completed a cycle of operations, and a zero stop normally confronting the catch but adapted to be retracted by projection of any other stop into the path of the catch.

38. In a machine of the character described, the combination of a row of depressible spring-upheld keys having detent projections; a swinging spring-held detent pawl; a rock shaft having a projection to engage said pawl; a pivoted arm for rocking said shaft; a sliding bar for operating said arm; stops adapted to be projected by the keys; a reciprocating accounting member having a pivoted catch to abut said stops under movement of the member in the initial direction and adapted to wipe over the same under return movement of the member; and a reciprocating actuator for the latter having an arm to act upon the aforesaid sliding bar at the end of the initial movement of said actuator.

39. In a machine of the character described, the combination of depressible keys; detent devices for holding keys temporarily depressed; means for operating said detent devices to release depressed keys including a thrust bar and a spring-held hook pivotally mounted thereon; a special key; and lever and link connections between the same and said hook.

40. In a machine of the character described, the combination of depressible amount keys extending in a row or rows from front to rear, detent devices for the keys including an elongated member for each row of keys extending throughout the row for coöperation with any one of the keys and extending forwardly beyond the key-row; an upstanding special key or keys forward of the row or rows of amount keys and in line therewith, and camming means between said special key or keys and the forwardly extending portion or portions of the elongated detent member or members, substantially as and for the purpose described.

41. In a machine of the character described, the combination of a depressible special key and connections, detent devices for latching such key immediately upon depression, and a reciprocating prime mover adapted to release the key and lock the connections in operated position.

42. In a machine of the character described, the combination of a depressible special key and connections, detent devices for latching such key immediately upon depression, and a reciprocating prime mover adapted to release the key at the termination of its initial stroke and maintain the connections in operated position until the termination of the return stroke.

43. In a machine of the character described, the combination of depressible amount keys, stops adapted to be projected thereby, zero stops normally projected and adapted to be withdrawn by depression of amount keys, a prime mover, means operated thereby to withdraw said zero stops independently of the amount keys, and totaling means establishing coöperative relationship between said prime mover and said zero stop withdrawing means.

44. In a machine of the character described, the combination of depressible amount keys, stops adapted to be projected thereby, zero stops normally projected and adapted to be withdrawn by depression of amount keys, a reciprocatory bail for withdrawing said zero stops independently of the amount keys, a rocker for advancing the bail after lost motion is taken up, totaling means for taking up such lost motion, and a prime mover adapted to actuate the rocker.

45. In a machine of the character described, the combination of depressible amount keys, stops adapted to be projected thereby, zero stops normally projected and adapted to be withdrawn by depression of amount keys, a reciprocatory bail for withdrawing said zero stops independently of the amount keys, a rocker for advancing the bail after lost motion is taken up, totaling means for taking up such lost motion, said means including a lever linked to the rocker; and a prime mover for actuating the latter to advance the bail.

46. In a machine of the character described, the combination of sliding zero stop rods, a bail whose cross piece engages said rods, swinging arms connected with the bail, a rock shaft having arms for actuating said swinging arms and having a roller-equipped arm, a total lever, a link coupled thereto and cranked to the said rock shaft, and an oscillating prime mover having a cam ledge to act on said roller-equipped arm.

47. In a machine of the character described, the combination of sliding zero stop rods, a bail whose cross piece engages said rods, swinging arms connected with the bail, a rock shaft having arms for actuating said swinging arms and having a roller-equipped arm, a total lever, a slotted link coupled thereto and cranked to the said rock shaft, and an oscillating prime mover having a cam ledge to act on said roller-equipped arm.

48. In a machine of the character described, the combination of amount keys, normally retracted stops adapted to be projected thereby, thrust rods one for each set of key stops and adapted to be operated thereby, a bail common to said thrust rods and having a locking arm, and a total lever adapted to obstruct said arm when said lever is operated and to be obstructed by the arm when the bail is operated.

49. In a machine of the character described, the combination of an apertured keyboard plate, keys sliding therethrough and having laterally projecting studs, and lock plates slidably supported under the keyboard plate and angularly slotted to embrace the key studs, with provisions for lateral shift of said lock plate to engage them with or disengage them from the studs; substantially as and for the purpose described.

50. In a machine of the character described, the combination of an apertured keyboard plate, keys sliding therethrough and having laterally projecting studs, brackets on the underside of said plate having angular slots, lock-plates sliding in said slots and formed complimentally for sidewise shift, said plates being angularly slotted to embrace the key studs.

51. In a machine of the character described, a separable keyboard and indexing section comprising side frames, a top plate, keys sliding through the latter, amount and zero stops, and operating connections between the same and the keys.

52. In a machine of the character described, a separable keyboard and indexing section comprising side frames, a top plate, keys sliding through the latter, and key-operated amount and zero stops; in combination with detachable securing devices to hold said self-contained section in place.

53. In a machine of the character described, a separable keyboard and indexing section comprising side frames, a top plate, keys sliding through the latter, key-operated amount and zero stops, key detent devices, and column release keys.

54. In a machine of the character described, a separable keyboard and indexing section comprising side frames, a top plate, keys sliding through the latter, key-operated amount and zero stops, and zero stop withdrawing devices.

55. In a machine of the character described, a separable keyboard and indexing section comprising side frames, a top plate, keys sliding through the latter, key-operated amount and zero stops, zero stop withdrawing devices, key detent devices, and column release keys.

56. In a machine of the character described the combination of oscillating driving and driven shafts yieldingly connected together; regulating devices applied to the driven shaft; a toggle joint applied to the driving shaft and adapted to be straightened by the initial stroke thereof; means for detaining the toggle joint at straightened condition; and means operated by the driven shaft for disabling said detaining means and breaking the toggle joint.

57. In a machine of the character described the combination of oscillating driving and driven shafts yieldingly connected together; regulating devices applied to the driven shaft; toggle links applied to the driving shaft and adapted to be straightened by the initial stroke thereof, with provisions for limiting the movement of the links to straightening, and one of the links having an extension with a stud; a pivoted spring-drawn latch arm adapted to be displaced by said stud in the straightening of the toggle links and to then take over the stud to prevent breaking of the toggle joint; and means operated by the driven shaft for displacing said arm and breaking the toggle joint.

58. In a machine of the character described the combination of oscillating driving and driven shafts yieldingly connected together; regulating devices applied to the driven shaft; toggle links applied to the driving shaft and adapted to be straightened by the initial stroke thereof, with provisions for limiting the movement of the links to straightening, and one of the links having an extension with a stud; a pivoted spring-drawn latch arm adapted to be displaced by said stud in the straightening of the toggle links and to then take over the stud to prevent breaking of the toggle joint; a spring-drawn lever adapted to displace said latch arm and strike the said toggle extension to break the toggle joint; and means normally restraining said lever and controlled by the driven shaft.

59. In a machine of the character described, the combination of oscillating driving and driven shafts yieldingly connected together; regulating devices applied to the driven shaft; toggle links applied to the driving shaft and adapted to be straightened by the initial stroke thereof, with provisions for limiting the movement of the links to straightening, and one of the links having an extension with a stud; a pivoted spring-drawn latch arm adapted to be displaced by said stud in the straightening of the toggle links and to then take over the stud to prevent breaking of the toggle joint; a spring-drawn lever adapted to displace said latch arm and strike the said toggle extension to break the toggle joint; a latch normally restraining said lever; and an arm on the driven shaft adapted to displace said latch at the termination of the initial stroke of said shaft.

60. In a machine of the character described, the combination of oscillating driving and driven shafts yieldingly connected together; regulating devices applied to the driven shaft; toggle links applied to the driving shaft and adapted to be straightened by the initial stroke thereof, with provisions for limiting the movement of the links to straightening, and one of the links having an extension with a stud; a pivoted spring-drawn latch arm adapted to be displaced by said stud in the straightening of the toggle links and to then take over the stud to prevent breaking of the toggle joint; a spring-drawn lever adapted to displace said latch arm and strike the said toggle extension to break the toggle joint; a latch normally restraining said lever; and an arm on the driven shaft adapted to displace said latch at the termination of the initial stroke of said shaft, and upon the return stroke to retract the lever for engagement with the latch.

61. In a machine of the character described, the combination of oscillating driving and driven shafts yieldingly connected together; regulating devices applied to the driven shaft; toggle links applied to the driving shaft and adapted to be straightened by the initial stroke thereof, with provisions for limiting the movement of the links to straightening, and one of the links having an extension with a stud; a pivoted latch arm adapted to be displaced by said stud in the straightening of the toggle links and to then take over the stud to prevent breaking of the toggle joint; a spring-drawn lever adapted to displace said latch arm and strike the said toggle extension to break the toggle joint; a spring connecting said lever and the latch arm; and means normally restraining said lever and controlled by the driven shaft.

62. In a machine of the character described, the combination of oscillating driving and driven shafts yieldingly connected together; regulating devices applied to the driven shaft; toggle links applied to the driving shaft and adapted to be straightened by the initial stroke thereof, with provisions for limiting the movement of the links to straightening, and one of the links having an extension with a stud; a pivoted spring-drawn latch arm adapted to be displaced by said stud in the straightening of the toggle links and to then take over the stud to prevent breaking of the toggle joint; a lever adapted to displace said latch arm and strike the said toggle extension to break the toggle joint; a latch normally restraining said lever; a spring connecting the lever and the latch; and an arm on the driven shaft adapted to displace said latch at the termination of the initial stroke of said shaft.

63. In a machine of the character described, the combination of oscillating driving and driven shafts yieldingly connected together; regulating devices applied to the driven shaft; toggle links applied to the driving shaft and adapted to be straightened by the initial stroke thereof, with provisions for limiting the movement of the links to straightening, and one of the links having an extension with a stud; a pivoted latch arm adapted to be displaced by said stud in the straightening of the toggle links and to then take over the stud to prevent breaking of the toggle joint; a lever adapted to displace said latch arm and strike the said toggle extension to break the toggle joint; a spring connecting said lever and the latch arm; a latch normally restraining said lever; a spring connecting the lever and the latch; and an arm on the driven shaft adapted to displace said latch at the termination of the initial stroke of said shaft.

64. In a machine of the character described, the combination of oscillating driving and driven shafts yieldingly connected together; regulating devices applied to the driven shaft; toggle links applied to the driving shaft and adapted to be straightened by the initial stroke thereof, with provisions for limiting the movement of the links to straightening, and one of the links having an extension with a stud; a pivoted latch arm adapted to be displaced by said stud in the straightening of the toggle links and to then take over the stud to prevent breaking of the toggle joint; a lever adapted to displace said latch arm and strike the said toggle extension to break the toggle joint; a spring connecting said lever and the latch arm; a latch normally restraining said lever; a spring connecting the lever and the latch; and an arm on the driven shaft adapted to displace said latch at the termination of the initial stroke of said shaft and upon the return stroke to retract the lever for engagement with the latch.

65. In a machine of the character described, the combination of adding pinions having transfer projections; pawls adapted to be displaced by said projections; latches to hold the pawls displaced; and reciprocating racks and carriers, the racks movable a limited extent on the carriers and normally restrained from such movement by the said pawls and adapted when partaking of such movement to retract the latches.

66. In a machine of the character described, the combination of adding pinions having transfer projections; pawls adapted to be displaced by said projections; latches to hold the pawls displaced; and reciprocating racks and carriers, the racks movable a limited extent on the carriers and normally restrained from such movement by the said pawls and adapted when partaking of such movement to retract the latches with provisions for preventing reëngagement of latches with displaced pawls when the racks advance.

67. In a machine of the character described, the combination of adding pinions having transfer projections; racks for turning said pinions and having limit studs; reciprocating rack carriers, the racks mounted thereon to have limited movement independently thereof; pawls formed for displacement by the pinion projections and having laterally turned portions normally obstructing the limit studs of the racks but along which portions said studs pass when the pawls are displaced; and latches normally abutting said laterally turned portions of the pawls and restrained thereby said latches upon displacement of pawls adapted to engage the latter to hold them displaced and to be then restored by the rack studs.

68. In a machine of the character described, the combination of adding pinions having transfer projections; racks for turning said pinions and having limit studs; reciprocating rack carriers, the racks mounted thereon to have limited movement independently thereof; pawls formed for displacement by the pinion projections and having laterally turned portions normally obstructing the limit studs of the racks but along which portions said studs pass when the pawls are displaced and also having latching projections; and latches normally abutting said laterally turned portions of the pawls and restrained thereby, said latches upon displacement of pawls adapted to engage the latching projections of the latter to hold them displaced and to be then restored by the rack studs.

69. In a machine of the character described, the combination of adding pinions having transfer projections; racks for turning said pinions and having limit studs; reciprocating rack carriers, the racks mounted thereon to have limited movement independently thereof; pawls formed for displacement by the pinion projections and having laterally turned portions normally obstructing the limit studs of the racks but along which portions said studs pass when the pawls are displaced; and latches normally abutting said laterally turned portions of the pawls and restrained thereby said latches upon displacement of pawls adapted to engage the latter to hold them displaced and to be then restored by the rack studs, the pawls advancing upon such restoration sufficiently to prevent reëngagement of the latches.

70. In a machine of the character described, the combination of adding pinions having transfer projections; racks for turning said pinions and having limit studs; reciprocating rack carriers, the racks mounted thereon to have limited movement independently thereof; pawls formed for displacement by the pinion projections and having laterally turned portions normally obstructing the limit studs, of the racks but along which portions said studs pass when the pawls are displaced and also having latching projections; and latches normally abutting said laterally turned portions of the pawls and restrained thereby, said latches upon displacement of pawls adapted to engage the latching projections of the latter to hold them displaced and to be then restored by the racks studs, the pawls advancing upon such restoration sufficiently to prevent reëngagement of the latches with the latching projections of the pawls.

71. In a machine of the character described, a separable transfer or carrying section comprising cross rods and connecting plates, a set of pawls mounted on one cross rod, and a set of latches on another.

72. In a machine of the character described, a separable transfer or carrying section comprising cross rods and connecting plates, a set of pawls mounted on one cross rod, a set of latches on another, and springs connecting the pawls and latches.

73. In a machine of the character described, the combination of type carriers; spring-actuated hammers; latches normally restraining the same; pawls for displacing the latches, connections from the type carrier normally holding said pawls out of position for acting on the latches; and a reciprocating carrier for the pawls.

74. In a machine of the character described, the combination of type carriers, spring-actuated hammers; latches normally restraining the same; pawls for displacing the latches; an oscillating bail on which the pawls are pivotally mounted tending to engage the latches; and connections from the type carriers normally holding the pawls away from the latches.

75. In a machine of the character described, the combination of type carriers; spring-actuated hammers; latches normally restraining the same; pawls for displacing the latches; a reciprocating carrier for said pawls; and means for moving said carrier positively in both directions.

76. In a machine of the character described, the combination of type carriers; spring-actuated hammers; latches normally restraining the same; pawls for displacing the latches; an oscillating carrier for said pawls; a rock shaft having a shouldered projection, and an arm loose on the shaft and linked to the pawl carrier and having a stud between the shoulders of the rock shaft projection.

77. In a machine of the character described, the combination of type carriers; spring-actuated hammers; latches normally restraining the same; pawls for displacing the latches; a reciprocating carrier for said pawls; means for moving said carrier positively in both directions; and means for locking the carrier in its two extreme positions.

78. In a machine of the character described, the combination of type carriers; spring-actuated hammers; latches normally restraining the same; pawls for displacing the latches; a reciprocating carrier for said pawls having a latching projection, means for moving the said carrier to and fro positively, a pair of latches for engaging the projection of said carrier to alternately hold the latter in its two extreme positions, and means for operating said latches.

79. In a machine of the character described, the combination of type carriers; spring-actuated hammers; latches normally restraining the same; pawls for displacing the latches; a reciprocating carrier for said pawls having a latching projection, means for moving the said carrier to and fro positively, a pair of crossed latches extending on opposite sides of the projection on the carrier and adapted to alternately hold the latter in its two extreme positions, a spring connecting said latches, and means for alternately displacing the latches against the tension of such spring.

80. In a machine of the character described, the combination of type carriers; spring-actuated hammers; latches normally restraining the same; pawls for displacing the latches; a reciprocating carrier for said pawls having a latching projection, means for moving the said carrier to and fro positively, a pair of crossed latches extending on opposite sides of the projection on the carrier and adapted to alternately hold the latter in its two extreme positions, a spring connecting said latches, and a rock arm having a stud adapted to alternately act on said latches to displace them against the stress of said spring.

81. In a machine of the character described, the combination with an accounting member, means for actuating the same and key-controlled stops for determining its extent of movement; of means for releasing a stop after performing such function and permitting the setting of a different stop before the said actuating means completes a cycle of operations, with provisions permitting restoration of the accounting member to normal notwithstanding said second stop has been already set to limit the movement thereof in the next succeeding operation of the actuating means, and means for preventing advance of said accounting member upon release of the stop.

82. In a machine of the character described, the combination with an accounting member, means for actuating the same, key-controlled stops for determining its extent of movement, and a detent for temporarily holding any stop set; of means for displacing such detent after the stop has performed its function and permitting the setting of a different stop before the said actuating means completes a cycle of operations, with provisions permitting restoration of the accounting member to normal notwithstanding said second stop has been already set to limit the movement thereof in the next succeeding operation of the actuating means, and means for preventing advance of said accounting member upon displacement of the detent.

83. In a machine of the character described, the combination of accounting mechanism comprising a reciprocating member, key-controlled stops determining the extent of movement of said reciprocating member, and means for releasing a stop after performing such function and permitting the setting of a different stop before the accounting mechanism completes a cycle of operations with provisions permitting restoration of the reciprocating member to normal notwithstanding said second stop has been already set to limit the movement thereof in the next succeeding operation of the machine, and means for preventing advance of said reciprocating member upon release of the stop.

84. In a machine of the character described, the combination with accounting mechanism comprising a reciprocating member, depressible amount keys, stops set thereby for determining the extent of movement of said reciprocating member, and a detent for temporarily holding any stop set; of means for displacing such detent after the stop has performed its function and permitting the setting of a different stop before the accounting mechanism completes a cycle of operation, with provisions permitting restoration of the reciprocating member to normal notwithstanding said second stop has been already set to limit the movement thereof in the next succeeding operation of the accounting mechanism, and means for preventing advance of said reciprocating member upon displacement of the detent.

85. In a machine of the character described, the combination of accounting mechanism comprising a reciprocating member with a spring-held catch, key-controlled stops for limiting the extent of travel of said reciprocating member in one direction by presenting an abutment to the catch thereof, with provisions for causing said catch to be displaced by engagement with a stop when the reciprocating member is traveling in the opposite direction, means for releasing a stop after it has performed its limiting function and permitting another to be set before the accounting mechanism has completed a cycle of operations, and means for preventing advance of said reciprocating member upon release of the stop.

86. In a machine of the character described, the combination of accounting mechanism comprising a reciprocating member, a reciprocating actuator therefor, key-controlled stops determining the extent of movement of said reciprocating member, means for releasing a stop after performing such function and at the termination of the initial stroke of the said actuator and permitting the setting of a different stop before the machine completes a cycle of operation with provisions permitting restoration of the reciprocating member to normal notwithstanding said second stop has been already set to limit the movement thereof in the next succeeding operation of the accounting mechanism, and means for preventing advance of said reciprocating member upon release of the stop.

87. In a machine of the character described, the combination with accounting mechanism comprising a reciprocating member, a reciprocating actuator therefor, depressible amount keys, stops set thereby for determining the extent of movement of said reciprocating member, and a detent for temporarily holding any stop set; of means for displacing such detent after the stop has performed its function and at the termination of the initial stroke of the said actuator and permitting the setting of a different stop before the accounting mechanism completes a cycle of operation, with provisions permitting restoration of the reciprocating member to normal notwithstanding said second stop has been already set to limit the movement thereof in the next succeeding operation of the accounting mechanism, and means for preventing advance of said reciprocating member upon displacement of the detent.

88. In a machine of the character described, the combination of accounting mechanism comprising a reciprocating member with a spring-held catch, a reciprocating actuator for said member, key-controlled stops for limiting the extent of travel thereof in one direction by presenting an abutment to the catch thereof, with provisions for causing said catch to be displaced by engagement with a stop when the reciprocating member is traveling in the opposite direction, means for releasing a stop after it has performed its limiting function and at the termination of the initial stroke of the said actuator and permitting another stop to be set before the accounting mechanism has completed a cycle of operations, and means for preventing advance of said reciprocating member upon release of the stop.

89. In a machine of the character described, the combination of a reciprocating accounting member, means for variously limiting advance thereof, reciprocating actuating means, and means for preventing retrograde movement of said member, said means adapted to be disabled as the actuating means terminate the initial stroke.

90. In a machine of the character described, the combination of a reciprocating accounting member having a ratchet, means for variously limiting the advance of said member, reciprocating actuating means, and a pawl engaging said ratchet to prevent retrograde movement of the accounting member, said pawl adapted to be displaced as the actuating means reach the end of the initial stroke.

91. In a machine of the character described, the combination with a differentially movable reciprocating accounting member; of double-acting restraining means therefor adapted to alternately block retrograde and advance movement thereof.

92. In a machine of the character described, the combination with a differentially movable reciprocating accounting member having a ratchet; of a double-acting pawl engaging said ratchet to alternately block retrograde and advance movement of said member.

93. In a machine of the character described, the combination with a differentially movable reciprocating accounting member and reciprocating actuating means; of double-acting restraining means for said member alternately blocking retrograde and advance movement thereof, said means being reversed in action whenever the actuating means reaches one or the other end of its stroke.

94. In a machine of the character described, the combination with a differentially movable reciprocating accounting member having a ratchet and reciprocating actuating means; of a double-acting pawl for engaging said ratchet to alternately block retrograde and advance movement of the member, said pawl being reversed whenever the actuating means reaches one or the other end of its stroke.

95. In a machine of the character described, the combination with a differentially movable reciprocating accounting member having a ratchet and reciprocating actuating means; of a double-acting pawl for engaging said ratchet to alternately block retrograde and advance movement of the member, a rocking spring holder, a spring connecting the latter with the pawl, and means for intermittently rocking said holder as the actuating means completes its strokes in opposite directions.

96. In a machine of the character described, the combination of reciprocating differential actuators, an accumulator movable into and out of engagement therewith, an oscillating arm cam-slotted to engage the accumulator, a lever linked to said arm and means for intermittently shifting said lever first one way and then the other.

97. In a machine of the character described, the combination of reciprocating differential actuators, an accumulator movable into and out of engagement therewith and normally in engagement, means for initially disengaging the accumulator and maintaining the same disengaged while the actuators advance, said means then operating to reëngage the accumulator with its actuators to partake of the return movement of the latter and said means comprising a rock arm and wipe pawl thereon and a lever with studs for the latter to act upon; and means for discontinuing at will the normal coöperative relationship between one of said studs and said wipe pawl thus preventing the initial disengagement of the accumulator.

98. In a machine of the character described, the combination of reciprocating differential actuators, an accumulator movable into and out of engagement therewith and normally in engagement, means for initially disengaging the accumulator and maintaining the same disengaged while the actuators advance, said means then operating to reëngage the accumulator with its actuators to partake of the return movement of the latter and said means comprising a rock arm and wipe pawl thereon and a lever with studs for the latter to act upon; and a depressible key and connections for discontinuing at will the normal coöperative relationship between one of said studs and said wipe pawl thus preventing the initial disengagement of the accumulator.

99. In a machine of the character described, the combination of reciprocating differential actuators, an accumulator movable into and out of engagement therewith and normally in engagement, means for initially disengaging the accumulator and maintaining the same disengaged while the actuators advance, said means then operating to reëngage the accumulator with its actuators to partake of the return movement of the latter and said means comprising a rock arm and wipe pawl thereon and a lever with studs for the latter to act upon; an arm journaled concentrically with the pawl-carrying arm and having a blade to engage and displace the pawl when the latter is at normal position; and a key and connections for operating said blade-carrying arm.

100. In a machine of the character described, the combination of reciprocating differential actuators, an accumulator movable into and out of engagement therewith and normally in engagement, means for initially disengaging the accumulator and maintaining the same disengaged while the actuators advance, said means then operating to reëngage the accumulator with its actuators to partake of the return movement of the latter and said means comprising a rock arm and wipe pawl thereon and a lever with studs for the latter to act upon; means for discontinuing at will the normal coöperative relationship between one of said studs and said wipe pawl thus preventing the initial disengagement of the accumulator; and means for discontinuing coöperative relationship between the other of said studs and said wipe pawl, operable independently of the last-mentioned means.

101. In a machine of the character described, the combination of reciprocating differential actuators, an accumulator movable into and out of engagement therewith and normally in engagement, means for initially disengaging the accumulator and maintaining the same disengaged while the actuators advance, said means then operating to reëngage the accumulator with its actuators to partake of the return movement of the latter and said means comprising a rock arm and wipe pawl thereon and a lever with studs for the latter to act upon; a depressible key and connections for discontinuing at will the normal coöperative relationship between one of said studs and said wipe pawl thus preventing the initial disengagement of the accumulator; and a second key and connections for discontinuing coöperative relationship between the other of said studs and said wipe pawl.

102. In a machine of the character described, the combination of reciprocating differential actuators, an accumulator movable into and out of engagement therewith and normally in engagement, means for initially disengaging the accumulator and maintaining the same disengaged while the actuators advance, said means then operating to reëngage the accumulator with its actuators to partake of the return movement of the latter and said means comprising a rock arm and wipe pawl thereon and a lever with studs for the latter to act upon; means for discontinuing at will the normal coöperative relationship between one of said studs and said wipe pawl thus preventing the initial disengagement of the accumulator; means for discontinuing coöperative relationship between the other of said studs and said wipe pawl when the rock arm is forward; and means for rocking the lever independently of the said wipe pawl.

103. In a machine of the character described, the combination of reciprocating differential actuators, an accumulator movable into and out of engagement therewith and normally in engagement, means for initially disengaging the accumulator and maintaining the same disengaged while the actuators advance, said means then operating to reëngage the accumulator with its actuators to partake of the return movement of the latter and said means comprising a rock arm and wipe pawl thereon and a lever with studs for the latter to act upon; a key and connections for discontinuing coöperative relationship between said wipe pawl and both studs; and means controlled by said key for rocking the lever independently of said wipe pawl.

104. In a machine of the character described, the combination of reciprocating differential actuators, an accumulator movable into and out of engagement therewith and normally in engagement, means for initially disengaging the accumulator and maintaining the same disengaged while the actuators advance, said means then operating to reëngage the accumulator with its actuators to partake of the return movement of the latter and said means comprising a rock arm and wipe pawl thereon and a lever with studs for the latter to act upon; a depressible key and connections for discontinuing at will the normal coöperative relationship between one of said studs and said wipe pawl thus preventing the initial disengagement of the accumulator; a second key operating upon the same connections and having other connections for discontinuing coöperative relationship between the other stud and the wipe pawl; and means controlled by said second key for rocking the lever independently of said wipe pawl.

105. In a machine of the character described, the combination of reciprocating differential actuators, an accumulator movable into and out of engagement therewith and normally in engagement, means for initially disengaging the accumulator and maintaining the same disengaged while the actuators advance, said means then operating to reëngage the accumulator with its actuators to partake of the return movement of the latter and said means comprising a rock arm and wipe pawl thereon and a lever with studs for the latter to act upon; an arm journaled concentrically with the pawl-carrying arm and having a blade to engage and displace the pawl when the latter is at normal position; a key and connections for operating said blade-carrying arm; a second key operating upon the same connections and having other connections for discontinuing coöperative relationship between the other stud and the wipe pawl; and means controlled by said second key for rocking the lever independently of said wipe pawl.

106. In a machine of the character described, the combination of reciprocating differential actuators, an accumulator movable into and out of engagement therewith and normally in engagement, means for initially disengaging the accumulator and maintaining the same disengaged while the actuators advance, said means then operating to reëngage the accumulator with its actuators to partake of the return movement of the latter and said means comprising a rock arm and wipe pawl thereon and a lever with studs for the latter to act upon; means for discontinuing at will the normal coöperative relationship between one of said studs and said wipe pawl thus preventing the initial disengagement of the accumulator; means for discontinuing coöperative relationship between the other of said studs and said wipe pawl when the rock arm is forward; means for rocking the lever independently of the said wipe pawl; and means for returning the lever to normal after being so rocked.

107. In a machine of the character described, the combination of reciprocating differential actuators, an accumulator movable into and out of engagement therewith and normally in engagement, means for initially disengaging the accumulator and maintaining the same disengaged while the actuators advance, said means then operating to reëngage the accumulator with its actuators to partake of the return movement of the latter and said means comprising a rock arm and wipe pawl thereon and a lever with studs for the latter to act upon; a key and connections for discontinuing coöperative relationship between said wipe pawl and both studs; means controlled by said key for rocking the lever independently of said wipe pawl; and means for returning the lever to normal after being so rocked.

108. In a machine of the character described, the combination of reciprocating differential actuators, an accumulator movable into and out of engagement therewith and normally in engagement, means for initially disengaging the accumulator and maintaining the same disengaged while the actuators advance, said means then operating to reëngage the accumulator with its actuators to partake of the return movement of the latter and said means comprising a rock arm and wipe pawl thereon and a lever with studs for the latter to act upon; a depressible key and connections for discontinuing at will the normal coöperative relationship between one of said studs and said wipe pawl thus preventing the initial disengagement of the accumulator; a second key operating upon the same connections and having other connections for discontinuing coöperative relationship between the other stud and the wipe pawl; means controlled by said second key for rocking the lever independently of said wipe pawl; and means for returning the lever to normal after being so rocked.

109. In a machine of the character described, the combination of reciprocating differential actuators, an accumulator movable into and out of engagement therewith and normally in engagement, means for initially disengaging the accumulator and maintaining the same disengaged while the actuators advance, said means then operating to reëngage the accumulator with its actuators to partake of the return movement of the latter and said means comprising a rock arm and wipe pawl thereon and a lever with studs for the latter to act upon; a depressible key and connections for discontinuing at will the normal coöperative relationship between one of said studs and said wipe pawl thus preventing the initial disengagement of the accumulator; a second key and connections for discontinuing coöperative relationship between the other of said studs and said wipe pawl; a third key for operating upon the connections of both the other two keys; and means controlled by said third key for rocking the lever independently of the wipe pawl.

110. In a machine of the character described, the combination of differentially reciprocatory actuators, an accumulator movable into and out of engagement therewith, means for so moving said accumulator comprising a lever with studs and a rock arm with a wipe pawl to act alternately on said studs; means for disabling the wipe pawl at will; and a second wipe pawl and connections adapted to be brought into play when the first wipe pawl is disabled, said second wipe pawl and connections operating to rock the lever and disengage the accumulator from its actuators.

111. In a machine of the character described, the combination of differentially reciprocatory actuators, an accumulator movable into and out of engagement therewith, means for so moving said accumulator comprising a lever with studs and a rock arm with a wipe pawl to act alternately on said studs; means for disabling the wipe pawl at will; a second wipe pawl adapted to be brought into coöperative relationship with said rock arm when the first wipe pawl is disabled; and a lever carrying said second wipe pawl and linked to the first-mentioned lever.

112. In a machine of the character described, the combination of differentially reciprocatory actuators, an accumulator movable into and out of engagement therewith, means for so moving said accumulator comprising a lever with studs and a rock arm with a wipe pawl to act alternately on said studs; means for disabling the wipe pawl at will comprising an arm movable to intercept the same at the end of the initial stroke of the rock arm and a forked lever for moving said intercepting arm; a second wipe pawl normally restrained by a branch of said forked lever and adapted upon movement of the latter to come to coöperative relationship with the rock arm; and a lever carrying said second wipe pawl and linked to the first-mentioned lever.

113. In a machine of the character described, the combination of differentially reciprocatory actuators, an accumulator movable into and out of engagement therewith, means for so moving said accumulator comprising a lever with studs and a rock arm with a wipe pawl to act alternately on said studs; means for disabling the wipe pawl at will comprising an arm movable to intercept the same at the end of the initial stroke of the rock arm; a forked cam-slotted lever for moving said intercepting arm, a lever engaging the cam slot, and a key connected with said last-mentioned lever; a second wipe pawl normally restrained by a branch of said forked lever and adapted upon movement of the latter to come to coöperative relationship with the rock arm; and a lever carrying said second wipe pawl and linked to the first-mentioned lever.

114. In a machine of the character described, the combination of differentially reciprocatory actuators, an accumulator movable into and out of engagement therewith, means for so moving said accumulator comprising a lever with studs and a rock arm with a wipe pawl to act alternately on said studs; means for disabling the wipe pawl at will, means for rocking the lever from normal independently of said wipe pawl upon the commencement of the return stroke of the rock arm; and means for thereafter returning said lever to normal to reëngage the accumulator with its actuators as the rock arm reaches normal, said means comprising a link connected with the lever and an arm rocking with the rock arm and acting on the link.

115. In a machine of the character described, the combination of a differentially reciprocatory special type-carrier having an abutment projection; a stepped indexing member movable to present one or another of its shoulders in the path of said projection; and special keys and connections for variously positioning said indexing member.

116. In a machine of the character described, the combination with accumulator and differentially reciprocatory actuators engageable and disengageable, type carriers moving with the actuators; means for reciprocating the actuators; means for reversing the order of engagement and disengagement of accumulator and actuators; a special type-carrier for characterizing an accumulated item first printed after such reversal; means for positioning the special type-carrier for so characterizing such items, including an abutment member movable toward effective position as an incident to adjustment of parts preparatory to such reversal; and means for holding such member in such position, said last-mentioned means rendered effective as an incident to the operation of the aforesaid means for reciprocating the actuators.

117. In a machine of the character described, the combination with accumulator and differentially reciprocatory actuators engageable and disengageable, type carriers moving with the actuators; means for reciprocating the actuators; means for reversing the order of engagement and disengagement of accumulator and actuators; a special type-carrier for characterizing an accumulated item first printed after such reversal; means for positioning the special type-carrier for so characterizing such item, including an abutment member movable toward effective position as an incident to adjustment of parts preparatory to such reversal; means for further moving said member as an incident to the operation of the aforesaid means for reciprocating the actuators; and means coming into action as a result of such further movement of said member for holding the latter in effective position.

118. In a machine of the character described, the combination with accumulator and differentially reciprocatory actuators engageable and disengageable, type carriers moving with the actuators; means for reciprocating the actuators; means for reversing the order of engagement and disengagement of accumulator and actuators; a special type-carrier for characterizing an accumulated item first printed after such reversal; means for positioning the special type-carrier for so characterizing such item, including an abutment member movable toward effective position as an incident to adjustment of parts preparatory to such reversal; means for further moving said member as an incident to the operation of the aforesaid means for reciprocating the actuators; and a latch for holding said member in effective position, said latch taking effect as a result of such further movement of said member.

119. In a machine of the character described, the combination with accumulator and differentially reciprocatory actuators engageable and disengageable, type carriers moving with the actuators; means for reciprocating the actuators; means for reversing the order of engagement and disengagement of accumulator and actuators; a special type-carrier for characterizing an accumulated item first printed after such reversal; means for positioning the special type-carrier for so characterizing such item, including an abutment member movable toward effective position as an incident to adjustment of parts preparatory to such reversal; means for holding such member in such position, said last-mentioned means rendered effective as an incident to the operation of the aforesaid means for reciprocating the actuators; setting up devices; and means controlled thereby for disabling said holding means.

120. In a machine of the character described, the combination with accumulator and differentially reciprocatory actuators engageable and disengageable, type carriers moving with the actuators; means for reciprocating the actuators; means for reversing the order of engagement and disengagement of accumulator and actuators; a special type-carrier for characterizing an accumulated item first printed after such reversal; means for positioning the special type-carrier for so characterizing such item, including an abutment member movable toward effective position as an incident to adjustment of parts preparatory to such reversal; means for further moving said member as an incident to the operation of the aforesaid means for reciprocating the actuators; means coming into action as the result of such further movement of said member for holding the latter in effective position; setting up devices; and means controlled thereby for disabling said holding means.

121. In a machine of the character described, the combination with accumulator and differentially reciprocatory actuators engageable and disengageable, type carriers moving with the actuators; means for reciprocating the actuators; means for reversing the order of engagement and disengagement of accumulator and actuators; a special type-carrier for characterizing an accumulated item first printed after such reversal; means for positioning the special type-carrier for so characterizing such item, including an abutment member movable toward effective position as an incident to adjustment of parts preparatory to such reversal; means for further moving said member as an incident to the operation of the aforesaid means for reciprocating the actuators; a latch for holding said member in effective position, said latch taking effect as a result of such further movement of said member; setting up devices; and means controlled thereby for disabling said latch.

122. In a machine of the character described, the combination with accumulator and differentially reciprocatory actuators engageable and disengageable, type carriers moving with the actuators; means for reciprocating the actuators; means for reversing the order of engagement and disengagement of accumulator and actuators; a special type-carrier for characterizing an accumulated item first printed after such reversal; means for positioning the special type-carrier for so characterizing such item, including an abutment member movable toward effective position as an incident to adjustment of parts preparatory to such reversal; means for holding such member in such position, said last-mentioned means rendered effective as an incident to the operation of the aforesaid means for reciprocating the actuators; setting up devices; means controlled thereby for disabling said holding means; means for keeping the accumulator and actuators disengaged during movement of the latter in both directions as determined in extent by the setting up devices; and means operated by the last-mentioned means for disabling the aforesaid disabling means.

123. In a machine of the character described, the combination with accumulator and differentially reciprocatory actuators engageable and disengageable, type carriers moving with the actuators; means for reciprocating the actuators; means for reversing the order of engagement and disengagement of accumulator and actuators; a special type-carrier for characterizing an accumulated item first printed after such reversal; means for positioning the special type-carrier for so characterizing such item, including an abutment member movable toward effective position as an incident to adjustment of parts preparatory to such reversal; means for further moving said member as an incident to the operation of the aforesaid means for reciprocating the actuators; means coming into action as the result of such further movement of said member for holding the latter in effective position; setting up devices; means controlled thereby for disabling said holding means; means for keeping the accumulator and actuators disengaged during movement of the latter in both directions as determined in extent by the setting up devices; and means operated by the last-mentioned means for disabling the aforesaid disabling means.

124. In a machine of the character described, the combination with accumulator and differentially reciprocatory actuators engageable and disengageable; typecarriers moving with the actuators; means for reciprocating the actuators; means for reversing the order of engagement and disengagement of accumulator and actuators; a special type-carrier for characterizing an accumulated item first printed after such reversal;

means for positioning the special type-carrier for so characterizing such item, including an abutment member movable toward effective position as an incident to adjustment of parts preparatory to such reversal; means for further moving said member as an incident to the operation of the aforesaid means for reciprocating the actuators; a latch for holding said member in effective position, said latch taking effect as a result of such further movement of said member; setting up devices; means controlled thereby for disabling said latch; means for keeping the accumulator and actuators disengaged during movement of the latter in both directions as determined in extent by the setting up devices; and means operated by the last-mentioned means for disabling the aforesaid latch-disabling means.

125. In a machine of the character described, the combination with accumulator and differentially reciprocatory actuators engageable and disengageable, type carriers moving with the actuators; reciprocatory means for reciprocating the actuators; means for keeping accumulator and actuators disengaged during movement of said reciprocating means in one direction and engaged during movement thereof in the opposite direction; means for reversing the order of engagement and disengagement of accumulator and actuators; a special type-carrier for characterizing an accumulated item first printed after such reversal; means for positioning the special type-carrier for so characterizing such item, including an abutment member movable toward effective position as an incident to adjustment of parts preparatory to such reversal; and means for holding such member in such position, said last-mentioned means rendered effective as an incident to the operation of the aforesaid means for reciprocating the actuators and at the conclusion of the movement thereof in the initial direction.

126. In a machine of the character described, the combination with accumulator and differentially reciprocatory actuators engageable and disengageable, type carriers moving with the actuators; reciprocatory means for reciprocating the actuators; means for keeping accumulator and actuators disengaged during movement of said reciprocating means in one direction and engaged during movement thereof in the opposite direction; means for reversing the order of engagement and disengagement of accumulator and actuators; a special type-carrier for characterizing an accumulated item first printed after such reversal; means for positioning the special type-carrier for so characterizing such item, including an abutment member movable toward effective position as an incident to adjustment of parts preparatory to such reversal; means for further moving said member as an incident to the operation of the aforesaid means for reciprocating the actuators and at the conclusion of the movement thereof in the initial direction; and means coming into action as the result of such further movement of said member for holding the latter in effective position.

127. In a machine of the character described, the combination with accumulator and differentially reciprocatory actuators engageable and disengageable, type carriers moving with the actuators; reciprocatory means for reciprocating the actuators; means for keeping accumulator and actuators disengaged during movement of said reciprocating means in one direction and engaged during movement thereof in the opposite direction; means for reversing the order of engagement and disengagement of accumulator and actuators; a special type-carrier for characterizing an accumulated item first printed after such reversal; means for positioning the special type-carrier for so characterizing such item, including an abutment member movable toward effective position as an incident to adjustment of parts preparatory to such reversal; means for further moving said member as an incident to the operation of the aforesaid means for reciprocating the actuators and at the conclusion of the movement thereof in the initial direction; and a latch for holding said member in effective position, said latch taking effect as a result of such further movement of said member.

128. In a machine of the character described, the combination with accumulator and differentially reciprocatory actuators engageable and disengageable, type carriers moving with the actuators; reciprocatory means for reciprocating the actuators; means for keeping accumulator and actuators disengaged during movement of said reciprocating means in one direction and engaged during movement thereof in the opposite direction; means for reversing the order of engagement and disengagement of accumulator and actuators; a special type-carrier for characterizing an accumulated item first printed after such reversal; means for positioning the special type-carrier for so characterizing such item, including an abutment member movable toward effective position as an incident to adjustment of parts preparatory to such reversal; means for holding such member in such position, said last-mentioned means rendered effective as an incident to the operation of the aforesaid means for reciprocating the actuators and at the conclusion of the movement thereof in the initial direction; setting up devices; and means controlled thereby for disabling said holding means.

129. In a machine of the character described, the combination with accumulator and differentially reciprocatory actuators engageable and disengageable, type carriers moving with the actuators; reciprocatory means for reciprocating the actuators; means for keeping accumulator and actuators disengaged during movement of said reciprocating means in one direction and engaged during movement thereof in the opposite direction; means for reversing the order of engagement and disengagement of accumulator and actuators; a special type-carrier for characterizing an accumulated item first printed after such reversal; means for positioning the special type-carrier for so characterizing such item, including an abutment member movable toward effective position as an incident to adjustment of parts preparatory to such reversal; means for further moving said member as in incident to the operation of the aforesaid means for reciprocating the actuators and at the conclusion of the movement thereof in the initial direction; means coming into action as the result of such further movement of said member for holding the latter in effective position; setting up devices; and means controlled thereby for disabling said holding means.

130. In a machine of the character described, the combination with accumulator and differentially reciprocatory actuators engageable and disengageable, type carriers moving with the actuators; reciprocatory means for reciprocating the actuators; means for keeping accumulator and actuators disengaged during movement of said reciprocating means in one direction and engaged during movement thereof in the opposite direction; means for reversing the order of engagement and disengagement of accumulator and actuators; a special type-carrier for characterizing an accumulated item first printed after such reversal; means for positioning the special type-carrier for so characterizing such item, including an abutment member movable toward effective position as an incident to adjustment of parts preparatory to such reversal; means for further moving said member as an incident to the operation of the aforesaid means for reciprocating the actuators and at the conclusion of the movement thereof in the initial direction; a latch for holding said member in effective position, said latch taking effect as a result of such further movement of said member; setting up devices; and means controlled thereby for disabling said latch.

131. In a machine of the character described, the combination with accumulator and differentially reciprocatory actuators engageable and disengageable, type carriers moving with the actuators; reciprocatory means for reciprocating the actuators; means for keeping accumulator and actuators disengaged during movement of said reciprocating means in one direction and engaged during movement thereof in the opposite direction; means for reversing the order of engagement and disengagement of accumulator and actuators; a special type-carrier for characterizing an accumulated item first printed after such reversal; means for positioning the special type-carrier for so characterizing such item, including an abutment member movable toward effective position as an incident to adjustment of parts preparatory to such reversal; means for holding such member in such position, said last-mentioned means rendered effective as an incident to the operation of the aforesaid means for reciprocating the actuators and at the conclusion of the movement thereof in the initial direction; setting up devices; means controlled thereby for disabling said holding means; means for keeping the accumulator and actuators disengaged during movement of the latter in both directions as determined in extent by the setting up devices; and means operated by the last-mentioned means for disabling the aforesaid disabling means.

132. In a machine of the character described, the combination with accumulator and differentially reciprocatory actuators engageable and disengageable, type carriers moving with the actuators; reciprocatory means for reciprocating the actuators; means for keeping accumulator and actuators disengaged during movement of said reciprocating means in one direction and engaged during movement thereof in the opposite direction; means for reversing the order of engagement and disengagement of accumulator and actuators; a special type-carrier for characterizing an accumulated item first printed after such reversal; means for positioning the special type-carrier for so characterizing such item, including an abutment member movable toward effective position as an incident to adjustment of parts preparatory to such reversal; means for further moving said member as an incident to the operation of the aforesaid means for reciprocating the actuators and at the conclusion of the movement thereof in the initial direction; means coming into action as the result of such further movement of said member for holding the latter in effective position; setting up devices; means controlled thereby for disabling said holding means; means for keeping the accumulator and actuators disengaged during movement of the latter in both directions as determined in extent by the setting up devices; and means operated by the last-mentioned means for disabling the aforesaid disabling means.

133. In a machine of the character described, the combination with accumulator and differentially reciprocatory actuators engageable and disengageable; type carriers moving with the actuators; reciprocatory means for reciprocating the actuators; means for keeping accumulator and actuators disengaged during movement of said reciprocating means in one direction and engaged during movement thereof in the opposite direction; means for reversing the order of engagement and disengagement of accumulator and actuators; a special type-carrier for characterizing an accumulated item first printed after such reversal; means for positioning the special type-carrier for so characterizing such item, including an abutment member movable toward effective position as an incident to adjustment of parts preparatory to such reversal; means for further moving said member as an incident to the operation of the aforesaid means for reciprocating the actuators and at the conclusion of the movement thereof in the initial direction; a latch for holding said member in effective position, said latch taking effect as a result of such further movement of said member; setting up devices; means controlled thereby for disabling said latch; means for keeping the accumulator and actuators disengaged during movement of the latter in both directions as determined in extent by the setting up devices; and means operated by the last-mentioned means for disabling the aforesaid latch-disabling means.

134. In a machine of the character described, the combination of a differentially reciprocatory special type carrier having an abutment projection; a swinging stepped segment; a longitudinally movable link cranked thereto; and special keys and connections acting differentially on said bar to variously position said stepped segment.

135. In a machine of the character described, the combination of a differentially reciprocatory special type carrier having an abutment projection; a swinging stepped segment; a longitudinally movable link cranked thereto; depressible special keys; and bell cranks operated thereby and operating the said bar to variously position the stepped segment.

136. In a machine of the character described, the combination of an accumulator; differentially reciprocatory actuators therefor; means for reciprocating said actuators; means for moving the accumulators into and out of engagement therewith, normally causing the accumulator to remain disengaged during the initial or forward stroke of actuators and to become engaged with the actuators for the return stroke thereof, thus effecting accumulation; means for reversing such order of engagement and disengagement of actuators and accumulators; type carriers moving with the actuators; a special type carrier; a movable member for variously determining the position thereof; a total key and connections for moving said member, said key controlling the aforesaid means for reversing the order of engagement and disengagement of actuators and accumulator; a pivoted abutment member moved by said key toward position for limiting the return of the special type carrier positioning member; a reciprocating bar acting on said abutment member to complete its movement to effective position; and a latch for holding said member in such position.

137. In a machine of the character described, the combination of an accumulator; differentially reciprocatory actuators therefor; means for reciprocating said actuators; means for moving the accumulators into and out of engagement therewith, normally causing the accumulator to remain disengaged during the initial or forward stroke of actuators and to become engaged with the actuators for the return stroke thereof, thus effecting accumulation; means for reversing such order of engagement and disengagement of actuators and accumulators; type carriers moving with the actuators; a special type carrier; a movable member for variously determining the position thereof; a total key and connections for moving said member, said key controlling the aforesaid means for reversing the order of engagement and disengagement of actuators and accumulator; a pivoted abutment member moved by said key toward position for limiting the return of the special type carrier positioning member; a reciprocating bar acting on said abutment member to complete its movement to effective position; a latch for holding said member in such position; amount keys; and means controlled thereby for disabling the latch.

138. In a machine of the character described, the combination of an accumulator; differentially reciprocatory actuators therefor; means for reciprocating said actuators; means for moving the accumulators into and out of engagement therewith, normally causing the accumulator to remain disengaged during the initial or forward stroke of actuators and to become engaged with the actuators for the return stroke thereof, thus effecting accumulation; means for reversing such order of engagement and disengagement of actuators and accumulators; type carriers moving with the actuators; a special type carrier; a movable member for variously determining the position thereof; a total key and connections for moving said member, said key controlling the aforesaid means for reversing the order of engagement and disengagement of actuators and accumulator; a pivoted abutment member moved by said key toward position for limiting the return of the special type carrier positioning member; a reciprocating bar acting on said abutment member to complete its movement to effective position; a latch for holding said member in such position; amount keys; and means controlled thereby for disabling the latch and operated by said reciprocating bar.

139. In a machine of the character described, the combination of an accumulator; differentially reciprocatory actuators therefor; means for reciprocating said actuators; means for moving the accumulators into and out of engagement therewith, normally causing the accumulator to remain disengaged during the initial or forward stroke of actuators and to become engaged with the actuators for the return stroke thereof, thus effecting accumulation; means for reversing such order of engagement and disengagement of actuators and accumulators; type carriers moving with the actuators; a special type carrier; a movable member for variously determining the position thereof; a total key and connections for moving said member, said key controlling the aforesaid means for reversing the order of engagement and disengagement of actuators and accumulator; a pivoted abutment member moved by said key toward position for limiting the return of the special type carrier positioning member; a reciprocating bar acting on said abutment member to complete its movement to effective position; a latch for holding said member in such position; a latch displacing lever; a tappet piece pivoted on the said reciprocating bar and adapted in the advance movement of the latter to act upon said lever on one or the other side of its pivot; amount keys; and means operated thereby to adjust the said tappet piece for action on the lever to displace the latch.

140. In a machine of the character described, the combination of an accumulator; differentially reciprocatory actuators therefor; means for reciprocating said actuators; means for moving the accumulators into and out of engagement therewith, normally causing the accumulator to remain disengaged during the initial or forward stroke of actuators and to become engaged with the actuators for the return stroke thereof, thus effecting accumulation; means for reversing such order of engagement and disengagement of actuators and accumulators; type carriers moving with the actuators; a special type carrier; a movable member for variously determining the position thereof; a total key and connections for moving said member, said key controlling the aforesaid means for reversing the order of engagement and disengagement of actuators and accumulator; a pivoted abutment member moved by said key toward position for limiting the return of the special type carrier positioning member; a reciprocating bar acting on said abutment member to complete its movement to effective position; a latch for holding said member in such position; a latch displacing lever; a tappet piece pivoted on the said reciprocating bar and adapted in the advance movement of the latter to act upon said lever on one or the other side of its pivot; amount keys; and a bail swung thereby and having an arm for presentation to said tappet piece, with provisions for camming the latter into position for action on the lever to displace the latch.

141. In a machine of the character described, the combination of an accumulator; differentially reciprocatory actuators therefor; means for reciprocating said actuators; means for moving the accumulators into and out of engagement therewith, normally causing the accumulator to remain disengaged during the initial or forward stroke of actuators and to become engaged with the actuators for the return stroke thereof, thus effecting accumulation; means for reversing such order of engagement and disengagement of actuators and accumulators; type carriers moving with the actuators; a special type carrier; a movable member for variously determining the position thereof; a total key and connections for moving said member, said key controlling the aforesaid means for reversing the order of engagement and disengagement of actuators and accumulator; a pivoted abutment member moved by said key toward position for limiting the return of the special type carrier positioning member; a reciprocating bar acting on said abutment member to complete its movement to effective position; a latch for holding said member in such position; amount key; and means controlled thereby for disabling the latch and locking the total key.

142. In a machine of the character described, the combination of an accumulator; differentially reciprocatory actuators therefor; means for reciprocating said actuators; means for moving the accumulators into and out of engagement therewith, normally causing the accumulator to remain disengaged during the initial or forward stroke of actuators and to become engaged with the actuators for the return stroke thereof, thus effecting accumulation; means for reversing such order of engagement and disengagement of actuators and accumulators; type carriers moving with the actuators; a special type carrier; a movable member for variously determining the position thereof; a total key and connections for moving said member, said key controlling the aforesaid means for reversing the order of engagement and disengagement of actuators and accumulator; a pivoted abutment member moved by said key toward position for limiting the return of the special type carrier positioning member; a reciprocating bar acting on said abutment member to complete its movement to effective position; a latch for holding said member in such position; amount keys; and means controlled thereby for disabling the latch and operated by said reciprocating bar and locking the total key.

143. In a machine of the character described, the combination of an accumulator; differentially reciprocatory actuators therefor; means for reciprocating said actuators; means for moving the accumulators into and out of engagement therewith, normally causing the accumulator to remain disengaged during the initial or forward stroke of actuators and to become engaged with the actuators for the return stroke thereof, thus effecting accumulation; means for reversing such order of engagement and disengagement of actuators and accumulators; type carriers moving with the actuators; a special type carrier; a movable member for variously determining the position thereof; a total key and connections for moving said member, said key controlling the aforesaid means for reversing the order of engagement and disengagement of actuators and accumulator; a pivoted abutment member moved by said key toward position for limiting the return of the special type carrier positioning member; a reciprocating bar acting on said abutment member to complete its movement to effective position; a latch for holding said member in such position; a latch displacing lever; a tappet piece pivoted on the said reciprocating bar and adapted in the advance movement of the latter to act upon said lever on one or the other side of its pivot; amount keys; means operated thereby to adjust the said tappet piece for action on the lever to displace the latch; and means for locking the total key by the resultant movement of said lever.

144. In a machine of the character described, the combination of an accumulator; differentially reciprocatory actuators therefor; means for reciprocating said actuators; means for moving the accumulators into and out of engagement therewith, normally causing the accumulator to remain disengaged during the initial or forward stroke of actuators and to become engaged with the actuators for the return stroke thereof, thus effecting accumulation; means for reversing such order of engagement and disengagement of actuators and accumulators; type carriers moving with the actuators; a special type carrier; a movable member for variously determining the position thereof; a total key and connections for moving said member, said key controlling the aforesaid means for reversing the order of engagement and disengagement of actuators and accumulator; a pivoted abutment member moved by said key toward position for limiting the return of the special type carrier positioning member; a reciprocating bar acting on said abutment member to complete its movement to effective position; a latch for holding said member in such position; a latch displacing lever; a tappet piece pivoted on the said reciprocating bar and adapted in the advance movement of the latter to act upon said lever on one or the other side of its pivot; amount key; a bail swung thereby and having an arm for presentation to said tappet piece, with provisions for camming the latter into position for action on the lever to displace the latch; and means for locking the total key by the resultant movement of said lever.

145. In a machine of the character described, the combination of an accumulator, differentially reciprocatory actuators therefor; means for reciprocating said actuators; means for moving the accumulators into and out of engagement therewith, normally causing the accumulator to remain disengaged during the initial or forward stroke of actuators and to become engaged with the actuators for the return stroke thereof, thus effecting accumulation; means for reversing such order of engagement and disengagement of actuators and accumulators; type carriers moving with the actuators; a special type carrier; a movable member for variously determining the position thereof; a total key and connections for moving said member, said key controlling the aforesaid means for reversing the order of engagement and disengagement of actuators and accumulator; a pivoted abutment member moved by said key toward position for limiting the return of the special type carrier positioning member; a reciprocating bar acting on said abutment member to complete its movement to effective position; a latch for holding said member in such position; and a sub-total key and connections for causing the accumulator and actuators to remain engaged during movement of the latter in both directions, said key effecting movement of the special type carrier positioning member but operating independently of the total key connections which move the abutment member, the latter being thus left out of position to be operated upon by the reciprocating bar.

146. In a machine of the character described, the combination of an accumulator, differentially reciprocatory actuators therefor; means for reciprocating said actuators; means for moving the accumulators into and out of engagement therewith, normally causing the accumulator to remain disengaged during the initial or forward stroke of actuators and to become engaged with the actuators for the return stroke thereof, thus effecting accumulation; means for reversing such order of engagement and disengagement of actuators and accumulators; type carriers moving with the actuators; a special type carrier; a movable member for variously determining the position thereof; a total key and connections for moving said member, said key controlling the aforesaid means for reversing the order of engagement and disengagement of actuators and accumulator; a pivoted abutment member moved by said key toward position for limiting the return of the special type carrier positioning member; a reciprocating bar acting on said abutment member to complete its movement to effective position; a latch for holding said member in such position; a sub-total key and connections for causing the accumulator and actuators to remain engaged during movement of the latter in both directions, said key effecting movement of the special type carrier positioning member but operating independently of the total key connections which move the abutment member, the latter being thus left out of position to be operated upon by the reciprocating bar; amount keys; and means controlled thereby for disabling the latch and locking the total and sub-total keys.

147. In a machine of the character described, the combination of an accumulator, differentially reciprocatory actuators therefor; means for reciprocating said actuators; means for moving the accumulators into and out of engagement therewith, normally causing the accumulator to remain disengaged during the initial or forward stroke of actuators and to become engaged with the actuators for the return stroke thereof, thus effecting accumulation; means for reversing such order of engagement and disengagement of actuators and accumulators; type carriers moving with the actuators; a special type carrier; a movable member for variously determining the position thereof; a total key and connections for moving said member, said key controlling the aforesaid means for reversing the order of engagement and disengagement of actuators and accumulator; a pivoted abutment member moved by said keys toward position for limiting the return of the special type carrier positioning member; a reciprocating bar acting on said abutment member to complete its movement to effective position; a latch for holding said member in such position; a sub-total key and connections for causing the accumulator and actuators to remain engaged during movement of the latter in both directions, said connections comprising a lever also operated upon by the total key and effecting movement of the special type carrier positioning member but operating independently of the total key connections which move the abutment member, the latter being thus left out of position to be operated upon by the reciprocating bar; a latch-displacing lever; a tappet piece pivoted on the said reciprocating bar and adapted in the advance movement of the latter to act upon said lever on one or the other side of its pivot; amount keys; and means operated thereby to adjust the said tappet piece for action on the lever to displace the latch, said lever then locking the aforesaid sub-total key lever.

148. In a machine of the character described, the combination of an accumulator; differentially reciprocatory actuators therefor; means for reciprocating said actuators; means for moving the accumulators into and out of engagement therewith, normally causing the accumulator to remain disengaged during the initial or forward stroke of actuators and to become engaged with the actuators for the return stroke thereof, thus effecting accumulation; means for reversing such order of engagement and disengagement of actuators and accumulators; type carriers moving with the actuators; a special type carrier; a movable member for variously determining the position thereof; a total key and connections for moving said member, said key controlling the aforesaid means for reversing the order of engagement and disengagement of actuators and accumulator; a pivoted abutment member moved by said key toward position for limiting the return of the special type carrier positioning member; a reciprocating bar acting on said abutment member to complete its movement to effective position; a latch for holding said member in such position; amount keys; means controlled thereby for disabling the latch; an elimination key and connections for keeping the accumulator disengaged from the actuators during movement of the latter in both directions; and means operated by said key for disabling the latch-disabling means.

149. In a machine of the character described, the combination of an accumulator; differentially reciprocatory actuators therefor; means for reciprocating said actuators; means for moving the accumulators into and out of engagement therewith, normally causing the accumulator to remain disengaged during the initial or forward stroke of actuators and to become engaged with the actuators for the return stroke thereof, thus effecting accumulation; means for reversing such order of engagement and disengagement of actuators and accumulators; type carriers moving with the actuators; a special type carrier; a movable member for variously determining the position thereof; a total key and connections for moving said member, said key controlling the aforesaid means for reversing the order of engagement and disengagement of actuators and accumulator; a pivoted abutment member moved by said key toward position for limiting the return of the special type carrier positioning member; a reciprocating bar acting on said abutment member to complete its movement to effective position; a latch for holding said member in such position; amount keys; means controlled thereby for disabling the latch and operated by said reciprocating bar; an elimination key and connections for keeping the accumulator disengaged from the actuators during movement of the latter in both directions; and means operated by said key for disabling the reciprocating bar.

150. In a machine of the character described, the combination of an accumulator; differentially reciprocatory actuators therefor; means for reciprocating said actuators; means for moving the accumulators into and out of engagement therewith, normally causing the accumulator to remain disengaged during the initial or forward stroke of actuators and to become engaged with the actuators for the return stroke thereof, thus effecting accumulation; means for reversing such order of engagement and disengagement of actuators and accumulators; type carriers moving with the actuators; a special type carrier; a movable member for variously determining the position thereof; a total key and connections for moving said member, said key controlling the aforesaid means for reversing the order of engagement and disengagement of actuators and accumulator; a pivoted abutment member moved by said key toward position for limiting the return of the special type carrier positioning member; a reciprocating bar acting on said abutment member to complete its movement to effective position; a latch for holding said member in such position; a latch displacing lever; a tappet piece pivoted on the said reciprocating bar and adapted in the advance movement of the latter to act upon said lever on one or the other side of its pivot; amount keys; means operated thereby to adjust the said tappet piece for action on the lever to displace the latch; an elimination key and connections for keeping the accumulator disengaged from the actuators during movement of the latter in both directions; and means operated by said key for disabling the reciprocating bar.

151. In a machine of the character described, the combination of an accumulator; differentially reciprocatory actuators therefor; means for reciprocating said actuators; means for moving the accumulators into and out of engagement therewith, normally causing the accumulator to remain disengaged during the initial or forward stroke of actuators and to become engaged with the actuators for the return stroke thereof, thus effecting accumulation; means for reversing such order of engagement and disengagement of actuators and accumulators; type carriers moving with the actuators; a special type carrier; a movable member for variously determining the position thereof; a total key and connections for moving said member, said key controlling the aforesaid means for reversing the order of engagement and disengagement of actuators and accumulator; a pivoted abutment member moved by said key toward position for limiting the return of the special type carrier positioning member; a reciprocating bar acting on said abutment member to complete its movement to effective position; a latch for holding said member in such position; amount keys; means controlled thereby for disabling the latch and operated by said reciprocating bar, an elimination key and connections for keeping the accumulator disengaged from the actuators during movement of the latter in both directions; an oscillating shouldered segment for reciprocating the bar; and means operated by said elimination key for displacing said bar from coöperative relationship with said segment.

152. In a machine of the character described, the combination of an accumulator; differentially reciprocatory actuators therefor; means for reciprocating said actuators; means for moving the accumulators into and out of engagement therewith, normally causing the accumulator to remain disengaged during the initial or forward stroke of actuators and to become engaged with the actuators for the return stroke thereof, thus effecting accumulation; means for reversing such order of engagement and disengagement of actuators and accumulators; type carriers moving with the actuators; a special type carrier; a movable member for variously determining the position thereof; a total key and connections for moving said member, said key controlling the aforesaid means for reversing the order of engagement and disengagement of actuators and accumulator; a pivoted abutment member moved by said key toward position for limiting the return of the special type carrier positioning member; a reciprocating bar acting on said abutment member to complete its movement to effective position, said bar having a right angle slot; a latch for holding said member in such position; amount keys; means controlled thereby for disabling the latch; an elimination key and connections for keeping the accumulator disengaged from the actuators during movement of the latter in both directions; an oscillating shouldered segment for reciprocating the bar; a fixed stud engaging the right angle slot of the latter; a lever operated by the elimination key; and a link connected with said lever and engaging the bar.

153. In a machine of the character described, the combination of reciprocating type carriers having alining notches, an alining bail whose cross piece is adapted to engage said notches, an actuating arm for said bail spring-connected therewith, and a rocking cam engaged with said arm.

154. In a machine of the character described, the combination of oscillatory racks, adding pinions axially alined and individually rotatable, a movable support for said pinions whereby they may be moved collectively into and out of engagement with said racks respectively, and arms pivoted concentrically with the racks and cam-slotted to engage the pinion support axially of the pinions.

155. In a machine of the character described, the combination of oscillatory racks; adding pinions; a journal shaft upon which the latter are loosely mounted, a movable support for said shaft providing for movement of the pinions collectively into and out of engagement with the racks respectively, and arms pivoted concentrically with the racks and having cam-slots embracing the pinion journal.

156. In a machine of the character described, the combination of oscillatory racks; adding pinions; a journal shaft upon which the latter are loosely mounted; a pivoted frame supporting said shaft to provide for movement of the pinions collectively, and arms pivoted concentrically with the racks and having cam-slots embracing the pinion journal.

JESSE G. VINCENT.
RUSSELL E. BENNER.

Witnesses:
R. S. MIELERT,
A. W. FENZEL.